US012730024B2

(12) United States Patent
Chalofsky et al.

(10) Patent No.: US 12,730,024 B2
(45) Date of Patent: Sep. 8, 2026

(54) AUTONOMOUS TIRE CHANGING SYSTEM AND METHOD THEREFOR

(71) Applicant: Automated Tire, Inc., Cleveland, OH (US)

(72) Inventors: Andy Chalofsky, Cleveland, OH (US); Josh Chalofsky, Cleveland, OH (US); Faron Schonfeld, Cleveland, OH (US); Stephen Toebes, Sunderland, MA (US); Nicholas Efthimiades, Farmingdale, NY (US); James Parker, Mansfield, MA (US); Michael Earle, Somerville, MA (US)

(73) Assignee: Automated Tire, Inc., Cleveland, OH (US)

( * ) Notice: Subject to any disclaimer, the term of this patent is extended or adjusted under 35 U.S.C. 154(b) by 359 days.

(21) Appl. No.: 18/213,184

(22) Filed: Jun. 22, 2023

(65) Prior Publication Data

US 2023/0417616 A1 Dec. 28, 2023

Related U.S. Application Data

(60) Provisional application No. 63/354,591, filed on Jun. 22, 2022.

(51) Int. Cl.
*G01M 1/28* (2006.01)
*G01M 1/04* (2006.01)

(52) U.S. Cl.
CPC .............. *G01M 1/28* (2013.01); *G01M 1/045* (2013.01)

(58) Field of Classification Search
None
See application file for complete search history.

(56) References Cited

U.S. PATENT DOCUMENTS 2,363,316 A 11/1944 Hagg .............................. 73/457
3,078,720 A 2/1963 Hofmann ........................ 73/457
(Continued)

FOREIGN PATENT DOCUMENTS

CA 3204143 A1 10/2019
CA 3117653 A1 11/2021 ................ B25J 9/16
(Continued)

OTHER PUBLICATIONS

Taiwanese Office Action (in Chinese), dated Sep. 5, 2025, issued by the Taiwanese Intellectual Property Office for Applicant's related Taiwanese Patent Application No. 110116791, and a computer-generated English translation thereof.
(Continued)

*Primary Examiner* — Mark A Shabman
(74) *Attorney, Agent, or Firm* — Bodner & Bodner, PLLC; Christian P. Bodner; Gerald T. Bodner

(57) ABSTRACT

A vehicle component balancing robot apparatus, for on vehicle balancing of one or more of a tire, a wheel, bearings, brake components, and vehicle components that impart vibrations to the vehicle. The apparatus includes a frame arranged so as to connect with the vehicle. A robot of the apparatus moves relative to the frame, and is configured so that the move, relative to the frame, resolves a predetermined location of a tire-wheel assembly relative to a reference frame of the robot. The robot has at least one end effector arranged to interface the tire-wheel assembly and the robot moves the at least one end effector to other predetermined locations on a wheel rim of the tire-wheel assembly, determined based on resolution of the predetermined location of the tire-wheel assembly relative to the reference frame.

30 Claims, 24 Drawing Sheets

(56) References Cited

U.S. PATENT DOCUMENTS

| | | | | |
|---|---|---|---|---|
| 3,412,459 | A | 11/1968 | Hollis | 483/9 |
| 3,675,495 | A | 7/1972 | MacMillan | 73/466 |
| 3,726,145 | A | 4/1973 | Bedford et al. | 73/457 |
| 3,762,225 | A | 10/1973 | Müller | 73/457 |
| 3,780,592 | A | 12/1973 | Merrilees | 73/457 |
| 3,815,425 | A | 6/1974 | Skidmore | 73/457 |
| 3,906,801 | A | 9/1975 | Butler | 73/457 |
| 3,960,409 | A | 6/1976 | Songer | 301/5.21 |
| 3,971,426 | A | 7/1976 | West et al. | 157/1.28 |
| 3,987,338 | A | 10/1976 | Puetz | 315/241 S |
| 4,109,532 | A | 8/1978 | Donato | 73/457 |
| 4,274,287 | A | 6/1981 | Kaneda | 73/457 |
| 4,555,943 | A | 12/1985 | Ohta et al. | 73/457 |
| 4,907,452 | A | 3/1990 | Yopp | 73/457 |
| 4,956,998 | A | 9/1990 | Goebel | 73/457 |
| 5,125,298 | A | 6/1992 | Smith | 81/57.37 |
| 5,269,186 | A | 12/1993 | Yopp | 73/457 |
| 5,396,436 | A | 3/1995 | Parker et al. | 700/279 |
| 5,479,821 | A | 1/1996 | Goebel | 73/457 |
| 6,125,904 | A | 10/2000 | Kane et al. | 157/1.24 |
| 6,247,516 | B1 | 6/2001 | Sinclair | 157/1.1 |
| 6,481,083 | B1 | 11/2002 | Lawson et al. | 29/407.04 |
| 6,877,544 | B2 | 4/2005 | Kane et al. | 157/1.24 |
| 7,896,054 | B2 | 3/2011 | Bonacini | 157/1.24 |
| 8,291,958 | B2 | 10/2012 | Bartoli | 157/1.24 |
| 9,139,055 | B2 | 9/2015 | Bonacini | |
| 9,475,342 | B2 | 10/2016 | Feng | |
| 9,757,828 | B2 | 9/2017 | Komatsu et al. | |
| 10,557,520 | B2 | 2/2020 | Bürgel | |
| 10,570,989 | B2 | 2/2020 | Hornung et al. | |
| 10,773,550 | B1 | 9/2020 | Downey et al. | |
| 10,926,365 | B2 | 2/2021 | Wen | |
| 10,933,549 | B2 | 3/2021 | Taylor et al. | |
| 10,967,687 | B2 | 4/2021 | Liebetreu et al. | |
| 10,974,546 | B2 | 4/2021 | Downey et al. | |
| 11,059,325 | B2 | 7/2021 | Downey et al. | |
| 11,203,228 | B2 | 12/2021 | Mica et al. | |
| 11,332,352 | B2 | 5/2022 | Bowers et al. | |
| 11,446,826 | B2 | 9/2022 | Chalofsky et al. | |
| 11,446,958 | B2 | 9/2022 | Downey et al. | |
| 11,472,239 | B2 | 10/2022 | Wen | |
| 11,498,358 | B2 | 11/2022 | Mica et al. | |
| 11,597,233 | B2 | 3/2023 | Downey et al. | |
| 11,639,075 | B2 | 5/2023 | Downey et al. | 29/894.31 |
| 11,667,153 | B2 | 6/2023 | Darolfi et al. | 29/894.31 |
| 11,787,232 | B2 | 10/2023 | Darolfi | 29/894.31 |
| 11,787,234 | B2 | 10/2023 | Downey et al. | 29/894.31 |
| 11,861,276 | B2 | 1/2024 | Vargo et al. | |
| 11,872,685 | B2 | 1/2024 | Chalofsky et al. | |
| 11,872,841 | B2 | 1/2024 | Darolfi et al. | |
| 11,986,947 | B2 | 5/2024 | Chalofsky et al. | |
| 12,090,626 | B2 | 9/2024 | Chalofsky et al. | |
| 12,151,522 | B2 | 11/2024 | Wen | |
| 12,181,368 | B1 | 12/2024 | Buchanan et al. | |
| 2002/0135223 | A1 | 9/2002 | Gross et al. | 301/5.21 |
| 2003/0000295 | A1 | 1/2003 | Fogal | 73/146 |
| 2003/0051326 | A1 | 3/2003 | Lawson et al. | 29/407.01 |
| 2003/0131947 | A1 | 7/2003 | Magnani | 157/1.26 |
| 2004/0221964 | A1 | 11/2004 | Bonacini | 157/1.28 |
| 2005/0020419 | A1 | 1/2005 | Hagmann et al. | 483/1 |
| 2006/0076359 | A1 | 4/2006 | Gross et al. | 221/289 |
| 2006/0273652 | A1 | 12/2006 | Winch et al. | 301/5.21 |
| 2007/0107183 | A1 | 5/2007 | Lawson et al. | 29/407.09 |
| 2008/0196496 | A1 | 8/2008 | Jablonski et al. | 73/462 |
| 2010/0058859 | A1 | 3/2010 | Rogalla et al. | 73/470 |
| 2011/0048649 | A1* | 3/2011 | Komatsu | B62D 65/12 157/1.35 |
| 2011/0048650 | A1* | 3/2011 | Lawson | B25J 15/0028 157/16 |
| 2011/0284170 | A1 | 11/2011 | Lemser et al. | 157/1.1 |
| 2012/0073764 | A1 | 3/2012 | Lawson et al. | 157/1.1 |
| 2012/0125542 | A1 | 5/2012 | Lawson et al. | 157/1.17 |
| 2014/0174630 | A1* | 6/2014 | Donnay | F16F 15/324 156/391 |
| 2014/0238127 | A1 | 8/2014 | Lawson et al. | 73/460 |
| 2014/0374431 | A1 | 12/2014 | Bürgel | 221/1 |
| 2016/0047437 | A1 | 2/2016 | Bürgel | 221/1 |
| 2016/0290885 | A1 | 10/2016 | Straitiff et al. | |
| 2017/0106411 | A1 | 4/2017 | Peinelt et al. | |
| 2017/0334073 | A1 | 11/2017 | Hong et al. | |
| 2017/0335922 | A1 | 11/2017 | Key | |
| 2018/0037072 | A1 | 2/2018 | Yoshikawa et al. | |
| 2018/0326446 | A1 | 11/2018 | Anderson et al. | |
| 2019/0201132 | A1 | 7/2019 | Ugochuku | |
| 2019/0232737 | A1 | 8/2019 | Straitiff et al. | |
| 2019/0257387 | A1 | 8/2019 | Rogalla et al. | |
| 2020/0108659 | A1 | 4/2020 | Downey et al. | |
| 2020/0223675 | A1 | 7/2020 | Wen | |
| 2021/0094089 | A1 | 4/2021 | Shah et al. | |
| 2021/0101237 | A1 | 4/2021 | Kim et al. | |
| 2021/0114408 | A1 | 4/2021 | Darolfi | |
| 2021/0221457 | A1 | 7/2021 | Wen | |
| 2021/0347057 | A1* | 11/2021 | Chalofsky | B25J 11/00 |
| 2021/0347058 | A1 | 11/2021 | Chalofsky et al. | |
| 2023/0007948 | A1 | 1/2023 | Chalofsky et al. | |
| 2023/0052365 | A1 | 2/2023 | Vargo et al. | |
| 2023/0057819 | A1 | 2/2023 | Shah et al. | |
| 2023/0076081 | A1 | 3/2023 | Wen | |
| 2023/0130910 | A1 | 4/2023 | Downey et al. | 29/894.31 |
| 2023/0202232 | A1 | 6/2023 | Downey et al. | 29/894.31 |
| 2023/0264516 | A1 | 8/2023 | Downey et al. | 29/894.31 |
| 2023/0391032 | A1 | 12/2023 | Dollinger et al. | |
| 2023/0417617 | A1 | 12/2023 | Chalofsky et al. | |
| 2025/0018577 | A1 | 1/2025 | Chalofsky et al. | |
| 2025/0052635 | A1 | 2/2025 | Wen | |
| 2025/0172457 | A1 | 5/2025 | Fenimore et al. | |
| 2025/0283772 | A1 | 9/2025 | Chalofsky et al. | |
| 2025/0314547 | A1 | 10/2025 | Chalofsky et al. | |

FOREIGN PATENT DOCUMENTS

| | | | | |
|---|---|---|---|---|
| CA | 3186687 | A1 | 2/2022 | B60S 9/12 |
| CA | 3157942 | A1 | 4/2022 | B60B 29/00 |
| CN | 104354548 | A | 2/2015 | B60C 25/00 |
| CN | 104354548 | B | 1/2017 | B60C 25/00 |
| CN | 105946476 | B | 10/2018 | B60C 25/132 |
| CN | 209395520 | U | 9/2019 | B60C 25/132 |
| EP | 3703961 | A1 | 9/2020 | B60C 25/05 |
| EP | 3909794 | A1 | 11/2021 | B23P 19/06 |
| EP | 4045333 | A1 | 8/2022 | B60B 29/00 |
| EP | 4188863 | A1 | 6/2023 | B60S 9/12 |
| EP | 4543695 | A2 | 4/2025 | B25J 19/02 |
| JP | H0424153 | A | 1/1992 | B60S 3/04 |
| JP | 2015507577 | A | 3/2015 | B60B 21/02 |
| JP | 2021191668 | A | 12/2021 | B60B 29/00 |
| KR | 20210137931 | A | 11/2021 | B25J 19/02 |
| TW | 200302787 | A | 8/2003 | B60C 25/132 |
| TW | M528903 | U | 9/2016 | B60C 25/05 |
| TW | 202146186 | A | 12/2021 | B25J 13/06 |
| WO | WO0179008 | A1 | 10/2001 | B60C 25/132 |
| WO | WO03002361 | A1 | 1/2003 | B60C 25/132 |
| WO | WO2006029041 | A2 | 3/2006 | B21K 1/20 |
| WO | WO2006029041 | A3 | 3/2006 | B23P 21/00 |
| WO | WO2007030037 | A1 | 3/2007 | |
| WO | WO2019204552 | A1 | 10/2019 | B60C 25/05 |
| WO | WO2021076532 | A1 | 4/2021 | B60B 29/00 |
| WO | WO2021188307 | A1 | 9/2021 | B25B 23/04 |
| WO | WO2022026776 | A1 | 2/2022 | B60S 9/12 |
| WO | WO2023076255 | A1 | 5/2023 | B25J 13/08 |
| WO | WO2023076558 | A1 | 5/2023 | G05B 19/00 |
| WO | WO2023076559 | A1 | 5/2023 | G06N 20/00 |
| WO | WO2023250113 | A2 | 12/2023 | B60C 25/05 |

OTHER PUBLICATIONS

U.S. Appl. No. 19/381,280, Chalofsky, et al., filed Nov. 6, 2025.

Angel, Kristin, "*Calculating the Location of the Center-of-Gravity Using an Accelerometer Array*", Thesis, Rochester Institute of Technology, May 29, 2019, pp. 1-93. Abstract and full text available at: https://repository.rit.edu/theses/10117/ (last accessed on Feb. 14, 2024) (copy not enclosed).

Huff, et al., "*MOTHERSHIP—A serpentine tread/limb hybrid marsupial robot for USAR*", 2012 IEEE International Symposium on

(56) References Cited

OTHER PUBLICATIONS

Safety, Security, and Rescue Robotics (SSRR), Nov. 2012, pp. 1-7. Abstract and full text available at: https://ieeexplore.ieee.org/document/6523893 (last accessed on Feb. 14, 2024) (copy not enclosed).
Abad-Manterola, et al., "*Axel rover paddle wheel design, efficiency, and sinkage on deformable terrain*", 2010 IEEE International Conference on Robotics and Automation, May 2010, pp. 2821-2827. Abstract and full text available at: https://ieeexplore.ieee.org/document/5509391 (last accessed on Feb. 14, 2024) (copy not enclosed).
Wang, et al., "*Dynamics modeling of a mobile manipulator for wheel slip avoidance*", 2011 IEEE International Conference on Robotics and Biomimetics, Dec. 2011, pp. 1621-1626. https://ieeexplore.ieee.org/document/6181521 (last accessed on Feb. 14, 2024) (copy not enclosed).
McGinn, et al., "*Towards the design of a new humanoid robot for domestic applications*", 2014 IEEE International Conference on Technologies for Practical Robot Applications (TePRA), Apr. 2014, pp. 1-6. Abstract and full text available at: https://ieeexplore.ieee.org/document/6869155 (last accessed on Feb. 14, 2024) (copy not enclosed).
Shin, et al., "*A partitioned control scheme for mobile robot path tracking*", IEEE 1991 International Conference on Systems Engineering, Aug. 1991, pp. 338-342. Abstract and full text available at: https://www.researchgate.net/publication/3528083_A_partitioned_control_scheme_for_mobile_robot_path_tracking (last accessed on Feb. 14, 2024) (copy not enclosed).
Beckman, et al., "*Two dimensional dynamic stability for reconfigurable robots designed to traverse rough terrain*", 2008 IEEE/RSJ International Conference on Intelligent Robots and Systems, Sep. 2008, pp. 2427-2452. Abstract and full text available at: https://ieeexplore.ieee.org/document/4650753 (last accessed on Feb. 14, 2024) (copy not enclosed).
Ordonez, et al., "*COBRA: Collaborative Bot with multi-Rotor Actuation*", 2019 IEEE/RSJ International Conference on Intelligent Robots and Systems (IROS), Nov. 2019, pp. 4512-4517. Abstract and full text available at: https://ieeexplore.ieee.org/document/8968480 (last accessed on Feb. 14, 2024) (copy not enclosed).
Teller, et al., "*A voice-commandable robotic forklift working alongside humans in minimally-prepared outdoor environments*", 2010 IEEE International Conference on Robotics and Automation, May 2010, pp. 526-533. Abstract and full text available at: https://ieeexplore.ieee.org/document/5509238 (last accessed on Feb. 14, 2024) (copy not enclosed).
The Notification of Transmittal of the International Search Report and the Written Opinion of the International Searching Authority, or the Declaration, dated Jan. 10, 2024, which was issued by the International Searching Authority of WIPO in Applicant's related international PCT application having Serial No. PCT/US2023/026028, filed on Jun. 22, 2023.
The Written Opinion of the International Searching Authority, dated Jan. 10, 2024, which was issued by the International Searching Authority of WIPO in Applicant's related international PCT application having Serial No. PCT/US2023/026028, filed on Jun. 22, 2023.
The International Search Report, dated Jan. 10, 2024, which was issued by the International Searching Authority of WIPO in Applicant's related international PCT application having Serial No. PCT/US2023/026028, filed on Jun. 22, 2023.
Communication Pursuant to Rule 62 EPC, dated Oct. 11, 2021, issued by the European Patent Office in Applicant's related European Patent Application No. EP21173130.2, filed on May 10, 2021.
Extended European Search Report (Oct. 11, 2021—mailed with the Communication Pursuant to Rule 62 EPC), issued by the European Patent Office in Applicant's related European Patent Application No. EP21173130.2, filed on May 10, 2021.
European Search Opinion (Oct. 11, 2021—mailed with the Communication Pursuant to Rule 62 EPC), issued by the European Patent Office in Applicant's related European Patent Application No. EP21173130.2, filed on May 10, 2021.
Communication Pursuant to Article 94(3) EPC, dated Sep. 20, 2023, issued by the European Patent Office in Applicant's related European Patent Application No. EP21173130.2, filed on May 10, 2021.
Waldron, "*Mobility and controllability characteristics of mobile robotic platforms*", 1985, IEEE, pp. 237-243. Abstract and full text also available at: https://ieeexplore.ieee.org/document/1087323 (last accessed on Nov. 22, 2025) (copy not enclosed).
Kaffel, et al., "*An Autonomous Mobile Robot*", 1992, IEEE, pp. 790-798. Abstract and full text also available at: https://ieeexplore.ieee.org/document/637637 (last accessed on Nov. 22, 2025) (copy not enclosed).
Freitas, et al., "*Terrain model-based anticipative control for articulated vehicles with low bandwidth actuators*", 2013, IEEE, pp. 382-389. Full text available at: https://ieeexplore.ieee.org/document/6630604 (last accessed on Nov. 22, 2025) (copy not enclosed).
Staab, et al., "*Automatic Tire Changing of Large Mining Vehicles with Industrial Robots*", 2016, IEEE, pp. 1-7. Abstract and full text also available at: https://ieeexplore.ieee.org/document/7559134 (last accessed on Nov. 22, 2025) (copy not enclosed).
Staab, et al., "*A Robotic Parallel Platform for Automated Tire Changing of Large Mining Vehicles*", 2014, IEEE, pp. 435-441. Abstract and full text also available at: https://ieeexplore.ieee.org/document/6840164 (last accessed on Nov. 22, 2025) (copy not enclosed).
Xu, et al., "*Inter-Vehicle Dynamic Data Management and Communication Design*", 2009, IEEE, pp. 594-598. Abstract and full text also available at: https://ieeexplore.ieee.org/document/5195870 (last accessed on Nov. 22, 2025) (copy not enclosed).
Heater, Brian, "*Your next tire change could be performed by a robot*", TechCrunch, Feb. 24, 2020, the whole document. Full text available at: https://techcrunch.com/2020/02/24/your-next-tire-change-could-be-performed-by-a-robot/ (last accessed on Feb. 23, 2024) (copy not enclosed).
U.S. Appl. No. 19/415,050, Chalofsky, et al., filed Dec. 10, 2025.
An Office Action (in Korean), dated Nov. 28, 2025, issued by the Ministry of Intellectual Property, Republic of Korea (MOIP), for Applicant's Korean Patent Application No. 2021-61034, and a computer-generated English translation thereof.
"*L88 On-vehicle 'finish balancer'*", CEMB Balancing Machines, the whole document. Full text available at: https://www.cemb.com/en/garage-equipment/l88/ (publication date unknown; date retrieved: Jul. 29, 2024; last accessed: Jul. 31, 2025) (copy not enclosed).
"*CEMB USA L88—On Car Vehicle Wheel / Tire Balancer*", YouTube, uploaded by CEMB USA—Garage Equipment, Nov. 24, 2014. Video available at: https://www.youtube.com/watch?v=GZbjcx4-4WA (last accessed on Jul. 31, 2025) (copy not enclosed).
"*Amermac 501 Electronic Strobe Balancer*", All Tire Supply, the whole document. Full text available at: https://www.alltiresupply.com/products/electronic-strobe-balancer (publication date unknown; date retrieved: Apr. 30, 2025; last accessed: Jul. 31, 2025) (copy not enclosed).
Japanese Office Action (in Japanese) and an English translation thereof, dated May 26, 2025, issued by the Japaanese Patent Office for Applicant's related Japanese Application No. 2021-079770, filed on May 10, 2021.
Communication Pursuant to Rules 161(2) and 162 EPC, dated Jan. 29, 2025, issued by the European Patent Office in Applicant's related European Patent Application No. EP23827863.4, filed on Dec. 5, 2024.
Communication Pursuant to Article 94(3) EPC, dated Nov. 22, 2024, issued by the European Patent Office in Applicant's related European Patent Application No. EP21173130.2, filed on May 10, 2021.
Communication Pursuant to Rule 71(3) EPC, dated Jun. 6, 2025, issued by the European Patent Office in Applicant's related European Patent Application No. EP21173130.2, filed on May 10, 2021.
Extended European Search Report, which includes the Supplementary Search Report, the European Search Opinion and Annex to the European Search Report, in English, dated May 20, 2026, which

(56) References Cited

OTHER PUBLICATIONS was issued by the European Patent Office in Applicant's European Patent Application No. 23827863.4.

* cited by examiner

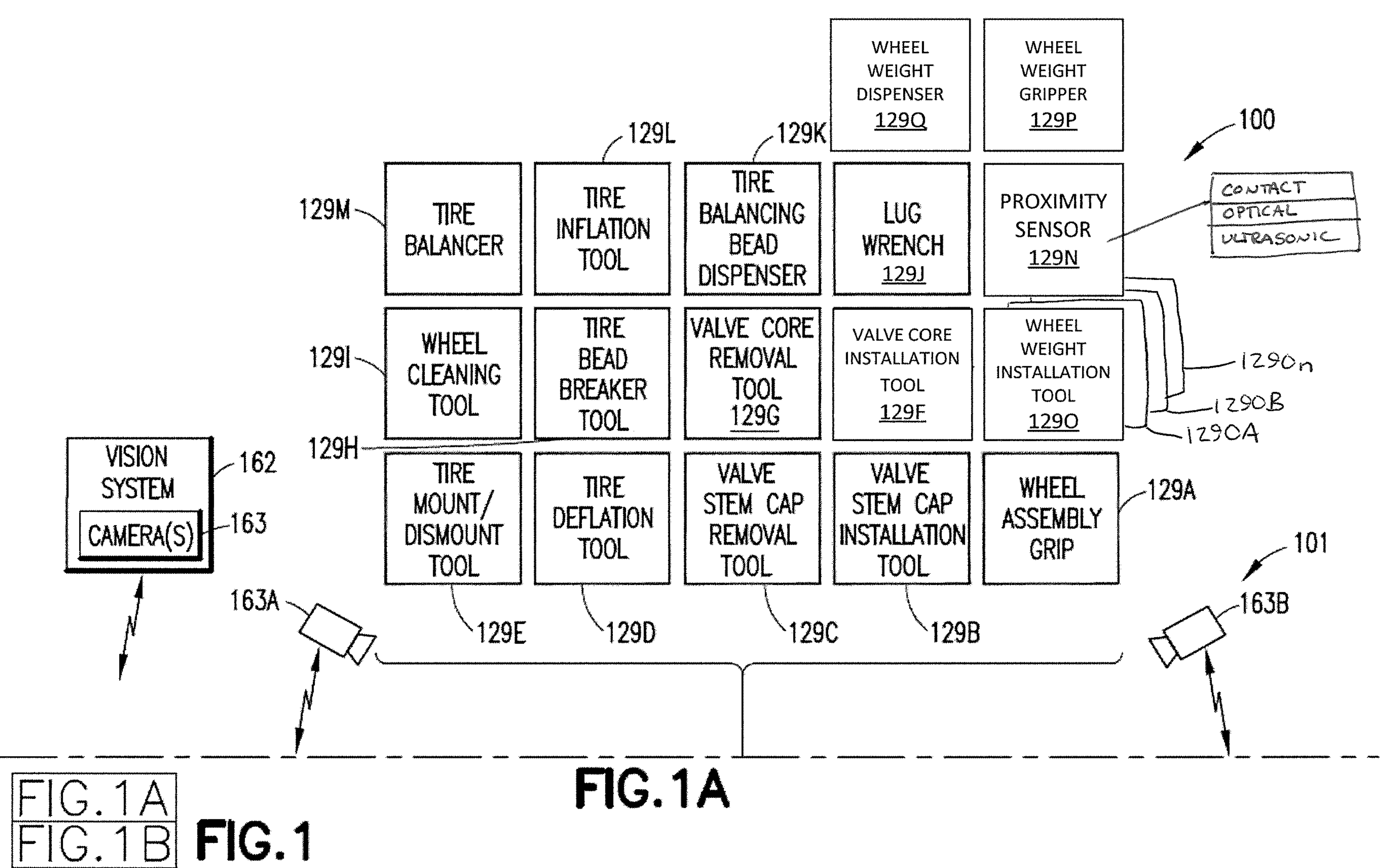

WHEEL WEIGHT DISPENSER 129Q
WHEEL WEIGHT GRIPPER 129P
100
129L
129K
129M
TIRE BALANCER
TIRE INFLATION TOOL
TIRE BALANCING BEAD DISPENSER
LUG WRENCH 129J
PROXIMITY SENSOR 129N
CONTACT
OPTICAL
ULTRASONIC
129I
WHEEL CLEANING TOOL
TIRE BEAD BREAKER TOOL
VALVE CORE REMOVAL TOOL 129G
VALVE CORE INSTALLATION TOOL 129F
WHEEL WEIGHT INSTALLATION TOOL 129O
129On
129OB
129OA
129H
VISION SYSTEM
CAMERA(S)
162
163
TIRE MOUNT/ DISMOUNT TOOL
TIRE DEFLATION TOOL
VALVE STEM CAP REMOVAL TOOL
VALVE STEM CAP INSTALLATION TOOL
WHEEL ASSEMBLY GRIP
129A
101
163A
163B
129E
129D
129C
129B
FIG.1A
FIG.1A
FIG.1B
FIG.1

BRAKE ROTOR
BRAKE DRUM
TIRE
WHEEL
BEARINGS
VEHICLE COMPONENTS
111RD
111R
111D
111T
111W
111B
111C
TOOL CHANGER
LIFT
VISION SYSTEM
POSITIONING SENSORS
NAVIGATION
CONTROLLER
MEMORY
CAMERA(S)
TOOL HOLDER
WHEEL WEIGHT DISPENSER 181
TIRE CHANGING MACHINE 182
TIRE BALANCING MACHINE 183
Ax1
Ax2
Ax3
Ax4
Ax5
Ax6
RREF
WREF

WHEEL WEIGHT DISPENSER
TIRE CHANGING MACHINE
TIRE BALANCING MACHINE
DRIVE
MOTOR
WHEELS
WHEEL WEIGHT DISPENSER
RREF
RREF
700
181
182
183
799
189
189F
120C
120
101
126
129
111
110
121
121M
120W
239R
238
237
111T
299
187
241R
241
239
120C
240R
240
120S
100

ROBOT
120
VACUUM SOURCE
VC
VACUUM SOURCE
VC
PROXIMITY SENSOR
415S1
128
410
END EFFECTOR
129P
129PA
416E1
416E2
471
MAGNET(S)
416C
415
472
VACUUM
415B
417E1
417C
417E2
CLIP(S)
L
420
488
473
474
ADHESIVE
420S
415S2
400
450
450S
400A
577

111W
ROBOT
120
VC
VACUUM SOURCE
PROXIMITY SENSOR
VACUUM SOURCE
VC
END EFFECTOR
129PA
471
410
129P
MAGNET(S)
VACUUM
499
472
415
CLIP(S)
473
489
420
420S
450
450S
FV

111W

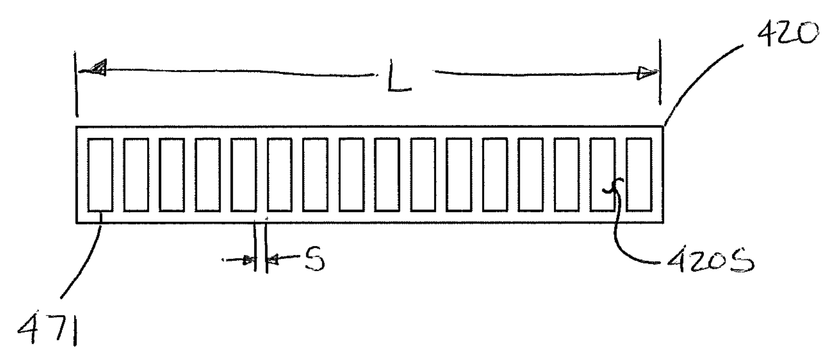
FIG. 4C
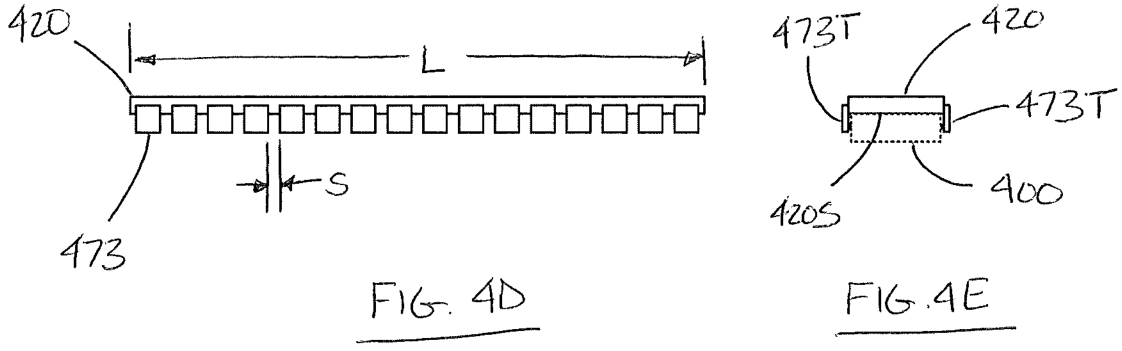
FIG. 4D
FIG. 4E
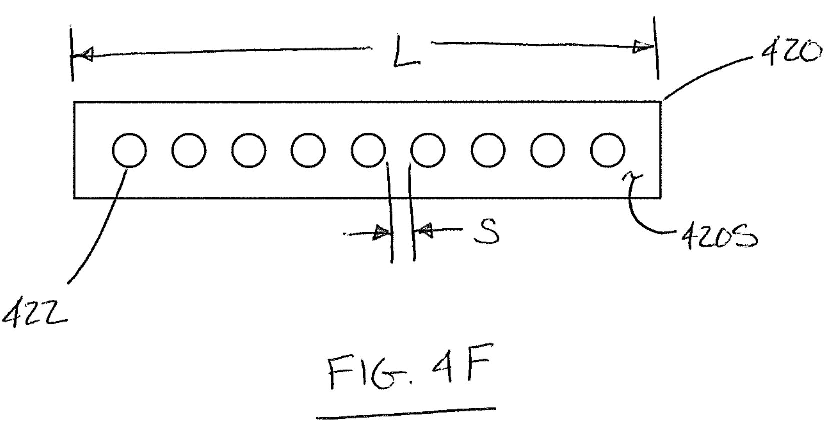
FIG. 4F

BACK OF WHEEL FLANGE
INNER WHEEL LIP
111TS
111T
111
111W
450S
450
577
120
ROBOT
581
580
1290
511
END EFFECTOR
512
510
499
578
128
566
529
579
400

PROXIMITY SENSOR
DISTANCE SENSOR
ENCODER
120D
111T
111
111W
450S
450
511A
511D
499
511
510A
128
510
END EFFECTOR
529
SR1
400
581
ROBOT
120
510D
1290

710CA
400
710B
699A
770

529
129P
799
415
420S
710
420
400
730T
733
730
666
730T
771

666
730
730B
730C
730T
BELT
CHAIN
710CA
ARRAY OF MAGNETS
710AR
712
710AR
ARRAY OF MAGNETS
712
710

LONGITUDINAL AXIS
710B
711
400
400P
PLATEN
730T
711
770
DRIVE
720
777
730EMT
730M
730T

730EMC
710B
730
710A
712
711
712
711
730T
730AL
666

400
400P
730T
710
710AR
730T
400
710
699M
400
666
733
601
730
733
BELT
730B
CHAIN
730C 400
710C
770A
699A
400
770A
712
WEIGHT GUIDE SURFACES
400P
710C
699A
710
400
666
699M
400
710C
400P
730M
601
733
BELT
730B
MAGNETIC COUPLING
CHAIN
730C
733

BELT
CHAIN
TAB(S)
ARRAY OF MAGNETS
ARRAY OF MAGNETS
LONGITUDINAL AXIS
PLATEN
DRIVE
MAGNETIC COUPLING

AUTONOMOUS TIRE CHANGING SYSTEM AND METHOD THEREFOR

CROSS-REFERENCE TO RELATED APPLICATIONS

This application is related to U.S. Provisional Patent Application Ser. No. 63/354,591, filed on Jun. 22, 2022, and titled "Autonomous Tire And Wheel Balancer And Method Therefor", the disclosure of which is hereby incorporated by reference and on which priority is hereby claimed.

BACKGROUND

1. Field

The present disclosure generally relates to vehicle tire changing equipment, and more particularly, to automated vehicle tire changing equipment and systems.

2. Brief Description of Related Developments

Like many industries that generally rely on human labor, there is a shortage of vehicle service technicians to meet demand with respect to, for example, the automobile service industry. Even with an adequate number of employees, throughput and efficiency of an automobile service facility or center may be impacted if one of their vehicle service technicians does not show up for work.

In addition to maintaining an adequate number of vehicle service technicians, automobile service facilities also face a challenge of finding a suitably qualified technician for any given tasks. For example, senior vehicle service technicians are often too highly paid for a service facility to justify the senior vehicle service technician to perform certain types of work. Moreover, it is not uncommon for some senior vehicle service technicians to refuse work that is below their level of expertise. For example, a senior vehicle service technician may refuse to perform vehicle tire changes. This creates a problem for service facilities in that an appropriate mix of vehicle service technician skill level must generally be maintained to maximize profits and efficiently operate the service facility.

A constantly changing level of consumer demand for certain automotive services may also compound the problem of efficient service facility operation because at some points in time the service facility may have an appropriate number of vehicle service technicians with an appropriate skill level for a certain task(s), such as vehicle tire changes, while at other times that same number of vehicle service technicians may be unsuitable for fulfilling customer demand with respect to the vehicle tire changes.

Generally, depending on the size of the service facility, tire changes are performed fully manually, manually with machine assist, or in a semi-automated manner. Fully manual tire changes are labor intensive and involve the use of manual bead breakers, crowbars or mount and demount tools, tire irons, and wheel supports. The amount of labor involved with fully manual tire changes may limit the number of tire changes that can be performed by a vehicle service technician in a given amount of time. The manual with machine assist tire changes reduce the labor involved with the tire change and generally include a machine with hydraulic-powered axes of motion that assist with breaking of the tire bead as well as maneuvering of the tire bead around a flange of the wheel from or to which the tire is being removed or installed. Semi-automated tire machines reduce the labor involved with a tire change even further, thus allowing a service technician to perform more tire changes; however, these semi-automated machines generally require constant vehicle service technician presence making multiple simultaneous tire changes by a single vehicle service technician unfeasible. The number of tire changes (and vehicles processed) that can be performed with the above-noted conventional tire change apparatus/methods is generally limited by the number of machines and corresponding vehicle service technicians available to use those machines.

In addition to the tire changing process, newly installed tires require the tire/wheel assembly to be balanced. This is also typically performed by a vehicle service technician using a conventional tire balancing machine with the tire/wheel assembly off the vehicle. While tire balancing machines that balance the tire/wheel assembly with the tire/wheel assembly on the vehicle have been used in the past, all-wheel-drive and traction control systems on newer vehicles have all but eliminated these conventional methods of balancing the tire/wheel assembly with the tire/wheel assembly on the vehicle. Tire balancing beads may also be used to dynamically balance a tire/wheel assembly, where the tire balancing beads are inserted into the tire by a vehicle service technician before seating the tire bead on the wheel. In any event, each of these tire balancing methods requires the constant presence of the vehicle service technician, again limiting the number of tires that can be changed in a given time period.

In some systems, wheel weights (also referred to herein as wheel balancing weights) are applied to a wheel, located off or dismounted from of a vehicle, using robots. These robots employ a rigid end effector that includes a curved surface on which the wheel weights are held. This curved surface has a radius that matches the inside radius of a barrel of the wheel on which barrel the weight is to be affixed. To apply the wheel weight, the robot rotates the end effector so that the weight held on the curved surface contacts the barrel at one edge. The robot rotates the end effector so that the curved surface rotates relative to the barrel so that the curved surface "rolls" along the barrel applying the wheel weight to the barrel in a "rolling" manner (such as in a manner similar to a paint roller depositing paint on a surface). Here, the swinging/rotating movement of the end effector is large and while sufficient for applying a wheel weight to a wheel located off of a vehicle, such rolling on of the wheel weight is prohibitive (due to a lack of the required swing area) with the wheel located on the vehicle. In addition, the "rolling" manner in which the wheel weight is applied may not provide a constant pressure along a length of the wheel weight that may result in debonding of the wheel weight from the wheel.

The wheel weights are generally applied, e.g., for correcting dynamic balance in accordance with an "inner" and "outer" method where an inner (further away from the centerline of the vehicle) and an outer (towards a centerline of the vehicle) wheel weights are selected for respective placement adjacent the back of the wheel flange and adjacent the inner wheel lip. This contrasts with a method of selecting a single location and single weight, however, the single location and single weight method is less common in the industry. When applying dynamic balancing weights in an automated system, it is likely that there would be one or a combination of axes, which allow for a fully controlled degree-of-freedom in the axial direction of the wheel, which would allow for the single location and single weight method; however, such control may not be necessary.

With respect to automated access for placing wheel weights, many vehicles have non-standard flanges as part of the inner lip of the wheel. Without knowing the geometry of these non-standard flanges, placing a tool for installing a wheel weight inside the barrel of a wheel is difficult.

BRIEF DESCRIPTION OF THE DRAWINGS

The foregoing aspects and other features of the present disclosure are explained in the following description, taken in connection with the accompanying drawings, wherein:

FIGS. 1A-1B are schematic illustrations of an automated tire changing system incorporating aspects of the present disclosure;

FIG. 4C is a schematic illustration of a portion of the wheel weight installation tool of FIGS. 4A and 4B in accordance with the present disclosure;

FIGS. 4D and 4E are a schematic illustrations of a portion of the wheel weight installation tool of FIGS. 4A and 4B in accordance with the present disclosure;

FIG. 4F is a schematic illustration of a portion of the wheel weight installation tool of FIGS. 4A and 4B in accordance with the present disclosure;

DETAILED DESCRIPTION

Figure 1B:
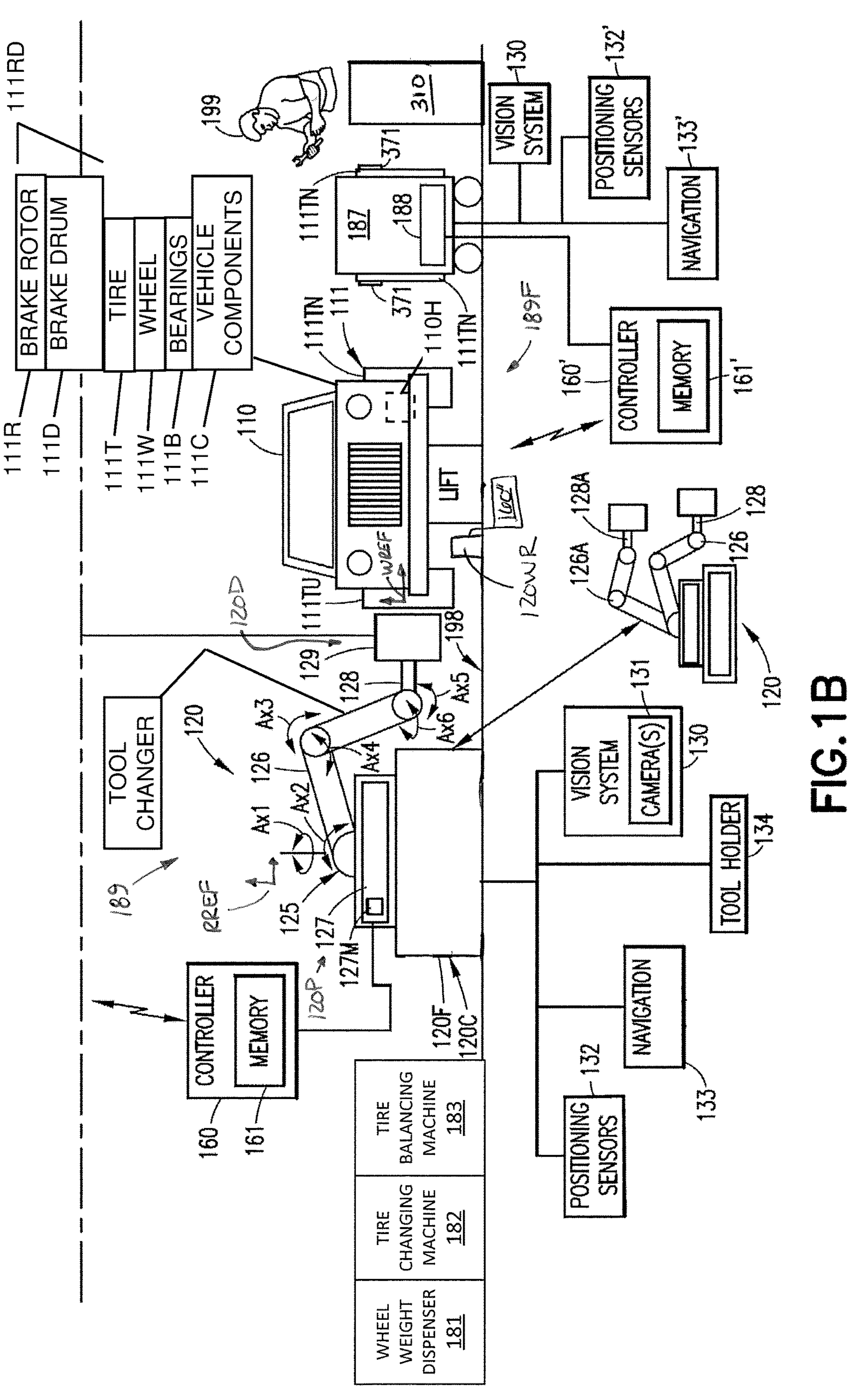

FIGS. 1A-1B illustrates an exemplary automated tire changing system 100 in accordance with aspects of the present disclosure. Although the aspects of the present disclosure will be described with reference to the drawings, it should be understood that the aspects of the present disclosure can be embodied in many forms. In addition, any suitable size, shape or type of elements or materials could be used.

Referring to FIGS. 1A-1B, the aspects of the tire changing system 100 described herein automate the process of changing tires 111T on a vehicle 110 (also referred to herein as a road vehicle). As will be described herein the tire changing system 100 provides for changing tires 111T with the wheel 111W (also referred to herein as a rim or wheel rim) on (i.e., in situ) the vehicle 110 or by removing the wheel 111W from the vehicle 110. In one or more aspects, the tire changing system 100 provides for an operator of the tire changing system 100, such as a vehicle service technician 199, to select an in-situ tire change or a tire change by removing the wheel 111W from the vehicle 110. The vehicle 110 is any suitable vehicle having a wheel assembly 111 (including a tire 111T mounted on a wheel 111W, also referred to herein as a tire-wheel assembly) coupled to and removable from a wheel hub. Suitable examples of a vehicle 110 include, but are not limited to, passenger vehicles, commercial vehicles, and recreational vehicles.

The aspects of the tire changing system 100 described herein automate tasks associated with changing tires 111T on the vehicle 110. A tire change, as described herein, includes at a minimum, removal of an old or used tire 111TU from the wheel 111W and replacement of the used tire 111TU with what may be referred to as a replacement or other (new) tire 111TN that is installed on the wheel 111W in place of the removed used tire 111N. The aspects of the tire changing system 100 provides for a single vehicle service technician 199 to simultaneously monitor the changing of more than one tire on the same or different vehicles addressing the problems noted above. The aspects of the tire changing system 100 described herein generally limit vehicle service technician 199 interaction with the vehicle(s) 110 and/or tire changing apparatus (e.g., tire changing machines, tire balancers, etc.) and substantially eliminates lifting of wheel assemblies 111 by the vehicle service technician 199. This allows the vehicle service technician 199 to work in a less labor intensive environment and interact with the tire changing system 100 when necessary (e.g., such as to deliver vehicles 110 to/from the tire changing system 100, provide replacement tires 110TN or other supplies (valve stems, valve caps, lubricants, cleaning solutions, etc.) to the tire changing system 100, perform maintenance on components of the tire changing system, etc.). The aspects of the tire changing system 100 also eliminate the need to lift the vehicle 110 to heights that would be ergonomic for the vehicle service technician 199 to remove and install the wheel assembly 111 from and to the vehicle 110. Here the vehicle 110 only need be lifted (or a normal force be removed from the wheel assembly 111) to a height that the tire 111T no longer contacts a traverse surface on which the vehicle 110 was moving so that suitable clearance is provided around the tire 111T to facilitate removal of the wheel assembly 111 from the vehicle or removal of the tire 111T from the wheel 111W.

Still referring to FIGS. 1A-1B, the tire changing system 100 is configured to change one or more tires with the wheel 111W remaining on (i.e., in-situ) the vehicle 110 and/or with the wheel 111W removed from the vehicle 110. The tire changing system 100 includes at least one tire changing station 101, noting that multiple tire changing stations may be provided so that multiple vehicles 110 can be processed simultaneously by a single vehicle service technician 199. The autonomous configuration of the tire changing system provides for the processing of multiple vehicles 110 by a single vehicle service technician 199 and with minimal intervention by the vehicle service technician 199 in the tire changing process. Generally, the tire changing station 101 includes a vehicle component balancing robot apparatus 189 for on vehicle balancing of one or more of a tire 111T, a wheel 111W, bearings 111B (e.g., wheel bearings), brake components 111RD (e.g., including but not limited to brake drums 111D and brake rotors 111R), and vehicle components 111C that impart, e.g., with the vehicle 110 in motion, vibrations to the vehicle 110 (e.g., such as by, but not limited to, imparting eccentric forces to a wheel hub 110H (see FIG. 1B) of the vehicle 110). The vehicle component balancing robot apparatus 189 includes a frame 189F arranged so as to connect with the vehicle 110. At least one autonomous traverse tire changing bot 120 (referred to herein for convenience as "bot 120", also referred to herein as a robot) is connected to the frame 189F. The frame 189F may be any suitable frame (e.g., a platform, surface, or otherwise) that directly or indirectly connects the bot 120 and vehicle 110 for tire changing operations. It should be understood that reference to an autonomous traverse tire changing bot 120 does not preclude inclusion of more than autonomous traverse tire changing bot as will be described in greater detail herein. For example, some aspects of the present disclosure (see FIGS. 2A, 2B, and 2D) include more than one separate and/or independent and cooperative bots 120, cooperating to effect a tire change (though in some aspects a single robot directly effects the tire change). In some aspects, there are multiple bots 120 configured for respective tasks. For example, one bot 120 is configured for wheel assembly 111 or tire 111T removal, another bot 120 is configured for lug nut/bolt removal, or any other process of the tire change as indicated by, for example, the tools 129A-129Q described herein and described in U.S. Pat. No. 11,446,826 issued on Sep. 20, 2022 and titled "Autonomous Traverse Tire Changing Bot, Autonomous Tire Changing System, and Method Therefor," and U.S. provisional patent application No. 63/354,591 titled "Autonomous Tire and Wheel Balancer and Method Therefor" and filed on Jun. 22, 2022, the disclosures of which are incorporated herein by reference in their entireties.

As will be described herein, the bot 120 has at least one degree of freedom (such as along traverse path 299 and/or along any one or more axes of motion of the bot 120) so as to move, in the at least one degree of freedom, relative to the frame 189F. The bot 120 is configured so that the move, relative to the frame 189F in the at least one degree of freedom, resolves a predetermined location of the wheel assembly 111 relative to a reference frame RREF of the bot 120. For example, the bot 120 may be configured to employ one or more of a vision sensor, an ultrasonic sensor, and a proximity sensor (generally referred to herein as proximity sensor 129N) as described herein for resolving the predetermined location (see FIGS. 1B and 2A-22D) of the wheel assembly 111 relative to the reference frame RREF of the bot 120. The predetermined location of the wheel assembly 111 determines a frame of reference of the wheel assembly WREF relative to the reference frame RREF of the bot 120.

Figure 2A:
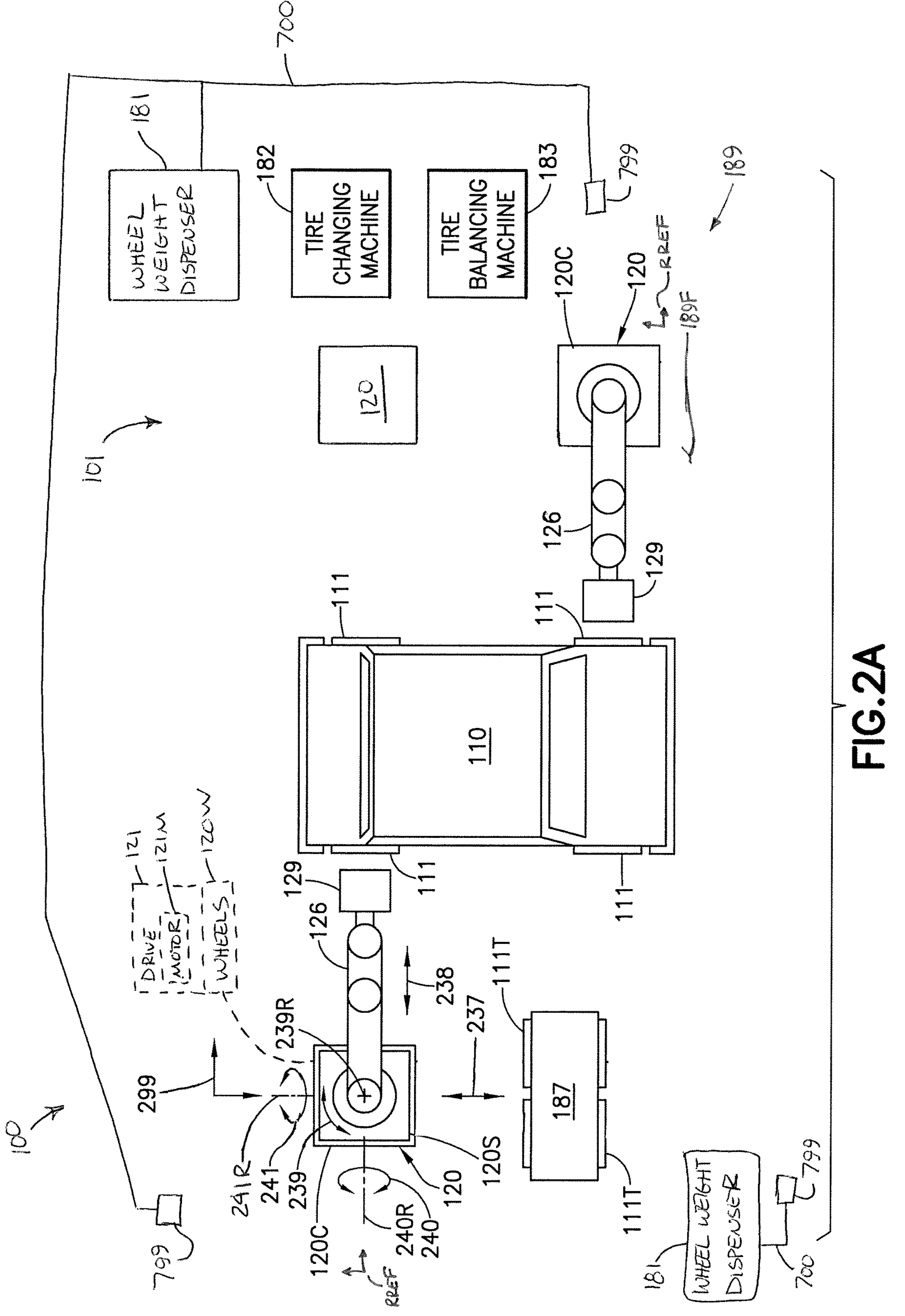
FIG. 2A is another schematic illustration of the automated tire changing system of FIGS. 1A and 1B in accordance with the present disclosure.
Figure 2B:
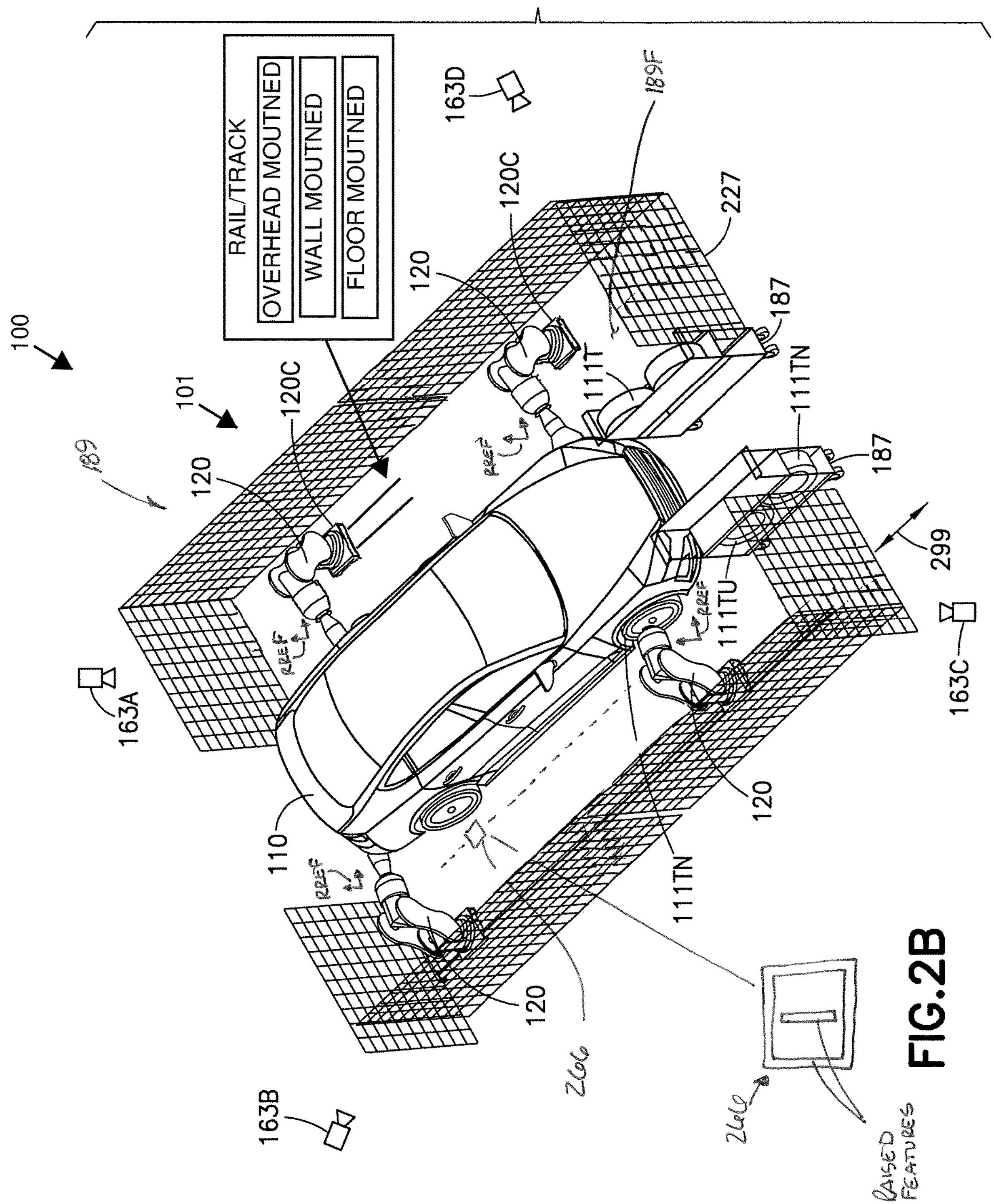
FIG. 2B is still another schematic illustration of the automated tire changing system of FIGS. 1A and 1B in accordance with the present disclosure.

Referring still to FIGS. 1A-1B, the bot 120 includes a bot frame 125 that includes or is coupled/mounted to a base or carriage 120C. In one aspect, the carriage 120C is a stationary carriage having a frame 120F that facilitates fixing the bot 120 in a stationary location at a tire changing station 101 (such as adjacent a wheel assembly 111 mounted on the vehicle 110—see FIGS. 2A-2D). In other aspects, the carriage 120C is any suitable carriage that facilitates traverse of the bot 120 as described herein. For example, as illustrated in FIG. 2A, the carriage 120C may be a wheeled carriage that includes a carriage frame 120F, wheels 120W (shown in dashed lines) supporting the carriage frame 120F, and a carriage drive section 121 (shown in dashed lines).

For exemplary purposes only, the carriage drive section 121 (whether wheeled or otherwise) includes at least one motor 121M that defines at least one degree of freedom powering at least one of the wheels 120W (or rotating a ball-screw, etc.) effecting autonomous traverse of the carriage 120C, along a traverse path 299 (see, e.g., FIGS. 2A-2D), relative to a traverse surface or a floor 198 on which the bot 120 rests in a manner similar to that described in U.S. Pat. No. 11,446,826 issued on Sep. 20, 2022 and titled "Autonomous Traverse Tire Changing Bot, Autonomous Tire Changing System, and Method Therefor," previously incorporated herein by reference in its entirety. As will be described herein, the traverse path 299 along which the bot travels is in one or more aspects, a path around the entire vehicle 110 or a path around a portion of the vehicle 110, where the traverse path may depend on a number of bots 120 included in the tire changing system 100. For example, where there are two bots 120 each bot traverses along a respective side (e.g., driver or passenger side) of the vehicle 110. As another example, where there are two bots 120 on a common side of the vehicle 110 (e.g., either the driver or passenger side) each bot 120 traverses along a respective portion of the common side of the vehicle 110.

The traverse path (such as traverse path 299 in FIG. 2A) may be defined in any suitable manner, such as through non-contact bot guidance on an undeterministic travel surface (i.e., without physical constraints guiding movement of the bot 120). Where the bot 120 travels on an undeterministic travel surface the wheels 120W are configured in any suitable manner so as to provide the carriage 120C with both linear traverse and rotational movement. For example, one or more of the wheels 120W may be steerable or the wheels may be holonomic wheels (such as Mecanum wheels, Omni wheels, or poly wheels). In other aspects, traverse of the carriage 120C may be effected on (where the wheels are replaced or supplemented by) sliding elements such as rails and/or tracks, that include, but are not limited to, guide rod and sleeve bearings, or any other guide system for effecting linear traverse and/or rotational motion of the carriage 120C. The rails and/or tracks may provide for, including but not limited to, the carriage 120C being suspended or dependent from an overhead gantry or wall, with traverse of the carriage 120C in both vertical and horizontal directions (see FIG. 2B). In other aspects, the carriage 120C may be mounted on the may be mounted to the floor, mounted to any suitable traverse carriage, or may be mounted on a turret carriage configured to traverse with at least one degree of freedom.

In one or more aspects, the entire bot 120 may align itself in one or more degrees of freedom with respect to the vehicle 110, the wheel assembly 111, the wheel 111W, the tire 111T or any other component of the tire changing system 100 to perform a tire changing operation. For exemplary purposes only, a center of rotation of the tire bead breaker tool 129H (described herein) is substantially aligned with a center of rotation of the wheel assembly 111 and the plane in which the tire bead breaker tool 129H acts is set so as to be substantially parallel to the rotational axis of the wheel assembly 111. Where the carriage 120C includes steerable or holonomic wheels, this positional adjustment of the tire bead breaker tool 129H is accomplished, at least in part, by controlling the wheels for positioning the bot 120 along one or more of the following directions:

linear direction 237 extending substantially parallel to both the floor 198 and the vehicle 110 and extending lengthwise (from front to back) relative to the vehicle 110; and linear direction 238 extending substantially perpendicular to the vehicle 110 and substantially parallel to the floor 198.

The carriage 120C, whether fixed or wheeled, may also include a movement stage 120S that coupled to the frame 120F so as to move in at least direction 238 relative to the frame 120F. For example, the movement stage 120S is coupled to the frame 120F by stage guide rails having any suitable drive that provides the movement stage 120S with linear movement in direction 238. The carriage 120C may include one or more rotational couplings that couple a movement stage 120S to the frame 120F. These one or more rotational couplings include any suitable drives for moving the movement stage 120S in one or more of the following directions:

rotational direction 239 having an axis of rotation 239R extending substantially perpendicular to the floor;

rotational direction 240 having an axis of rotation 240R extending substantially parallel with the floor 198; and rotational direction 241 having an axis of rotation 241R extending substantially parallel with the floor 198.

In some aspects, a vertical drive may be provided to move the movement stage 120S (and/or the frame 120F) vertically to raise or lower the movement stage 120S (and/or the frame 120F). As such, the movement stage 120S may be provided with five or six degrees of freedom (in other aspects there may be more than six or less than five degrees of freedom) for aligning the bot 120 with respect to the vehicle 110, the wheel assembly 111, the wheel 111W, the tire 111T or any other component of the tire changing system 100 to perform a tire changing operation.

The bot frame 125 includes at least one actuator 126 (or arm which may be configured as linear extension/retraction slide, an elongated member, a rod, a linear actuator, a rotary actuator, an articulated actuator, a telescopic actuator or any suitable combination thereof) and a bot drive section 127. The at least one actuator 126 is a driven actuator that is driven so as to extend along or in the at least one degree of freedom of the bot 120 between a retracted position and an extended position, the extended position locating an (i.e., at least one) end effector 128 (and a distal end 120D at which the end effector 128 is located) of the actuator 126 proximate a wheel assembly 111. In one or more aspects, the at least one actuator 126 may be any suitable multi-axis actuator available from such manufacturers as Fanuc Robotics Company, Kuka Automation Company, and Yaskawa Electric Corporation. In one or more aspects the at least one actuator 126 has a bespoke actuator configuration with any suitable number of axes or degrees of freedom. The at least one actuator 126 (whether commercially available or bespoke) has any suitable number of degrees of freedom for effecting a tire change as described herein. For example, the at least one actuator 126 is a one axis actuator, a two axis actuator, a three axis actuator, a five axis actuator, a six axis actuator, a seven axis actuator, nine axis actuator, or an actuator with any other suitable number of axes or degrees of freedom. In one or more aspects, as described herein, the bot 120 has more than one actuator 126, 126A where, in one or more aspects, the different actuators have different numbers of axes and/or different tire changing capabilities. The actuator 126 is driven by the bot drive section 127, where the bot drive section 127 includes at least one motor 127M that defines a bot actuator degree of freedom, separate and distinct from the at least one degree of freedom powering the traverse path 299 axis of the bot 120 (e.g., the degree of freedom powering the at least one of the wheels 120W, ball screw rotation, etc.).

The actuator 126 has an end effector 128 arranged to interface the wheel assembly 111 and the bot 120 moves the end effector 128 to other predetermined locations on the wheel 111W of the wheel assembly 111, determined based on resolution of the predetermined location of the wheel assembly 111 relative to the reference frame RREF of the bot 120. The other predetermined locations on the wheel 111W are wheel balancing weight locations (see FIGS. 5A-5C) resolving imbalance of the one or more of the tire 111T, the wheel 111W, the bearings 111B, the brake components 111RD (e.g., including but not limited to the brake drums 111D and the brake rotors 111R), and the vehicle components 111C that impart, e.g., with the vehicle 110 in motion, vibrations to the vehicle 110 (e.g., such as by, but not limited to, imparting eccentric forces to the wheel hub 110H (see FIG. 1B)). As described herein, the end effector 128 interfaces the wheel assembly 111 at the other predetermined locations so as to effect a balancing solution of the one or more of the tire 111T, the wheel 111W, the bearings 111B, the brake components 111RD, and the vehicle components 111C via robotic application of wheel balancing weights 400 with the end effector 128.

The end effector 128 includes a wheel or tire engagement tool 129 disposed so that articulation of the at least one actuator 126 with the bot actuator degree of freedom effects engagement contact of the wheel or tire engagement tool 129 and a wheel 111W or a tire 111T mounted on the vehicle 110. The actuator movement axis/axes AX1-AX6 defined by movement of the at least one actuator 126 with the bot actuator degree of freedom is separate and distinct from the traverse path 299 along which the carriage 120C (in wheeled form) traverses. As described herein, the aspects of the present disclosure provide for automated control of fully dynamic pose of the carriage 120C (at least along one drive axis) of the carriage 120C) so that movement of the at least one actuator 126 (along a different drive axis than the drive axis of the carriage 120C) engages any suitable tool (such as those described herein) coupled to the end effector 128 of the at least one actuator 126 to a variably positioned wheel 111W and/or tire 111T on the vehicle 110.

Referring to FIGS. 1A-1B, in accordance with one or more aspects of the present disclosure the wheel or tire engagement tool 129 includes one or more of a wheel assembly grip 129A, a valve stem cap installation tool 129B, a valve stem cap removal tool 129C, a tire deflation tool 129D, a tire mounting/dismounting tool 129E, a valve core installation tool 129F, a valve core removal tool 129G, a tire bead breaker tool 129H, a wheel cleaning tool 129I, a lug wrench 129J, a tire balancing bead dispenser 129K, a tire inflation tool 129L, and a tire balancer 129M, suitable examples of which are provided in U.S. Pat. No. 11,446,826 issued on Sep. 20, 2022 and titled “Autonomous Traverse Tire Changing Bot, Autonomous Tire Changing System, and Method Therefor,” and U.S. provisional patent application No. 63/354,591 titled “Autonomous Tire and Wheel Balancer and Method Therefor” and filed on Jun. 22, 2022, the disclosures of which were previously incorporated herein by reference in their entireties. In accordance with one or more aspects of the present disclosure the wheel or tire engagement tool 129 also includes a proximity sensor 129N, a wheel weight installation tool 1290, a wheel weight gripper 129P (also referred to herein as a wheel balancing weight grip), a wheel weight dispenser 129Q, and/or any other suitable tool that effects changing a tire 111T. The wheel weight installation tool 1290 and wheel weight gripper 129Q each form a compliant end effector that, as described herein, interfaces the wheel assembly 111 determining a wheel or rim location (e.g., relative to a reference frame RREF of the bot 120, 120WR) of the wheel 111W of the tire wheel assembly 111 and predetermined locations (such as wheel weight locations on the wheel 111W) so as to effect a balancing solution of the one or more of the tire 111T, the wheel 111W, the bearings 111B, the brake components 111RD (e.g., including but not limited to the brake drums 111D and the brake rotors 111R), and the vehicle components 111C that impart, e.g., with the vehicle 110 in motion, vibrations to the vehicle 110 (e.g., such as by, but not limited to, imparting eccentric forces to the wheel hub 110H (see FIG. 1B)) via robotic application of wheel balancing weights 400 with the compliant end effector. In one or more aspects, the above-noted tools are stored on any suitable tool holder 134 carried by the carriage 120C or located off-board the bot 120 at a location within the tire changing station 101 that is accessible by the at least one actuator 126.

In one or more aspects, the above-noted tools are interchangeable/swappable with each other so that the end effector 128 places one and picks up another different tool for performing tire changing tasks. For example, the bot 120 includes a controller 160 that is configured to command the at least one actuator 126, based on a task to be performed, to automatically exchange one tool for another, such as through articulation of the at least one actuator 126 the end effector 128 places a tool (e.g., such as the tire bead breaker tool 129H) at the tool holder 134 and then picks another different tool from the tool holder (e.g., such as tire inflation tool 129L) for performing a subsequent step in the tire change process.

In other aspects, the bot 120 includes more than one actuator 126, 126A (two actuators are shown in FIGS. 1A-1B for exemplary purposes, but in other aspects there may be more than two actuators). Each of the more than one actuator 126, 126A has a different respective actuator movement axis (noting each actuator 126, 126A includes respective axes AX1-AX6 of articulation for exemplary purposes only), and a different respective end effector 128, 128A disposed for working on the wheel 111W or tire 111T mounted on the vehicle 110 (or off the vehicle). Here, in one or more aspects, each actuator 126, 126A holds a different one of the tools noted above (e.g., there may an actuator 126 for each tool, noting that in some aspects, the tools are also exchangeable so that one actuator 126 is common to a number of tools that are selectably coupled (such as by employing a tool changer—see FIG. 1B) to the common actuator 126, as noted above). Further, the above-noted tools are combined, in some aspects, so that a single combination tool performs several tasks. For example, in one aspect, the wheel weight dispenser 129Q, the wheel weight gripper 129P, the wheel weight installation tool 1290, and/or the proximity sensor 129N may be combined, where when combined (in any suitable combination) the proximity sensor 129N provides for one or more of the wheel weight dispenser 129Q, the wheel weight gripper 129P and/or the wheel weight installation tool 1290 determining a location of the wheel assembly 111 relative to the reference frame RREF of the robot 120, 120WR. In other aspects, one or more of the wheel weight dispenser 129Q, the wheel weight gripper 129P and/or the wheel weight installation tool 1290, and the proximity sensor 129N may be combined with one or more of the wheel assembly grip 129A, the a valve stem cap installation tool 129B, a valve stem cap removal tool 129C, a tire deflation tool 129D, a tire mounting/dismounting tool 129E, a valve core installation tool 129F, a valve core removal tool 129G, a tire bead breaker tool 129H, a wheel cleaning tool 129I, a lug wrench 129J, a tire balancing bead dispenser 129K, a tire inflation tool 129L, a tire balancer 129M, and/or any other suitable tool that effects changing a tire 111T (noting any other combinations of the various tools may be effected and are within the scope of the present disclosure).

Figure 3:
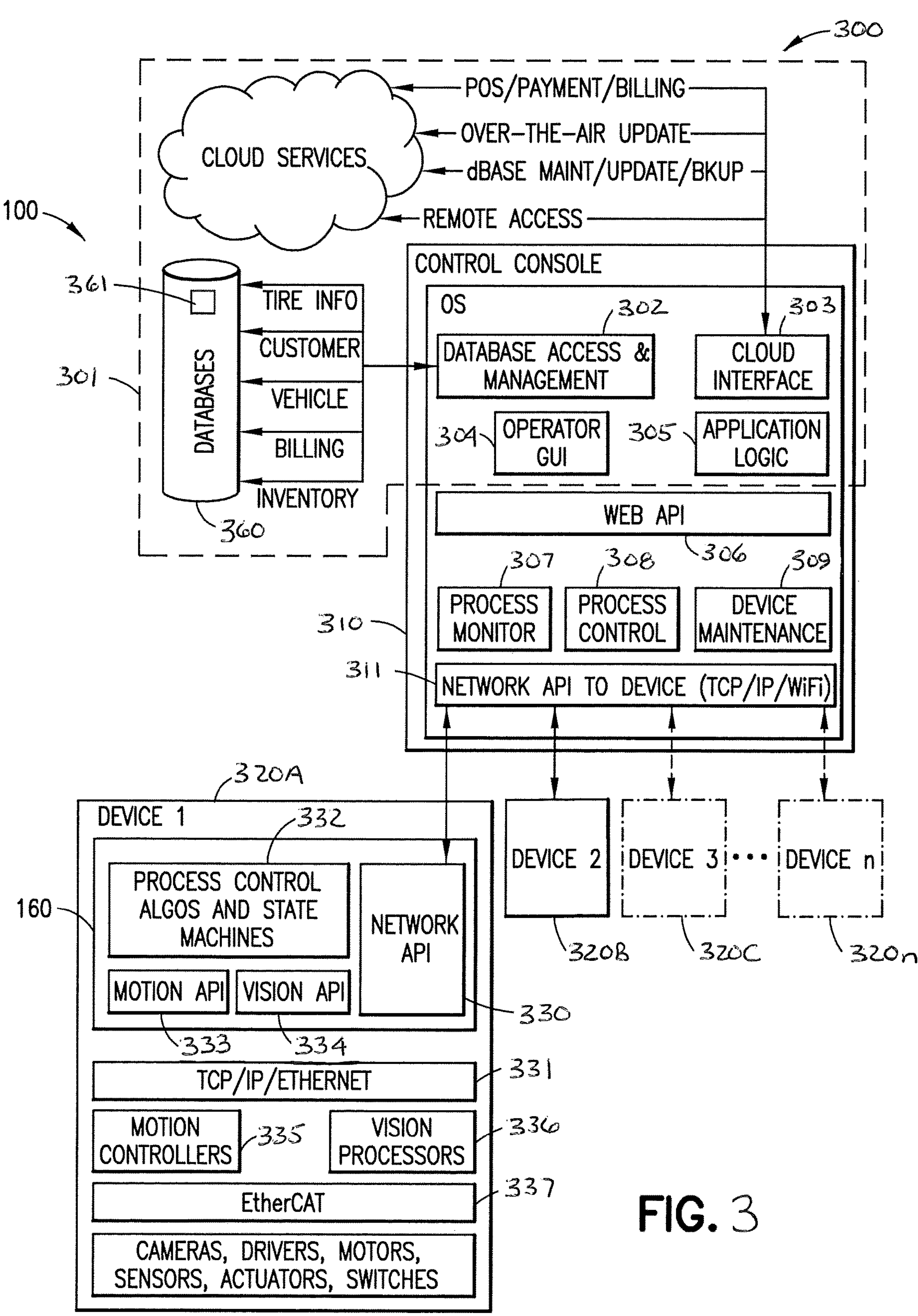
FIG. 3 is a schematic block diagram of the automated tire changing system of FIGS. 1A and 1B in accordance with the present disclosure.

The controller 160 is also configured to control the drives of the bot 120 (e.g., drives of the actuator 126 and carriage 120C that effect movement of the actuator 126 and carriage 120C as described herein) to position the carriage 120C relative to the vehicle 110, another bot 120 or other component (e.g., tire balancer, tire changing machine, cart, etc.) of the tire changing system 100. Referring also to FIG. 3, the controller 160 includes a network application interface 330 and a communication module 331 (configured as a hardware or software module) so that the bot 120 communicates with the control console 310 and/or cloud based services (e.g. such as for bot software updates). The controller 160 is programmed with process control algorithms and state machines 332 to effect the operation of the bot 120 as described herein. A motion application interface 333 and vision application interface 334 are also provided in the controller 160 so that the process control algorithms and state machines 332 interface with motion controllers 335 and vision processors 336 of the bot 120. The bot 120 includes any suitable onboard communications network 337 (such as an EtherCAT or other suitable network) that communicably couples the cameras, drives, motors, sensors, actuators, switches, etc. (as described herein) of the bot 120 to a respective motion controller 335 or vision processor 336. While the controller 160 of the bot 120 was described, it should be understood that controllers of the other tire changing system 100 devices 320A-320*n* are substantially similar to the controller 160.

Referring to FIGS. 1A-1B and 3 a control architecture 300 of the tire changing system 100 will be described. The control architecture of the tire changing system 100 generally includes a business and application logic portion 301, a control console 310, and one or more tire changing system devices 320A-320*n* (where n is an integer that denotes an upper numerical limit to the number of tire changing system devices in the tire changing system 100). The control console 310 includes any suitable processors and memory for controlling aspects of the tire changing system 100 as described herein (noting the memory is any suitable memory accessible by the processors such as a memory resident within the tire changing system 100 or a cloud based memory as described herein), and is communicably connected (e.g., wirelessly, through wires, is carried by, or remotely located) to the devices 320A-320*n*. The one or more tire changing system devices 320A-320*n* are any one or more of the devices described herein (i.e., bots 120, automated or semi-automated tire changing machines 182, automated or semi-automated tire balancing machines 183, tire storage racks/carts 187, wheel weight dispensers 181, barriers, etc.). The one or more tire changing system devices 320A-320*n* are in one aspect assigned to a single tire changing station 101 (such as where the service facility has a single service bay), or in other aspects, some of the tire changing system devices 320A-320*n* are assigned to one tire changing station 101 and other ones of the tire changing system devices 320A-320*n* are assigned to another tire changing station 101 (such as where the service facility has more than one service bay).

As can be seen in FIG. 3, a portion of the business and application logic portion 301 overlaps with a portion of the control console 310; however in other aspects there may not be any overlap. For exemplary purposes, a portion of the business and application logic portion 301 is resident in the control console 310. The business and application logic portion 301 is configured with any suitable operating system (OS) configured (e.g., programmed with non-transitory computer readable code executed on any suitable processor of the control console 310) to facilitate one or more of local services and cloud based services. The control console 310 includes a database access and management module 302 (which may be configured as a hardware or software module), a cloud interface module 303 (which may be configured as a hardware or software module), an operator graphical user interface 304, and an application logic module 305 (which may be configured as a hardware or software module) that are shared with the business and application logic portion 301.

The operator graphical user interface 304 is configured (e.g., programmed with non-transitory computer readable code executed any suitable processors and memory) to facilitate operator input and control (e.g., both operational control for tire changing services and administrative services (e.g., billing, software updates, database entry, billing, inventory, etc.) control) of the tire changing system 100. The database access and management module 302 is in communication with operator graphical user interface 304 and any suitable database (s) 360 and facilitates access to and storage of information including, but not limited to tire information, customer information, vehicle information, billing information, and inventory and relationships between the various information (i.e., each customer or vehicle has a respective record that includes respective tire information, respective billing information, etc.). The cloud interface module 303 is configured (e.g., programmed with non-transitory computer readable code executed any suitable processors and memory) to provide an interface between the control console and one or more cloud services. It is noted that reference to cloud services herein pertains to cloud computing which is known as the on-demand availability of computer system resources, especially data storage and computing power, without direct active management by the user and generally refers to data centers available to many users over the Internet. These cloud services include but are not limited to remote access to the tire changing system 100, point of service payment and billing, and over-the-air software updates to components of the tire changing system 100. The application logic module 305 is configured to at least interface the operator graphical user interface 304, the database access and management module 302, and the cloud interface module 303 with each other.

The control console 310 also includes a Web application interface 306, a process monitor module 307 (which may be configured as a hardware or software module), a process control module 308 (which may be configured as a hardware or software module), a device maintenance module 309 (which may be configured as a hardware or software module), and a network application interface to device module 311 (which may be configured as a hardware or software module). The Web application interface 306 is configured (e.g., programmed with non-transitory computer readable code executed any suitable processors and memory) to provide access, e.g., for the operator graphical user interface and/or other modules of the control console, to a web server and/or web browser (e.g., for accessing the cloud services). The process monitor module 307 is configured to (e.g., programmed with non-transitory computer readable code executed any suitable processors and memory) monitor (e.g., by sending data to and receiving data from the devices 320A-320*n* indicating a tire change process has started, has ended, or paused due to error) the tire changing process as described herein and provide feedback to the process control module 308. The process control module 308 is programmed (e.g., programmed with non-transitory computer readable code executed any suitable processors and memory) to issue commands to the devices 320A-320*n* controlling the process flow for a tire change so that tire change operations are performed in a predetermined sequence that may depend on the type of tire change and tire change services requested. The device maintenance module 309 is programmed (e.g., programmed with non-transitory computer readable code executed any suitable processors and memory) to monitor a health of the devices 320A-320*n* and provide maintenance alerts to the operator through the operator graphical user interface 304. The network application interface to device module 1011 is configured to provides a wired or wireless interface between the components of the control console and the devices 320A-320*n*.

In the aspect illustrated in FIGS. 1A-1B the control console 310 is disposed on the floor 198 and is remotely connected (through either a wired or wireless connection) to the devices 320A-320*n*. Referring to controller 160 of the bot 120, for exemplary purposes, the controller 160 (including suitable processors and memory 161 for controlling operations of the bot 120 as described herein) is in communication with the control console 310 and is communicably connected (e.g., wirelessly, through wires, is carried by, or remotely located) to the bot drives so as to effect operation of the bot 120 for wheel changing operations, and in some aspects traverse of the bot 120 along the traverse path 299 effecting dynamic positioning of the at least one actuator 126. In some aspects, the wheel changing operations employing one or more vision systems 130, 162 and respective cameras 131, 163, 163A, 163B, 163C, 163D (see also FIG. 2B) to locate to a variable position of the vehicle 110 with the wheel 111W or tire 111T mounted thereon relative to the bot 120. Suitable examples of vision systems that may be employed herein can be found in U.S. Pat. No. 11,446,826 issued on Sep. 20, 2022 and titled "Autonomous Traverse Tire Changing Bot, Autonomous Tire Changing System, and Method Therefor," previously incorporated herein by reference in its entirety. For example, in a service facility the vehicle service technician 199 drives the vehicle 110 into a service bay. As may be realized, there is nothing to locate the vehicle 110, in the service bay, at any particular location (e.g., the vehicle may never be located in the same place twice) such as would be the case in a vehicle assembly line where the vehicle is carried by a conveyor and stopped at designated/predetermined positions (with respect to assembly automation) for assembly operations. Moreover, vehicles that are serviced in service facilities have varying wheel bases, varying wheel tracks, varying ride heights, varying camber, varying caster, etc. from vehicle to vehicle (e.g., many different makes and models of vehicles are serviced in the same service bay in any given amount of time one after the other), unlike in a vehicle assembly line where assembly operations are performed on the same make and model vehicle. As such, in service facility operations, within any given service bay (e.g., tire changing station 101), the vehicle 110 (and the components thereof) has a dynamically varying position (that changes from vehicle to vehicle, or even for the same vehicle each time that vehicle is driven into and parked within the service bay) with respect to the tools/machines within the tire changing station 101. Here, the positioning of the at least one actuator 126 relative to the variable position of the vehicle 110 with the wheel 111W or tire 111T mounted thereon is disposed so that articulation of the at least one actuator 126 engages the wheel or tire engagement tool 129 to the wheel 111W or tire 111T on the vehicle 110 in the variable position.

Figure 2C:
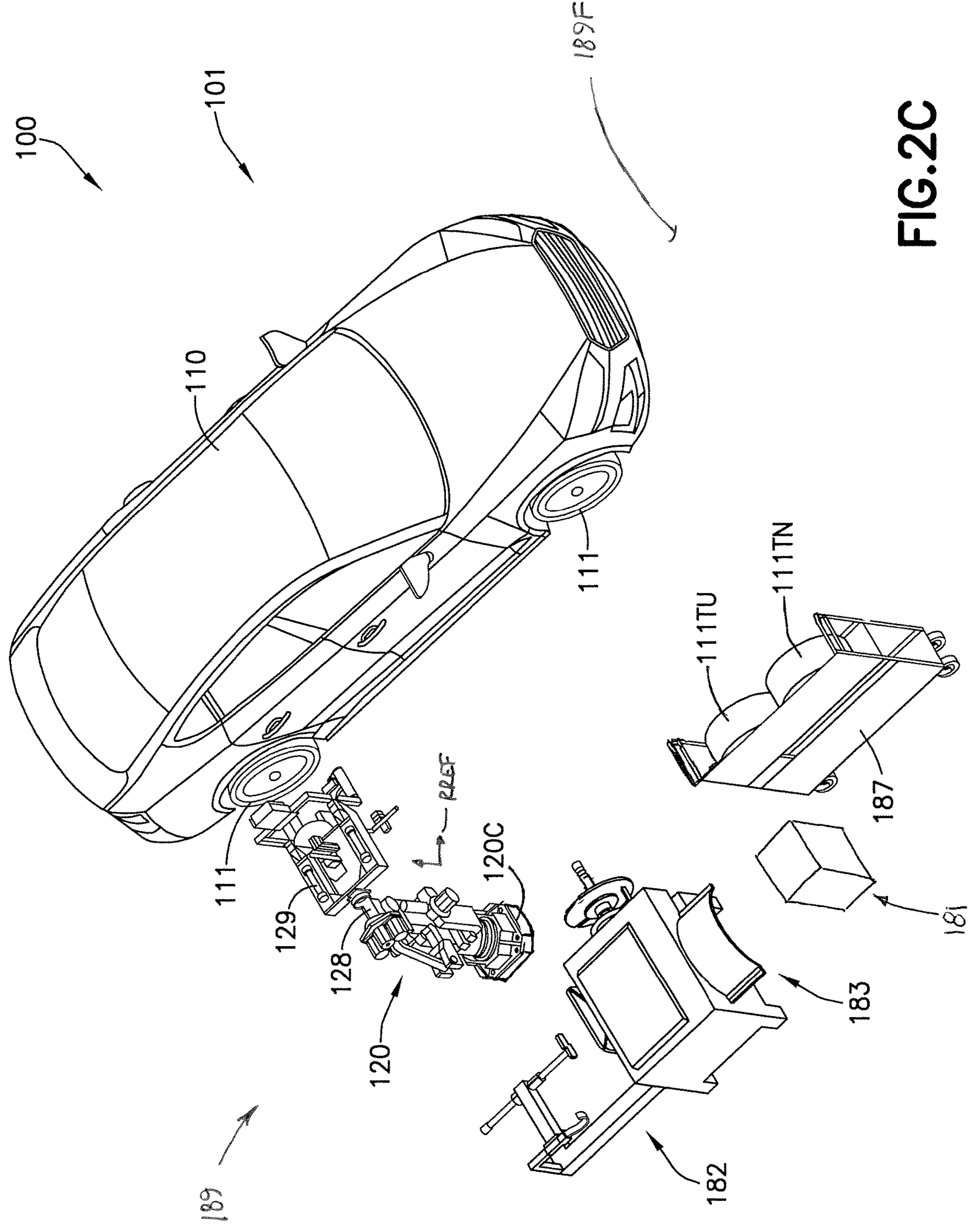
FIG. 2C is yet another schematic illustration of the automated tire changing system of FIGS. 1A and 1B in accordance with the present disclosure.
Figure 2D:
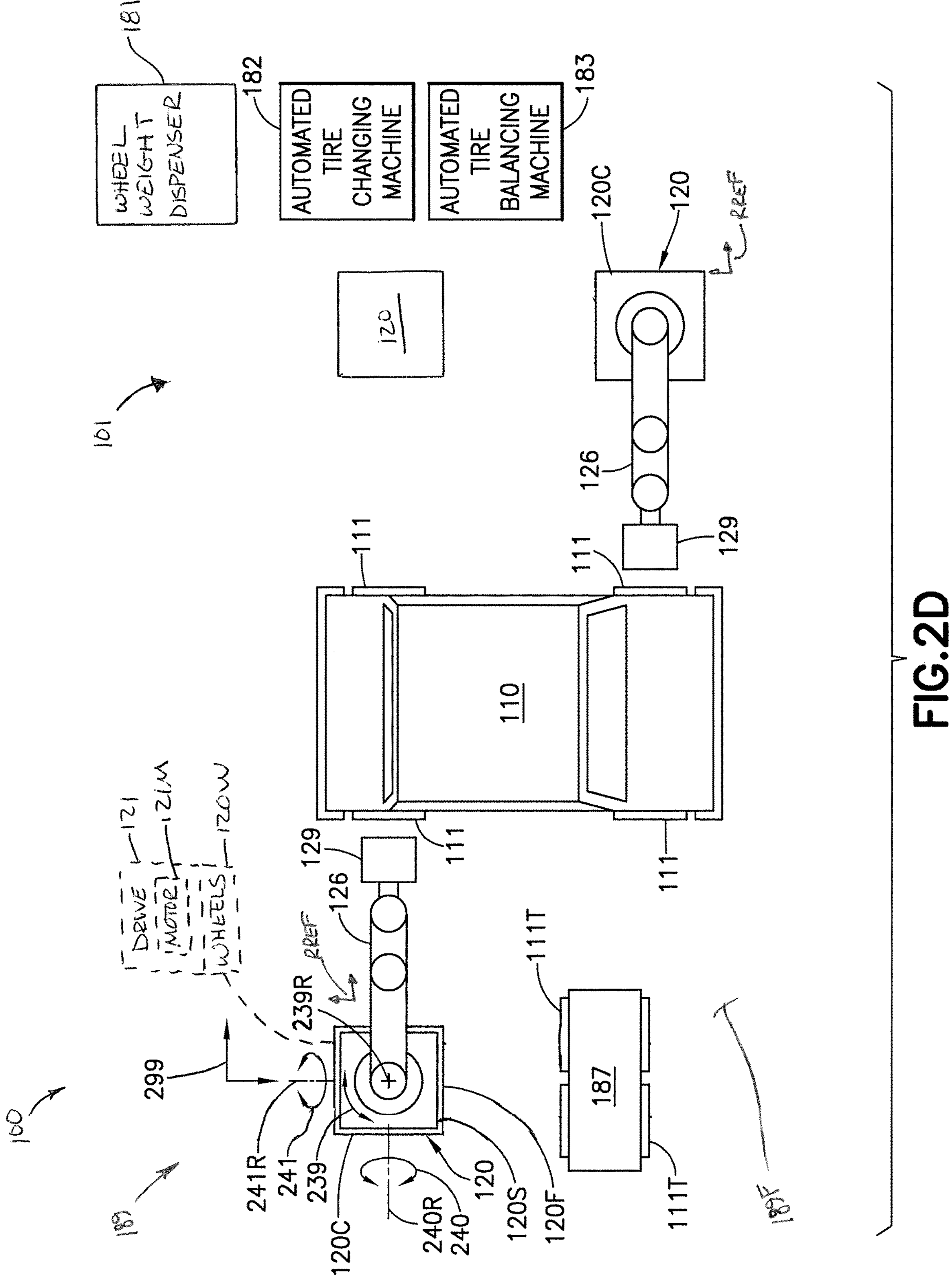
FIG. 2D is another schematic illustration of the automated tire changing system of FIGS. 1A and 1B in accordance with the present disclosure.

Referring also to FIGS. 1A-1B, in the example illustrated in FIG. 2C, the tire changing system 100 includes automated or semi-automated tire changing machine (s) 182 and automated or semi-automated tire balancing machine(s) 183 where the bot 120 is configured to remove a wheel assembly 111 from the vehicle and transport the wheel assembly 111 to the tire changing machine 182. Here, the end effector 128, with the wheel or tire engagement tool 129 coupled thereto, on articulation of the at least one actuator 126 is configured to place the wheel 111W, with the tire 111T mounted thereto, on the automated (or semi-automated) tire changing machine. In the case of removing the tire 111T from the wheel 111W, the bot end effector 128 is configured to remove the tire 111T (e.g., a used or old tire 111TU), uninstalled from the wheel 111W by the automated (or semi-automated) tire changing machine 182, from the tire changing machine 182. In the case of installing the tire 111T to the wheel 111W, the end effector 128 is configured to place another tire 111T (e.g., a replacement tire 111TN) on the automated (or semi-automated) tire changing machine 182 for installation of the other tire 111TN to the wheel 111W by the tire changing machine 182. The end effector 128, with the wheel or tire engagement tool 129 coupled thereto, on articulation of the at least one actuator 126 is configured to place the wheel 111W, with the other tire 111TN mounted thereto, on the automated (or semi-automated) tire balancing machine 183. Here, in one or more aspects, one of the robotic actuators 126, 126A picks wheels weights from a hopper and applies them to the wheel in locations identified by the tire balancing machine 183. Once balanced the wheel assembly 111 may be installed on the vehicle 110 by the bot 120.

As may be realized (and shown in FIGS. 1A-1B, 2A, and 2D) the tire changing system 100 is configured, in some aspects, to provide both in situ tire changes with the wheel 111W mounted in situ on the vehicle 110 and tire changes performed by the tire changing machine(s) 182 and tire balancing machine(s) 183 with the wheel 111W removed (i.e., located off of) the vehicle 110. The configuration of the tire changing system 100 between in-situ tire changes and tire changes with the wheel 111W removed from the vehicle may be effected through the control console 310. For example, as noted above, the vehicle service technician 199 may select an in-situ tire change and/or a tire change with the wheel 111W removed from the operator graphical user interface 304. The operator graphical user interface 304, in one aspect, is also configured to allow the vehicle service technician 199 to select which tires (e.g., passenger front, passenger rear, drive front, or drive rear) are to be changed in-situ or by removing the wheel 111W so that in-situ and removed wheel tire changes are performed on a common vehicle.

The control console 310 is also configured, such as through inputs on the operator graphical user interface 304, so that the vehicle service technician 199 selects which tire change operations are to be performed. For example, the vehicle service technician 199 may select, and the control console 310 is configured to effect such selection, a type of balancing to be performed on a tire (e.g., wheel weights, tire beads, etc.), whether a valve core is replaced, which tires are to be replaced, the make/model/size of tire to be installed, whether some tire change operations are to be performed manually or in a semi-autonomous manner, etc. In some aspects, there are pre-programmed tire change routines 361 corresponding to a respective type of vehicle (car, truck, sports car, make, model, etc.), a respective type of wheel or tire, and or a respective customer that are stored in a memory such as database 360. These pre-programmed tire change routines 1061 are selectable by the vehicle service technician 199 through, for example, the operator graphical user interface 304 and specify a tire change recipe (which tire change processes are to be performed and whether or not one or more tires are changed in-situ or changed by removing the wheel).

Referring to FIGS. 1A-1B, 2A-2C, and 5-8, in one aspect, the automated tire changing system 100 includes supply carts 187 configured to hold tires 111T, wheels 111W, and or wheel assemblies 111. In one or more aspects, one or more of the supply carts 187 are manual carts that are moved from location to location by, for example, the vehicle service technician 199. In one or more other aspects, one or more of the carts 187 is an automated cart having a cart drive section 188, where the cart includes a controller 160' and memory 161', vision system 130', positioning sensors 132', and navigation system 163', which are substantially similar to the controller 160 and memory 161, vision system 130, positioning sensors 132, and navigation system 133 of a wheeled bot 120 (noting that manual and automated carts can be used alongside each other). Here, the cart autonomously navigates throughout the tire changing station 101 in a manner substantially similar to that described above with respect to bot 120. In still other aspects, one or more of the carts 187 (such as the manual cart) is configured to be towed by a wheeled bot 120 or an automated cart to a predetermined location within the tire changing station 101.

As may be realized, the automated tire changing system 100, in one or more aspects, includes fencing or other barriers 227 (see FIG. 2B) to substantially isolate the vehicle service technician 199 from the bots 120 and automated supply carts 187 when in operation. In some aspects, the barriers 227 have any suitable interlock devices that terminate power to specific axes of motion or all axes of motion of the bot 120 (and any other automation of the tire changing system 100) upon opening a door to the barrier 227 and/or entering the barrier 227. In other aspects, the bots 120 and automated supply carts 187 are configured to collaboratively operate with the vehicle service technician 199 so as to hand off tires 111T, wheels 111W, wheel assemblies 111, etc. to/from the vehicle service technician 199.

Figures 4A, 4B:
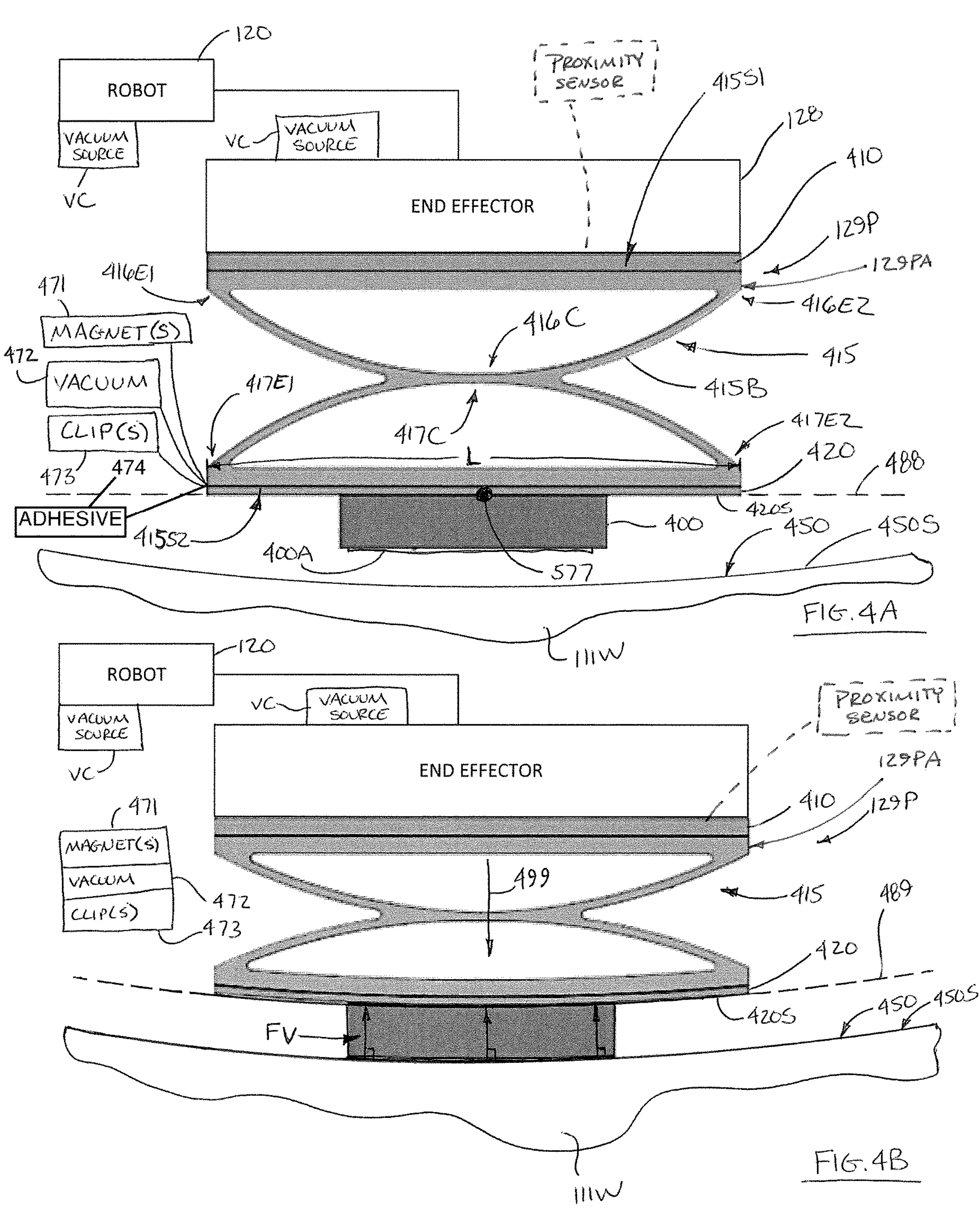
FIGS. 4A and 4B are schematic illustrations of a wheel weight installation tool of the automated tire changing system of FIGS. 1A and 1B in accordance with the present disclosure.

Referring to FIGS. 1, 4A, and 4B, as described herein, the automated tire changing system 100 is configured to install wheel weights 400 on a wheel 111W and/or on a wheel assembly 111 (a wheel 111W with a tire 111T mounted thereon, also referred to herein as a tire-wheel assembly) with the wheel 111W and/or wheel assembly 111 mounted on a vehicle 110. As also described herein, the robot 120 includes an end effector 128 configured to couple with the wheel weight gripper 129P (FIGS. 4A and 4B) and the wheel weight installation tool 1290 (FIGS. 5A-5C), where the wheel weight gripper 129P and the wheel weight installation tool 1290 are interchangeable/swappable with each other on the end effector 128 as described herein. The end effector 128 and/or the wheel weight gripper 129P and the wheel weight installation tool 1290 are configured in any suitable manner (such as in a manner similar to that illustrated and described with respect to, e.g., FIGS. 5A and 9B but such illustration is only exemplary and the configuration of the end effector and/or the structural connection between the end effector and the wheel weight gripper 129P and the wheel weight installation tool 1290 is not limited to what is illustrated) such that the wheel weight gripper 129P and wheel weight installation tool 1290 are inserted into the barrel 450 of the wheel 111W with the wheel 111W mounted on the vehicle 110 for application of the wheel weight 400. In other aspects, the robot 120 includes sufficient articulation to reach around the wheel assembly 111/wheel 111W for inserting the wheel weight gripper 129P and wheel weight installation tool 1290 into the barrel 450 for installation of a wheel weight 400 to the surface 450S of the barrel 450. In still other aspects, one or more wheel weight installation robot 120WR (see FIG. 1B) may be provided where the wheel weight installation robot is shaped and sized to travel (e.g., in manners similar to those described above with respect to robot 120) underneath the lifted vehicle 110 and access the barrel 450 of a wheel 111W for installing (or removing) wheel weights 400. The wheel weight installation robot 120WR includes a controller 120" similar to controller 160 of robot 120, where the controllers 120, 120', 120" (and any other suitable controller of the automated tire changing system 100) may be communicably connected to one another so as to pass information therebetween for cooperative operation of respectively controlled components of the automated tire changing system 100.

FIGS. 4A and 4B schematically illustrate the wheel weight gripper 129P coupled to the end effector 128 (or distal end 120D which comprises the end effector 128S) of robot 120. The wheel weight gripper 129P is a conformable or conforming wheel weight gripper that includes a resilient/compliant structure that conforms, from a relaxed configuration (as illustrated in FIG. 4A—shown where the flexible grip 420 is substantially straight or planar for exemplary purposes only, but in other aspects the flexible grip may have a curved shape in the relaxed configuration), to a surface of the wheel 111W onto which the wheel weight 400, carried by the wheel weight gripper 129P, is applied. The wheel weight gripper 129P includes resiliently compliant wheel balancing weight applicator 129PA having a rigid frame or base 410, a compliant support 415 (also referred to herein as a resiliently compliant wheel balancing weight applicator), and a flexible grip 420 (also referred to herein as a wheel balancing weight grip). The rigid base 410 is configured for coupling with the end effector 128 in any suitable manner, such as in accordance with the releasable couplings of the end effector 128. In some aspects, the wheel weight gripper 129P may be a unitary one piece member, while in other aspects the components of the wheel weight gripper 129P may be coupled to each other in any suitable manner (e.g., mechanically or chemically). In still other aspects, the wheel weight gripper 129P may be integral with the end effector 128. It is noted that the configuration of the wheel weight gripper 129P described herein is exemplary and the wheel weight gripper 129P may have any suitable compliant structure for adhering wheel weights to a wheel as described herein.

The compliant support 415 has a resilient body 415B that has a first side 415S1 and a second side 415S2. The first side 415S1 is coupled to the rigid base 410 in any suitable manner (e.g., mechanical or chemical fasteners, welding, brazing, over-molding the resilient body 415B over/on the rigid base 410 (or vice versa), or any other suitable manner) so that the rigid base 410 and resilient body 415B are carried together as unit by the robot 120. The compliant support 415 is illustrated as having an opposing leaf spring or opposing bow configuration for exemplary purposes only and in other aspects has any suitable configuration that provides for conformity and flexing of the flexible grip 420. In this example, the compliant support includes a first resilient leaf or bow 416 that is coupled at its ends 416E1, 416E2 to the first side 415S1. The first leaf 416 has a crown 416C disposed between the ends 416E1, 416E2. A second resilient leaf or bow 417 has ends 417E1, 417E2 and a crown 417C disposed between the ends 417E1, 417E2. The crown 417C of the second leaf 417 is coupled to the crown 416C of the first leaf 416 so as to form the opposing leaf or opposing bow configuration. The ends 417E1, 417E2 of the second leaf 317 are coupled to the second side 415S2. In one aspect, the compliant support 415 is formed with the sides 415S1, 415S2 of any suitable resilient material (e.g., rubber, plastic, spring steel, etc.) as a single one piece unit (e.g., by molding as a single one piece unit, welding, brazing, etc.).

The flexible grip 420 is coupled to the second side 415S2 of the resilient body 415 in any suitable manner (e.g., mechanical or chemical fasteners, welding, brazing, overmolding the resilient body 415B over/on the flexible grip 420 (or vice versa), or any other suitable manner) so that the rigid base 410, the resilient body 415B, and flexible grip 420 are carried together as unit by the robot 120. The flexible grip 420 is configured to grip and hold one or more wheel weights 400 against a weight interface surface 420S of the flexible grip 420 in any suitable manner. For example, the flexible grip 420 includes one or more of adhesives 474, magnet(s) 471, vacuum grip(s) 472, and spring clips 473 (or other suitable clips) that grip the wheel weight and hold the wheel weight against the flexible grip for transport by the robot 120 and for application to a surface 450S of the barrel 450 of the wheel 111W. Where vacuum grip(s) 472 are provided, any suitable vacuum source VC is provided on the robot 120 or end effector 128 and is coupled to the vacuum grip(s) 472 such as by hoses or any other suitable conduit.

Referring also to FIG. 4C, the magnet(s) 471 of the flexible grip 420 may be segmented permanent magnets (or electromagnets) 471S arrayed along a length L of the flexible grip 420 where a spacing S between the magnets 471 allows the flexible grip 420 to bend and flex so as to conform to the surface 450S of the barrel 450. In other aspects, the flexible grip 420 may be formed of a flexible magnetic material such that magnetic properties are inherent in the flexible grip 420. Wheels weights made of ferrous material are magnetically attracted to and held by the magnet(s) 471 of the flexible grip 420.

Referring also to FIGS. 4D and 4E, in one or more aspects, two or more clips 473 are arrayed along the length L of the flexible grip 420 where a spacing S between the clips 473 allows the flexible grip 420 to bend and flex so as to conform to the surface 450S of the barrel 450. In other aspects, one clip 473 may be disposed anywhere along the length L and span any suitable portion of the length L so as to grip the wheel weight 400. Each clip 473 includes a pair of opposing tines 473T that are resilient and spaced from one another any suitable distance so that the wheel weight 400 passes between the opposing tines 473T and is held by the opposing tines 473T with a friction force between the opposing tines 473T and the wheel weight 400. The clip(s) 473 provide for gripping of wheel weights constructed with or without ferrous material.

Referring also to FIG. 4F, in one or more aspects, two or more vacuum grip(s) 472 are arrayed along the length L of the flexible grip 420 where a spacing S between the vacuum grips 472 allows the flexible grip 420 to bend and flex so as to conform to the surface 450S of the barrel 450. In other aspects, one vacuum grip may be disposed substantially midway along the length L so as to grip the wheel weight 400. Each of the vacuum grip(s) 472 are provided with a suction force sufficient to hold a wheel weight 400 regardless of whether all of the vacuum grips 472 engage the wheel weight 400. The vacuum grip(s) 473 provide for gripping of wheel weights constructed with or without ferrous material.

Referring still to FIGS. 4A and 4B, with the compliant support 415 in a relaxed state (as illustrated in FIG. 4A) the weight interface surface 420S of the flexible grip 420 is substantially flat and forms a plane 488. As the robot 120 moves the end effector 128 linearly in direction 499 to engage the surface 450S of the barrel 450 with the wheel weight gripper 129P for application of the wheel weight 400 to the surface 450S. With application of the wheel weight 400 to the surface 450S, the wheel weight 400 is pressed against the surface 450S where an array of reaction normal force vectors FV are exerted on the wheel weight 400 by the surface 450S. The substantially evenly distributed compressive force exerted between the wheel weight 400 and the surface 450S wets the surface 450S with adhesive 400A of the wheel weight 400 and/or activates the adhesive 400A (which may be a pressure sensitive adhesive) to adhere the wheel weight 400 to the surface 450S. Here, the reaction normal force vectors FV (and the corresponding force vectors exerted on the wheel weight 400 by the weight interface surface 420S) are arranged to point towards a center of the arc formed by the surface 450S of the barrel 450 such that the substantially evenly distributed compressive force exerted on the wheel weight 400 by the weight interface surface 420S and the surface 450S causes the wheel weight 400 to bend and flex in conformity with the radius of the surface 450S as shown in FIG. 4B. These same reaction normal force vectors FV cause the compliant support 415 to be compressed against the rigid base 410 where the opposing leaf spring configuration of the compliant support allows the weight interface surface 420S to bend and flex in a manner substantially similar to that of the wheel weight 400 (e.g., the weight interface surface 420S bends and flexes so as to conform with an imaginary cylinder 489 that has a radius concentric with the radius of the surface 450S) so that an array of force vectors (equal and opposite to the force vectors FV and having the same magnitudes that effect the substantially evenly distributed compressive force) are applied by the weight interface surface 420S to the wheel weight 400. The wheel weight gripper 129P allows the wheel weight 400 to contour to the surface 450S of the barrel 450 of the wheel 111W as the wheel weight 400 is pressed against the surface 450S with a substantially evenly distributed compressive force.

Referring to FIGS. 1A, 1B, and 5A-5C, the bot 120 is connected to the frame 189F at a proximal end 120P of the bot 120. The bot 120 has a distal end 120D (that comprises the end effector 128), opposite the proximal end 120P, where the distal end 120D is arranged so as to interface with the wheel assembly 111. As described herein, the bot has an actuator 126, where the actuator has a wheel weight installation tool or indexer 1290 arranged to index the end effector 128, in the at least one degree of freedom of the robot 120, and position the end effector 128 at different index positions corresponding to wheel weight locations 580, 581 on the wheel 111W.

In one or more aspects, the robot 120 has the wheel weight installation tool 1290 that indexes the distal end 120D between a retracted position (see FIG. 5A) and at least one extended position (see FIGS. 5B and 5C), wherein in the at least one extended position the distal end 120D interfaces the wheel assembly 111 (as described herein) determining a wheel or rim location of the wheel 111W of the tire wheel assembly 111 mounted on the vehicle 110. In other aspects, the wheel weight installation tool 1290 is coupled to the end effector 128 of the robot 120, for indexing the distal end 120D between a retracted position (see FIG. 5A) and at least one extended position (see FIGS. 5B and 5C). In the at least one extended position the distal end 120D interfaces the wheel assembly 111 determining a wheel or rim location of the wheel or rim 111W of the wheel assembly 111 and predetermined locations so as to effect a balancing solution of the one or more of the tire 111T, the wheel 111W, the bearings 111B, the brake components 111RD (e.g., including but not limited to the brake drums 111D and the brake rotors 111R), and the vehicle components 111C that impart, e.g., with the vehicle 110 in motion, vibrations to the vehicle 110 (e.g., such as by, but not limited to, imparting eccentric forces to the wheel hub 110H (see FIG. 1B)) via robotic application of wheel weights 400 with the end effector 128. As described herein, the wheel weight(s) 400 are applied to the surface 450S of the barrel 450. As noted above, when applying dynamic balancing weights in an automotive system, the wheel weights are most commonly placed at an inner location 580 (further away from the centerline of the vehicle adjacent the back of the wheel flange or spokes) and an outer location 581 (towards a centerline of the vehicle adjacent the inner wheel lip, e.g., about 25.4 mm (about 1 inch) from the inner wheel lip although in other aspects the outer location may be more or less than about 25.4 mm (about 1 inch)). The wheel weight installation tool 1290 positions wheel weights 400 at one or more locations of the wheel 111W, including but not limited to those locations 580, 581 described above.

The wheel weight installation tool 1290 includes a multi-index stage indexer 512, where each index stage has at least one index position. In the example illustrated in FIGS. 5A-5C, the multi-index stage indexer 512 includes a first stage formed by actuator 510 and a second stage formed by actuator 511; however, in other aspects there may be more than two stages. At least one stage of the multi-index stage indexer 512 has different index positions or locations (see, for example, locations 580, 581) that position the interface corresponding to wheel balancing weight locations on the wheel 111W so as to effect the balancing solution.

In some aspects, the wheel weight installation tool 1290 has an index position (see FIG. 5A) that places the end effector 128 (or distal end 120D which comprises the end effector 128S) in contact with the wheel 111W determining a wheel or rim location on the wheel 111W, of the wheel assembly 111 mounted on the vehicle 110. Here, the one or more of the actuators 510, 511 include any suitable encoders or other distance determining features for determining an extension of the respective actuator. The wheel weight installation tool 1290 may be positioned adjacent the side wall 111TS (inclusive of the surface ILS of the inner wheel lip) of the wheel assembly 111 and extended so that the end or tip of the wheel weight installation tool 1290 contacts the side wall 111TS. The encoder or other distance sensor of the respective actuator sends a signal to the controller 160, 160" that embodies the extension distance of the respective actuator 510, 511 so that the distance 578 between a retracted position of the wheel weight installation tool 1290 (see FIG. 5A) and the sidewall 111TS is known. The controller 160, 160" may employ the distance 578 when controlling extension of the actuators 510, 511 for placement of wheel weights at one or more of the wheel weight locations 580, 581, such as where the actuators have a variably controlled extension.

Figures 5A, 5B:
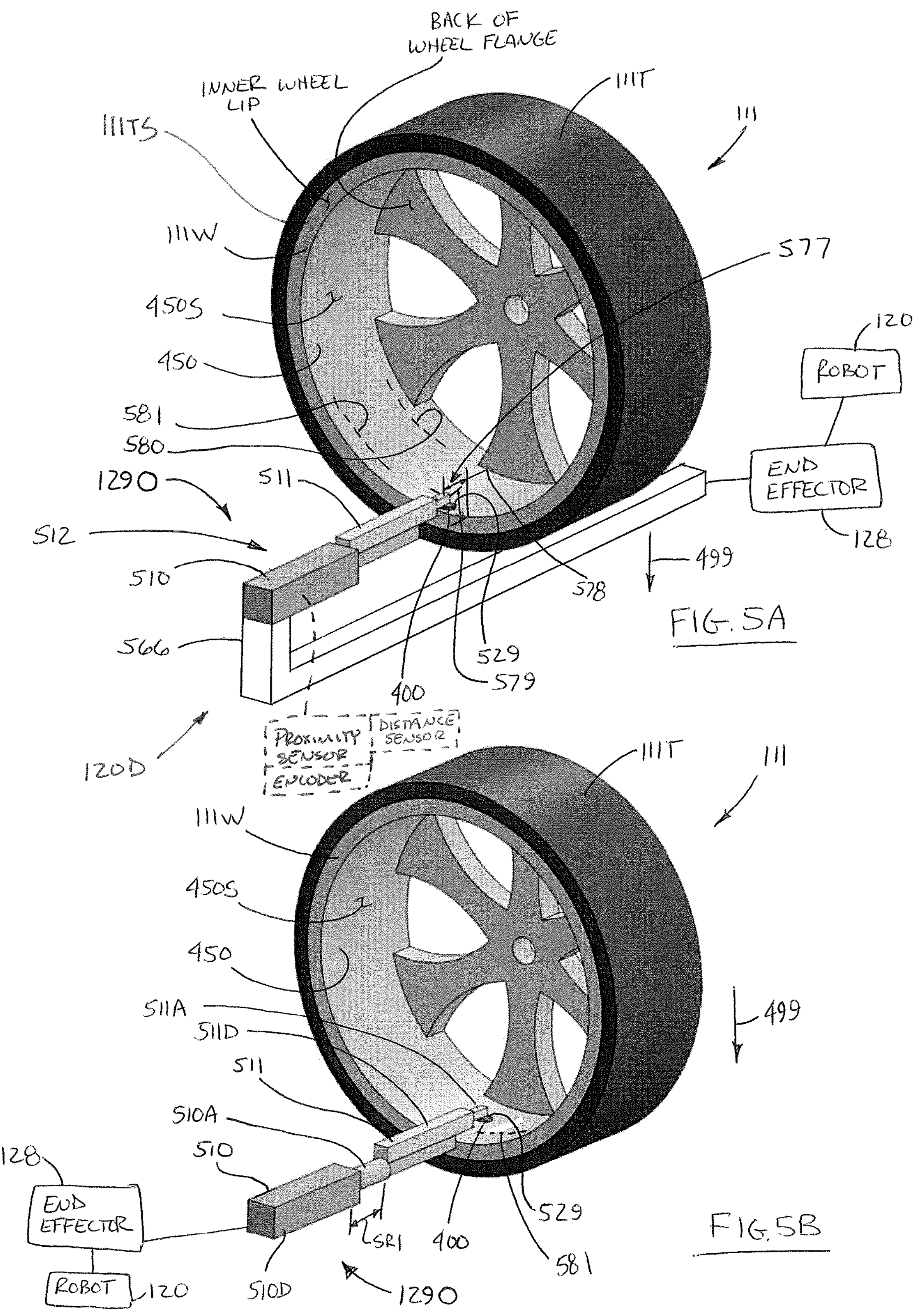
FIGS. 5A-5C are schematic illustrations of a wheel weight installation tool of the automated tire changing system of FIGS. 1A and 1B in accordance with the present disclosure.
Figure 5C:
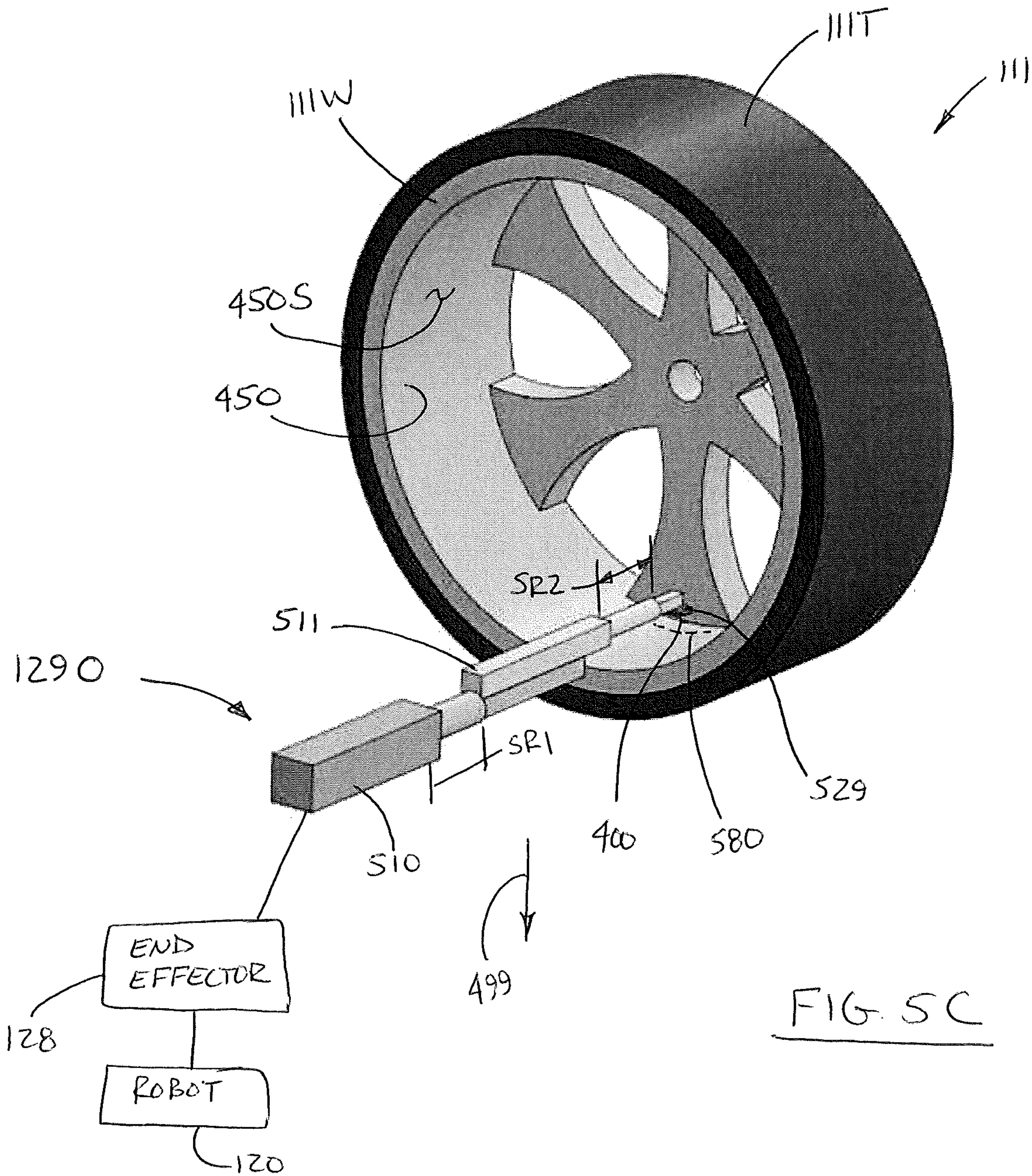

In one aspect, the multi-index stage indexer 512 positions wheel weights at one or more of the inner location 580 and the outer location 581. The multi-index stage indexer 512 is coupled to a frame 566 of the wheel weight installation tool 1290. The frame 566 has any suitable configuration for coupling with the end effector 128 and that provides for insertion of at least a portion of the wheel weight installation tool 1290 into the barrel 450 (the configuration of the frame 566 illustrated in FIG. 5A is exemplary only and the frame may have any other suitable configuration). The multi-index stage indexer 512 includes serially arranged actuators 510, 511 that provide for a staged extension of the wheel weight installation tool from a retracted position (see FIG. 5A) to one or more of a first extended position (see FIG. 5B) and a second extended position (see FIG. 5C). The first extended position corresponds with placement of a wheel weight 400 at the outer location 581. The second extended position corresponds with placement of a wheel weight 400 at the inner location 580.

The actuators 510, 511 are any suitable actuators including, but not limited to, one or more of electric actuators, pneumatic actuators, hydraulic actuators, magnetic actuators, screw drives, etc. Each actuator 510, 511 includes a drive portion 510D, 511D and a driven portion 510A, 511A. The drive portion 510D of actuator 510 is coupled to the frame 566 in any suitable manner (e.g., such as mechanical and/or chemical fasteners, welding, brazing, etc.). The drive portion 511D of actuator 511 is coupled to the driven portion 510A of the actuator 510 in any suitable manner (e.g., such as mechanical and/or chemical fasteners, welding, brazing, etc.) so that the actuator 511 is carried by and moves as a unit with the driven portion 510A. A wheel weight gripper 529 (which may be substantially similar in configuration to the wheel weight gripper 129P described above) is coupled to the driven portion 511A of the actuator 511 in any suitable manner (e.g., such as mechanical and/or chemical fasteners, welding, brazing, etc.) so that the wheel weight gripper 529 moves with the driven portion 511A.

Each actuator 510, 511 has a predetermined stroke (e.g., extension amount) to effect positioning a wheel weight 400 at one of the inner location 580 and outer location 581 with the robot 120 holding the wheel weight installation tool 1290 at a predetermined retracted position location (see FIG. 5A). In some aspects, the wheel weight installation tool 1290 is a binary wheel weight positioning mechanism where the predetermined stroke may be mechanically limited (e.g., such as by an end of stroke hard stop or contact with the wheel 111W) for placement at one or more of the locations 580, 581; while in other aspects the predetermined stroke may be controlled such as with any suitable controller 160, 160" controlling the drive portion 510D, 511D to effect, with an encoder or distance sensors of the drive (see FIG. 5A), any suitable predetermined extension distance of one or more of the actuators 510, 511 for placing wheel weights at one or more location including, but not limited to locations 580, 581. The predetermined retracted position location may be determined in any suitable manner so that a reference location (such as reference location 577—see FIG. 5A) of the wheel weight installation tool is located a predetermined distance 578 from the inner wheel lip 578 and a predetermined distance 579 from the surface 450S of the barrel 450. The reference location 577 may be a center point of the weight interface surface 420S of the flexible grip 420 (see FIG. 4A) of the wheel weight gripper 529 or any other suitable location of the wheel weight installation tool 1290 that effects placement of the wheel weight gripper 529 in a known location.

As an example, referring also to FIGS. 1A and 1B, the predetermined retracted position location of the wheel weight installation tool 1290 may be determined from data obtained by the one or more of the vision systems 130, 162 of the tire changing system 100 and/or the proximity sensor 129N (the proximity sensor being combined with or employed separately from the wheel weight installation tool 1290) that effects changing of the tire(s) 111T on the vehicle 110. To effect a tire change, one or more of the vision systems 130, 162 maps one or more sides of the vehicle 110 to identify the location of each wheel assembly 111 of the vehicle 110 and identify the tire size in a manner similar to that described in U.S. Pat. No. 11,446,826 issued on Sep. 20, 2022 and titled "Autonomous Traverse Tire Changing Bot, Autonomous Tire Changing System, and Method Therefor," previously incorporated herein by reference in its entirety; while in other aspects the proximity sensor 129N is employed as described herein for localization of the wheel assembly 111. The identification of the location of each wheel assembly 111 (within the tire changing station 101) and tire size informs the controller 160, 160" of a position (e.g., the substantially vertical plane) of the inner wheel lip for each wheel assembly 111 and a (vertical or height) position of the surface 450S of the barrel 450 with respect to the robot 120 coordinate system. With the positions of the inner wheel lip and surface 450S known, the controller 160 determines, in any suitable manner, the predetermined retracted position location of the wheel weight installation tool 1290 (e.g., in the robot coordinate system) based on the positions of the inner wheel lip and surface 450S.

With the wheel weight installation tool 1290 in the predetermined retracted position location (see FIG. 5A), the controller 160 effects actuation of one or more of the actuators 510, 511 for placement of a wheel weight 400 at the inner location 580 and the outer location 581 or any other suitable location that resolves and provides for a balancing solution of the one or more of the tire 111T, the wheel 111W, the bearings 111B, the brake components 111RD (e.g., including, but not limited, to the brake drums 111D and the brake rotors 111R), and the vehicle components 111C that impart, e.g., with the vehicle 110 in motion, vibrations to the vehicle 110 (e.g., such as by, but not limited to, imparting eccentric forces to a wheel hub 110H (see FIG. 1B)). Here, the wheel assembly 111 is rotated in any suitable manner (e.g., through automation or manually with the wheel assembly 111 mounted to the vehicle 110) so that the angular (with respect to tire rotation) wheel weight placement location (as determined by any suitable wheel balancer such as those described in U.S. provisional patent application No. 63/354,591 titled "Autonomous Tire and Wheel Balancer and Method Therefor" and filed on Jun. 22, 2022, the disclosure of which was previously incorporated herein by reference in its entirety) is held substantially aligned with the predetermined retracted position location of the wheel weight installation tool 1290. As one example, the wheel weight installation tool 1290 may be employed with the one or more wheel weight installation robot 120WR (see FIG. 1B) while the robot 120 rotates and holds the wheel assembly 111 with, e.g., the tire balancer 129M. As another example, the wheel weight installation tool 1290 may be combined with the tire balancer 129M where the tire balancer rotates the wheel assembly 111 and holds the wheel assembly 111 for installation of the wheel weight 400. In still other examples, one actuator 126 of the robot 120 may rotate and hold the wheel assembly 111 while another actuator 126A of the robot 120 (see FIG. 1B) (or another robot 120) applies the wheel weight 400. In other aspects, the robot 120 may be employed with an off-the-car tire balancing machine 183 in a manner similar to that described herein for applying a wheel weight 400 with the wheel weight installation tool 1290 to a wheel assembly 111 mounted on the tire balancing machine 183.

With the wheel weight installation tool 1290 disposed at the predetermined retracted position location, the driven portion 510A of the actuator 510 has a stroke SR1 (FIG. 5B) that places the wheel weight gripper 529 (and the wheel weight 400 held thereby) at the outer location 581. With the wheel weight gripper 529 (and the wheel weight 400 held thereby) at the outer location 581, the robot 120 moves the wheel weight installation tool 1290 in direction 499 so that the wheel weight 400 is pressed against the surface 4505 of the barrel 450 of the wheel 111W in a manner similar to that described herein to affix or otherwise bond the wheel weight 400 to the surface 450S.

With the wheel weight installation tool 1290 disposed at the predetermined retracted position location, the driven portion 510A of the actuator 510 has a stroke SR1, and the driven portion 511A of the actuator 511 has a stroke SR2 (FIG. 5C), that when combined places the wheel weight gripper 529 (and the wheel weight 400 held thereby) at the inner location 580. With the wheel weight gripper 529 (and the wheel weight 400 held thereby) at the inner location 580, the robot 120 moves the wheel weight installation tool 1290 in direction 499 so that the wheel weight 400 is pressed against the surface 4505 of the barrel 450 of the wheel 111W in a manner similar to that described herein to affix or otherwise bond the wheel weight 400 to the surface 450S.

In one or more aspects, the wheel weight installation tool 1290 provides for binary control of the wheel weight 400 position and application of wheel weights 400 at the most commonly employed wheel weight positions of standardized wheels 111W (e.g., the inner location 580 and the outer location 581 of the wheel 111W). In one aspect, the strokes SR1, SR2 of the actuators 510, 511 are such that the wheel weight 400 may be positioned at the inner location 580 and the outer location 581 within a predetermined tolerance for standardized wheels having different widths. For example, different wheel weight installation tools 1290, 1290A-1290_n_ may be provided, where each wheel weight installation tool 1290 effects wheel weight installation for a respective range of wheel widths. For example, one wheel weight installation tool 1290 effects wheel weight installation for wheel widths ranging from about 152.4 mm (about 6 inches) to about 228.6 (about 9 inches), another wheel weight installation tool 1290 effects wheel weight installation for wheel widths ranging from about 241.3 mm (about 9.5 inches) to about 304.8 mm (about 12 inches), etc. (noting that the gradation of ranges may be any suitable gradation and those gradations provided herein are for exemplary purposes only). The strokes SR1, SR2 of the actuators 510, 511 are limited in any suitable manner such as by stops built into the respective actuators and/or through contact with the wheel 111W. In other aspects, the strokes SR1, SR2 of the actuators 510, 511 are such that the wheel weight 400 may be positioned at the inner location 580 and the outer location 581 regardless of the wheel assembly 111 build (e.g., regardless of wheel width). Here, the stroke SR1 of the actuator 510 is such that, with the wheel weight installation tool 1290 disposed at the predetermined retracted position location, the wheel weight gripper 529 (and the wheel weight 400 held thereby) is positioned at the outer location 581 (about 25.4 cm (about 1 inch) from the inner wheel lip although in other aspects placement may be more or less than about 25.4 mm (about 1 inch)). The stroke SR2 of the second actuator 511 is such that extension of the driven portion 511A is stopped when the wheel weight installation tool 1290 contacts the back of the wheel flange so that contact between the wheel weight installation tool 1290 the back of the wheel flange locates the wheel weight gripper 529 (and the wheel weight 400 held thereby) at the inner location 580. As may be realized, the wheel weight installation tool 1290 provides for binary placement of wheel weights 400 on a wheel 111W substantially without feedback, vision systems, or measurement (e.g., wheel width measurement) of the wheel 111W. In other aspects, as described herein, the wheel weight installation tool provides for placement of wheel weights are locations that include but are not limited to locations 580, 581.

Figure 6A:
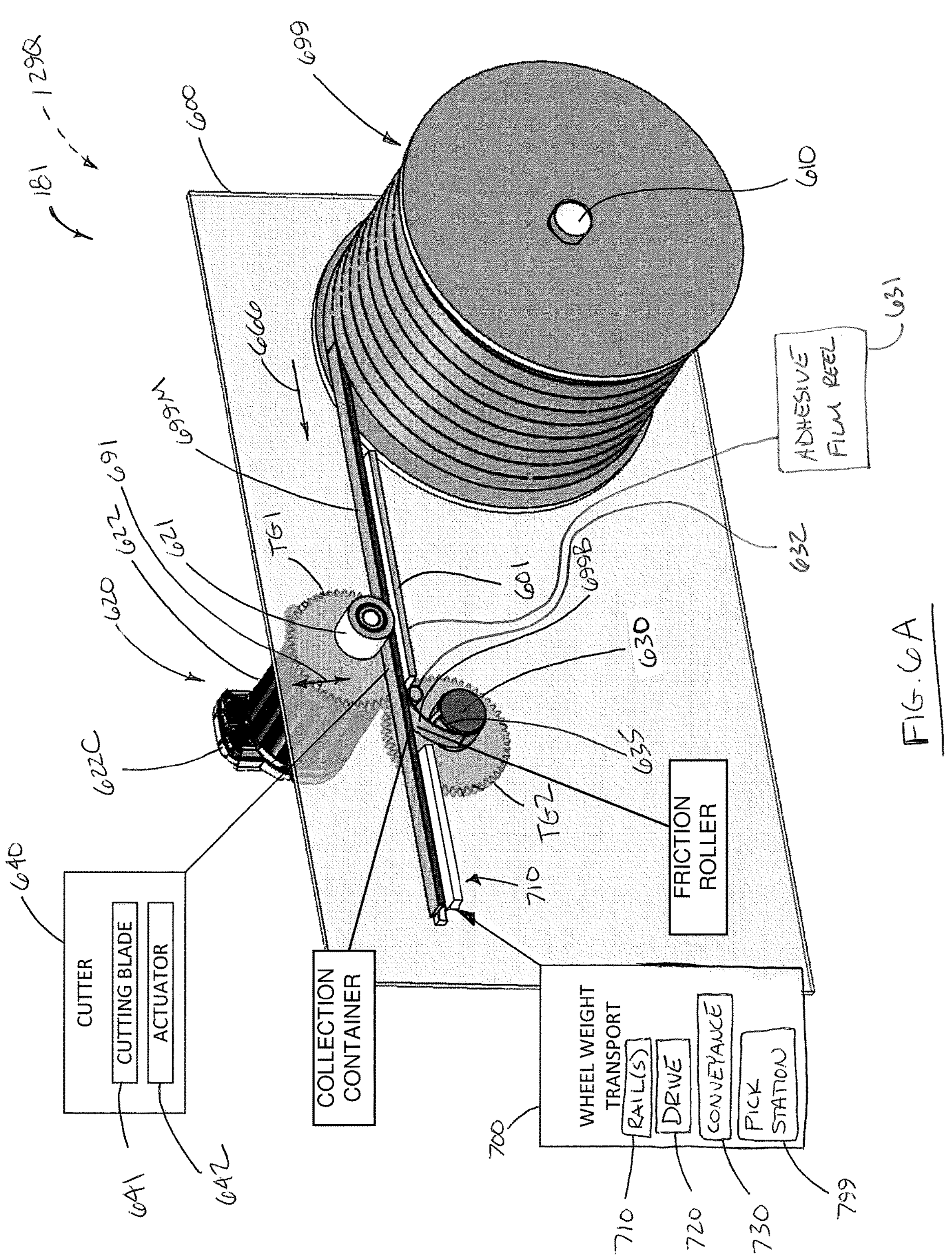
FIG. 6A is a schematic illustration of a wheel weight dispenser and wheel weight transport of the automated tire changing system of FIGS. 1A and 1B in accordance with the present disclosure.

Referring to FIGS. 1A, 1B, and 6A, wheel weights 400 are provided to the wheel weight gripper 129P and/or the wheel weight installation tool 1290 by a wheel weight dispenser 129Q, 181. The wheel weight dispenser is located at any suitable location of the at least one tire changing station 101. The wheel weight dispenser may be provided as stand-alone wheel weight dispenser 181, as a tool (see wheel weight dispenser 129Q) that is coupled to the end effector 128 of a robot 120 (in any suitable manner) or carried (in any suitable manner) by a wheel weight installation robot 120WR, or integrated/combined with another tool 129A-129P.

The wheel weight dispenser 129Q, 181 includes a frame 600 having a spindle or bobbin 610 on which a roll of adhesive wheel weight(s) 699 is supported. Suitable examples of wheel weight material that may be employed with aspects of the disclosure include, but are not limited to, the 3M™ adhesive backed wheel weight rolls provided by the 3M Automotive and Aerospace Solutions Division located in Minnesota USA and the Stickpro™ adhesive wheel weight rolls provided by Plombco located in Quebec Canada.

A rail 601 is coupled to the frame so as to receive and support wheel weight material 699M unspooled from the roll of adhesive wheel weight(s) 699. A wheel weight indexer 620 is coupled to the frame 600. The wheel weight indexer 620 includes a motor 622 and a roller 621, where the motor drives rotation of the roller 621. The roller 621 is positioned on the frame 600 so as to contact the wheel weight material 699M supported on the rail 601 so that rotation of the roller 621 drives the wheel weight material 699M along the rail 601 in direction 666 and unspools the wheel weight material 699M from the roll of adhesive wheel weight(s) 699. The roller 621 has any suitable configuration for contacting and engaging the wheel weight material 699M. For example, the roller 621 may be a friction roller that is biased towards the rail 601 in any suitable manner (e.g., a spring, under the weight of the wheel weight indexer 620, etc.) and against the wheel weight material 699M for driving and unspooling the wheel weight material 699M in direction 666, while in other aspects the roller 621 and the wheel weight indexer 620 may have any suitable configuration for gripping and driving the wheel weight material 699M in direction 666.

The wheel weight dispenser 129Q, 181 also includes a cutter 640 configured to cut the wheel weight material 699M into predetermined segments corresponding to a desired amount (e.g., ounces or grams) of weight to be applied to a wheel assembly 111 for balancing of the wheel assembly 111. The cutter 640 is coupled to the frame 600 in any suitable manner and includes an actuator 642 that drives a cutting blade 641 in direction 691 for cutting the wheel weight material 699M. The cutting blade 641 is disposed adjacent the roller 621 to cut the wheel weight material 699M that is driven by and past the roller 621 as described herein.

The motor 622 includes any suitable motor controller 622C that is communicably coupled to a controller of the tire changing system 100 (such as of the robot 120, tire balancing machine 183, tire balancer 129M, etc.) so that a desired amount of weight for balancing the wheel assembly 111 (as determined by one or more of the tire balancers 129M, 183) is communicated to the motor controller 622C. The motor 622 may be a stepper motor and/or include any suitable encoders so that, with a known diameter of the roller 621, the motor controller 622C operates the motor 622 to dispense or otherwise drive a length of wheel weight material 699ML past the roller 621, where the length of wheel weight material 699ML corresponds to the desired amount of wheel weight for balancing the wheel assembly 111.

Figures 6B, 6C:
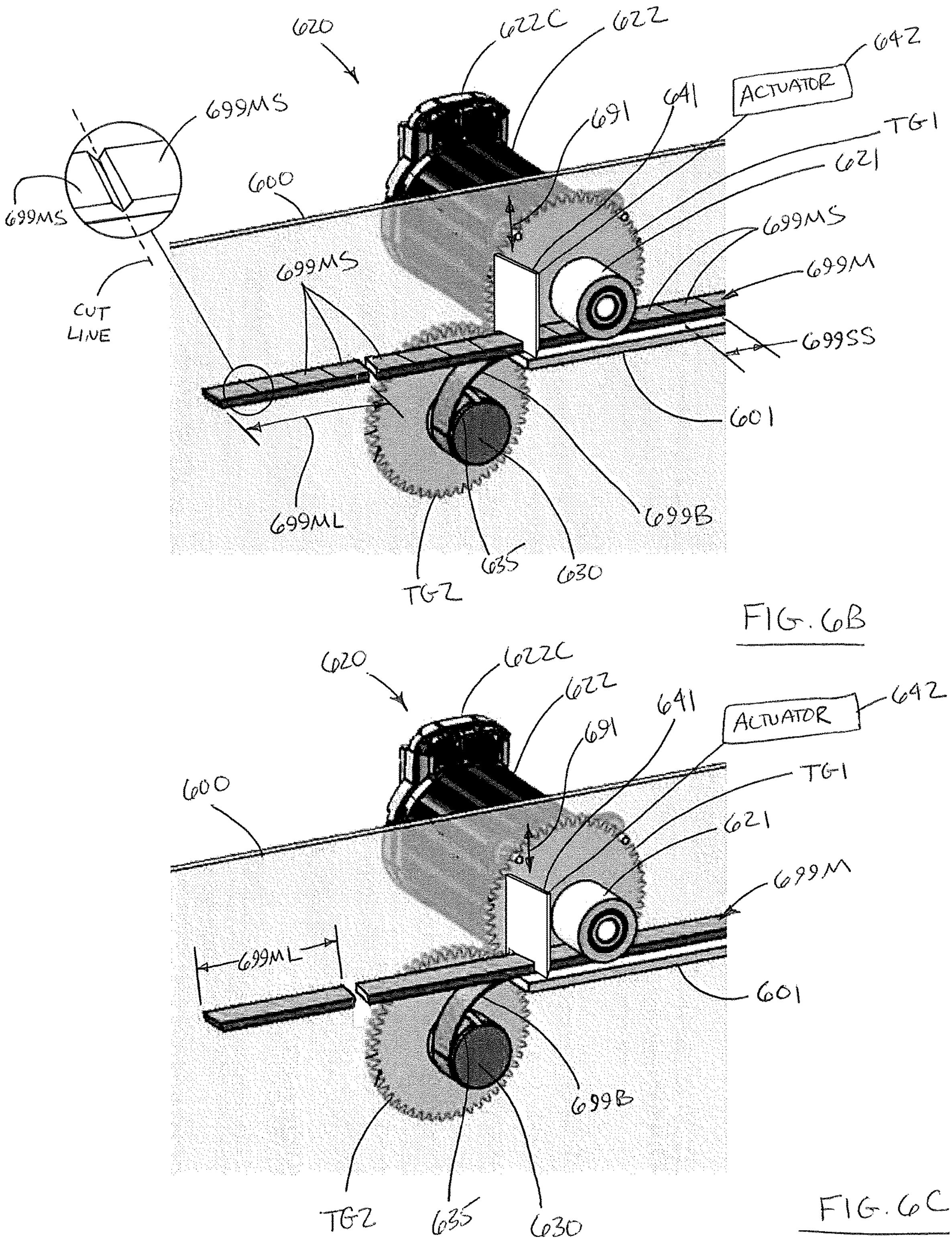
FIGS. 6B and 6C are schematic illustrations of a portion of the wheel weight dispenser of FIG. 6A in accordance with the present disclosure.

Referring also to FIG. 6C, where the wheel weight material 699M is unsegmented any desired amount of wheel weight material 699M may be dispensed past the roller and cut by the cutting blade 641 to match the desired amount of wheel weight. As can be seen in FIG. 6C, unsegmented wheel weight material 699M is driven past the roller so that a predetermined length 699ML of the wheel material is located downstream (relative to the roller 621 and direction 666 of travel of the wheel weight material 699M) of the cutting blade 641. The cutting blade 641 is lowered by the actuator 642 against the rail 601 to cut the predetermined length 699ML of wheel weight material 699ML.

Referring also to FIG. 6B, where the wheel weight material 699M is segmented, each segment 699MS is of a predetermined weight common to all of the segments 699MS of the roll 699 and of a predetermined length 699SS common to all of the segments of the roll 699. The controller 622C is configured to drive the wheel weight material 699M by incremental distances substantially equal to the segment length 699SS so that a number of segments 699MS are dispensed downstream of the cutting blade 641, where the number (e.g., one or more) of segments 699MS (e.g., the predetermined length of wheel weight material 699ML) is substantially equal to the desired amount of wheel weight. Here, the incremental distance, which the wheel weight material is driven, maintains substantial alignment between the cutting blade 641 and cut lines that are scribed between and delineate one segment 699MS from another adjacent segment 699MS. With the desired number of segments 699MS disposed downstream of the cutting blade 641, the cutting blade 641 is lowered by the actuator 642 against the rail 601 to cut the predetermined length of wheel weight material 699ML.

The wheel weight dispenser 181, 129Q includes a take up spool 630 coupled to the frame 900 and configured in any suitable manner to peel the adhesive backing 699B from the wheel weight material 699M and spool the adhesive backing 699B onto a roll 635 for disposal. An adhesive film real 631 may be coupled to the frame 600 and include roller(s) 632 that press an adhesive film (e.g., unrolled from the adhesive film reel) against the adhesive backing 699B of the wheel weight material 699M so that the adhesive film adheres to the adhesive backing 699B. The adhesive film may be wound/wrapped around the roll 635 so that as the adhesive film is redirected by the roller 632 from being pressed against the wheel weight material 699M to the roll 635, the adhesive film peels a leading edge of the adhesive backing 699B from the wheel weight material 699M so as to peel the adhesive backing 699B from the wheel weight material 699M and spool the adhesive film with the adhesive backing 699B adhered thereto around the roll 635. The take up spool 630 (and the adhesive film reel) is driven in rotation by the motor 622 simultaneously with and at the substantially the same rate as the roller 621. As an example, the motor 622 includes an output on which output the roller 621 is mounted. Any suitable transmission couples the output of the motor 622 to a drive shaft of the take up spool 630. As illustrated in FIG. 6A, the transmission includes a pair of gears TG1, TG2. The gear TG1 is coupled to the output of the motor 622 and rotates as a unit with the roller 621. The gear TG2 is coupled to the drive shaft of the take up spool 630 so as to rotate as a unit with the take up spool 630. The gears TG1, TG2 are meshed with each other so that as the roller 621 rotates to drive the wheel weight material 699M in direction 666, the take up spool 630 also rotates to take up the adhesive backing 699B peeled from the wheel weight material 699M at the same rate the wheel weight material is advanced by the roller 621. While the transmission is described as including gears TG1, TG2, the transmission may have any suitable configuration (e.g., gears, belts and pulleys, chains and sprockets, etc.) that effects the simultaneous and same rate rotation of the roller 621 and take up spool 630. As may be realized, rotation of the adhesive film reel may be driven by/controlled with a gear of the above-mentioned transmission where the gear is meshed with gear TG1, meshed with the gear TG2, or driven by one or gear TG1, TG2 via an idler gear. The take up spool 630 may include any suitable tensioning device, clutch or other tensioning/slipping device that effects peeling of the adhesive backing 699B substantially without ripping/tearing the adhesive backing 699B or otherwise stopping the functioning of wheel weight dispenser. In other aspects, the adhesive backing 699B may be removed from the wheel weight material 699M with a friction-based system such as a friction roller (see FIG. 6A). In still other aspects, the adhesive backing 699B removed from the wheel weight material 699M may be directed (e.g., in any suitable manner such as by rollers, gravity, etc.) into a collection or waste container (see FIG. 6A) or is otherwise removed from the wheel weight material 699M then unmanaged.

As illustrated in FIG. 6A, the cut lengths of wheel weight material 699ML are dispensed onto a wheel weight transport 700 configured to transport the cut lengths of wheel weight material 699ML to a pick station 799 (see FIGS. 7B and 8B) accessible by the wheel weight gripper 129P and/or the wheel weight installation tool 1290. The wheel weight gripper 129P and/or the wheel weight installation tool 1290 picks the cut lengths of wheel weight material 699ML from the pick station 799 for coupling the cut length of wheel weight material 699ML to a wheel 111W as described herein.

Where, the wheel weight dispenser (e.g., wheel weight dispenser 129Q) is carried by the robot 120 or wheel weight installation robot 120WR the wheel weight transport 700 and wheel weight dispenser 129Q may be coupled to the frame 566 of the wheel weight installation tool 1290 so as to position the a cut length of wheel weights 699ML (referred to herein as a wheel weight 400) at the retracted position of the wheel weight gripper 529 (here, another degree of freedom may be provided on the wheel weight dispenser to provide relative movement between the wheel weight gripper 529 and a wheel weight 400 disposed at the pick station 799 and effect picking of the wheel weight 400 by the wheel weight gripper 529 from the pick station 799). In other aspects, the wheel weight dispenser and wheel weight transport 700 may be carried by one robot 120 or robot actuator 126 while the wheel weight gripper 129P or wheel weight installation tool 1290 is carried by another robot 120 or robot actuator 126A so that the pick station 799 is accessible by the wheel weight gripper 129P or wheel weight installation tool 1290.

Where a stationary wheel weight dispenser (e.g., wheel weight dispenser 181) is employed, the wheel weight transport 700 may receive the wheel weight 400 from the wheel weight dispenser 181 and transport the wheel weight 400 to any suitable location of the tire changing station 101 that is accessible by the wheel weight gripper 129P and/or the wheel weight installation tool 1290. The wheel weight transport 700 may be configured so that a single wheel weight dispenser 181 provides wheel weights to (i.e., is common to) multiple pick stations 799 (see FIG. 799) or a single pick station. There may be one or more wheel weight dispenser(s) 181 (see FIG. 2A) where each wheel weight dispenser feeds a respective wheel weight transport 700 having one or more pick stations 799.

Referring to FIGS. 1A, 1B, 6A, 7A-7F, and 8A-8C, the wheel weight transport 700 includes rail(s) 710, a conveyance 730, a drive 720, and the pick station 799. In the example illustrated, the rail(s) 710 may include opposing rails 710A, 710B each having a weight support surface 711. The rails 710A, 710B may or may not include a respective weight guide surface 712. The rails 710A, 710B are spaced apart from each other by any suitable distance or gap 770 so as to support the wheel weight 400 but span the adhesive 699A (see FIG. 7C). In other aspects, there may be a single rail 710C (see FIG. 8C) that may or may not include weight guide surfaces 712. The wheel weight 400 slides along the rails 710A, 710B, 710C in sliding contact with the rails 710A, 710B, 710C or the wheel weight 400 may be disposed on a platen 400P that slides along the rail(s) and on which the wheel weight 400 is carried. In some aspects, the adhesive backing 699B may be stripped from the adhesive 699A of the wheel weight 400 (in a manner similar to that described above with respect to the FIGS. 6A-6C) at a pick station 799 of the wheel weight transport 700 (e.g., the pick station includes the adhesive film reel 631 roller 632, spool 630, and roll 635); while in other aspects, the adhesive backing 699B is stripped from the adhesive 699A of the wheel weight 400 prior to conveyance of the wheel weight 400 by the wheel weight transport 700 as described herein with respect to FIGS. 6A-6C. Where the wheel weight is conveyed with the adhesive backing 699B removed, the adhesive 699A may be disposed in a gap 770 between the rails 710A, 710B or a above/within a recess 770A of the platen 400P.

The rails 710A, 710B, 710C may have one or more of linear portions (see FIG. 7A) and curved portions (see FIG. 7D) that transport the wheel weight 400 to any suitable location of the tire changing station 101. In one aspect, the weight guide surface 712 of the rails 710A, 710B maintains alignment of the wheel weight 400 (and platen 400P where the wheel weight 400 is disposed on the platen 400P for transport) with the direction of travel 666 along the rails 710A, 710B (e.g., the wheel weight 400 is aligned so that the wheel weight 400 and/or platen 400P travels with its longitudinal axis substantially aligned with the direction of travel, where the longitudinal axis is generally a longest length of the weight and/or platen). In another aspect, one or more of the rails 710A, 710B include a respective array of magnets 710AR that are arrayed along the length of the respective rail 710A, 710B or is constructed of a magnetic material so that a magnetic coupling between one or more of the rails 710A, 710B and one or more of the wheel weight 400 and platen 400P maintains alignment of the wheel weight 400 with the direction of travel 666. In still other aspects, one or more of the rails 710A, 710B includes both the weight guide surface 712 and the array of magnets 710AR/magnetic material where a combination of contact between the wheel weight 400 and or platen 400P and the weight guide surface 712 and the magnetic coupling between the wheel weight 400 and/or platen 400P and the rail(s) 710A, 710B maintains alignment of the wheel weight 400 and/or platen 400P with the direction of travel 666. In other aspects, the platen 400P includes a magnet where the wheel weight 400 is aligned to the platen 400P via the magnet and the platen 400P is mechanically aligned to the rails 710A, 710B. In still other aspects, the wheel weight 400 may be mechanically aligned to the rails 710A, 710B in any suitable manner, such as by clips, slots, etc.

The conveyance 730 is any suitable conveyance configured to convey the wheel weight 400 along the rails 710A, 710B. The conveyance 730 may be for example, a belt 730B, a chain 730C, or any other suitable conveyance. Where the conveyance is a belt 730 or chain 730C the belt 730B may be an articulated belt having articulated links 730AL (see FIG. 7D) that configured the belt 730B to round corners formed by the curved portions of the rails 710A, 710B. The conveyance 730 is driven by any suitable drive 720 (including a motor and suitable transmission such as gears, sprockets, pulleys etc.). As another example, the conveyance 730 may be a linear motor 730M (which has an integral drive). The linear motor includes an electromagnetic driver track 730EMT and a carrier 730EMC. The carrier 730EMC may form the platen 400P (or otherwise drive the platen 400P) on which the wheel weight 400 is carried and may be magnetically levitated by and driven along the electromagnetic driver track 730EMT, while in other aspects, the carrier 730EMC (forming the platen 400P or otherwise driving the platen 400P as described herein) travels on rails and is driven by and along the electromagnetic driver track 730EMT.

In one or more aspects, the conveyance includes one or more of drive tabs 730T (see FIGS. 7A, 7B, 7D, 7E, and 7F) that engage and push the wheel weight 400 and/or platen 400P along the rail(s) 710A, 710B, 710C with movement of the conveyance 730 in direction 777. In other aspects, the conveyance includes magnetic portions 730M that form a magnetic coupling with the wheel weight 400 and/or platen 400P, where the magnetic coupling pulls the wheel weight 400 and/or platen 400P along the rail(s) 710A, 710B, 710C with movement of the conveyance 730 in direction 777. In still other aspects, the conveyance may include both tabs 730T and magnetic portions 730M that complement each other to push and/or pull the wheel weight 400 and/or platen 400P along the rail(s) 710A, 710B, 710C.

Figures 7A, 7B, 7C, 7D, 7E:
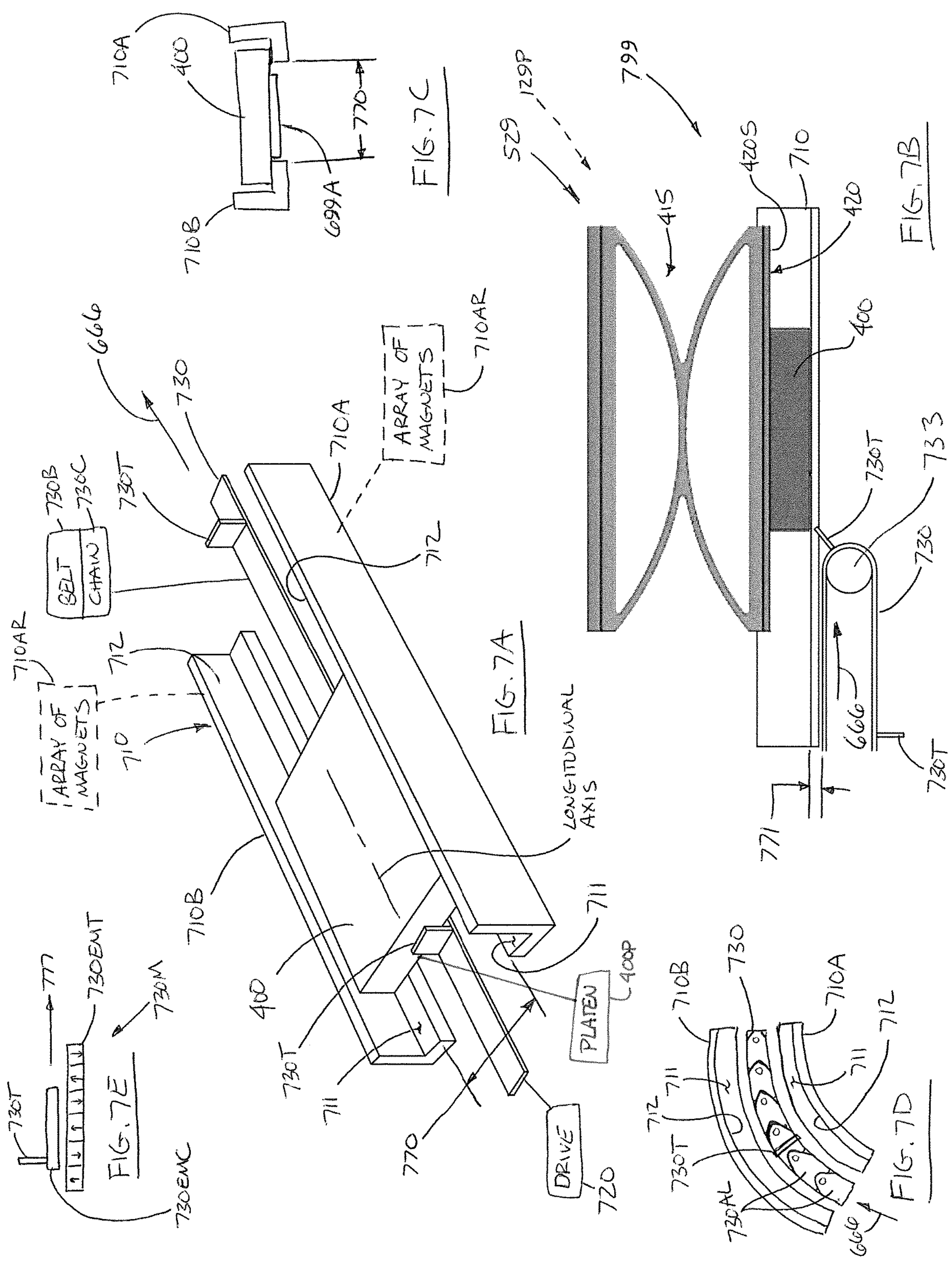
FIGS. 7A-7F are schematic illustrations of portions of the wheel weight transport of FIG. 6A in accordance with the present disclosure.
Figures 7F, 8C:
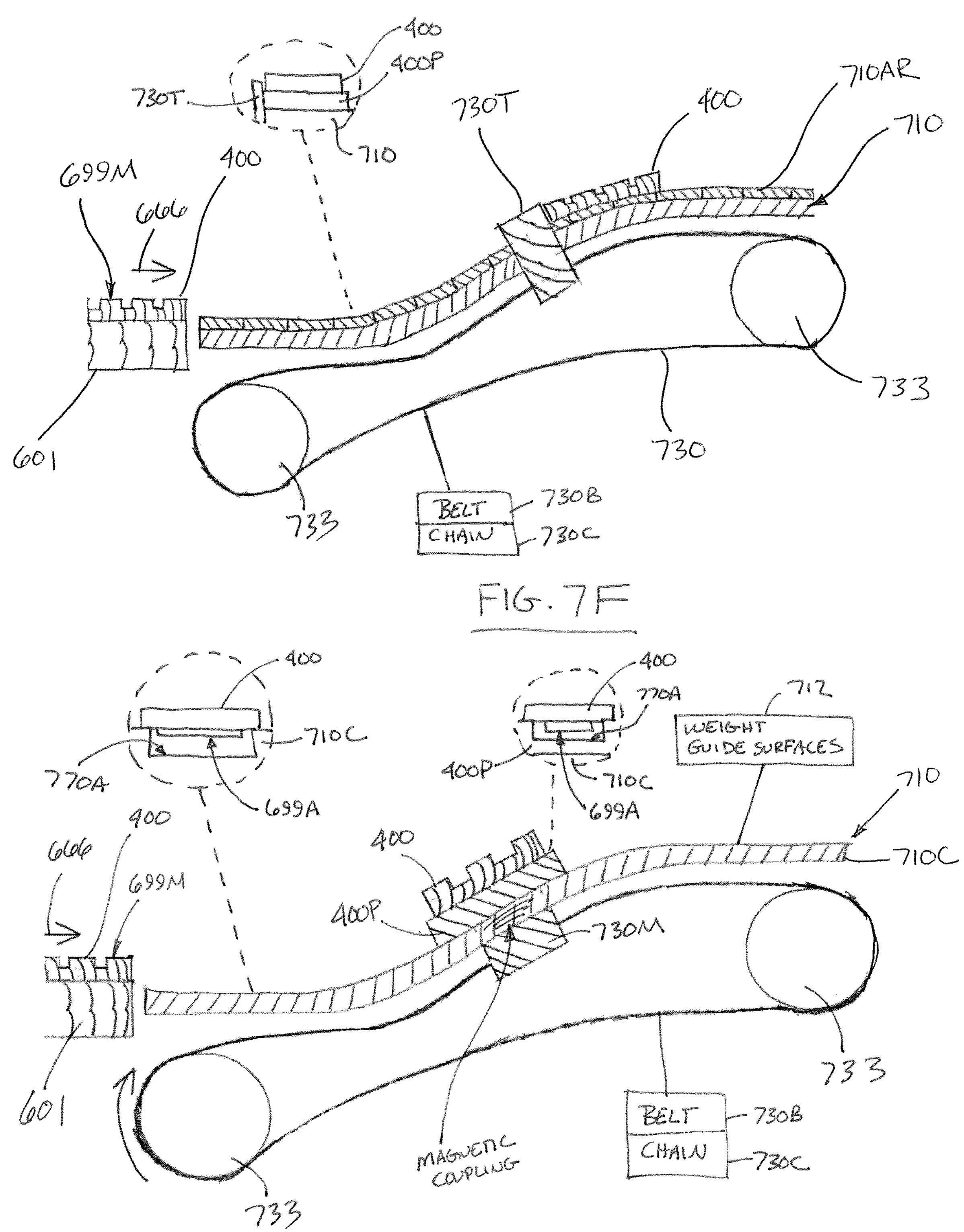
FIGS. 8A-8C are schematic illustrations of portions of the wheel weight transport of FIG. 6A in accordance with the present disclosure.
Figures 8A, 8B:
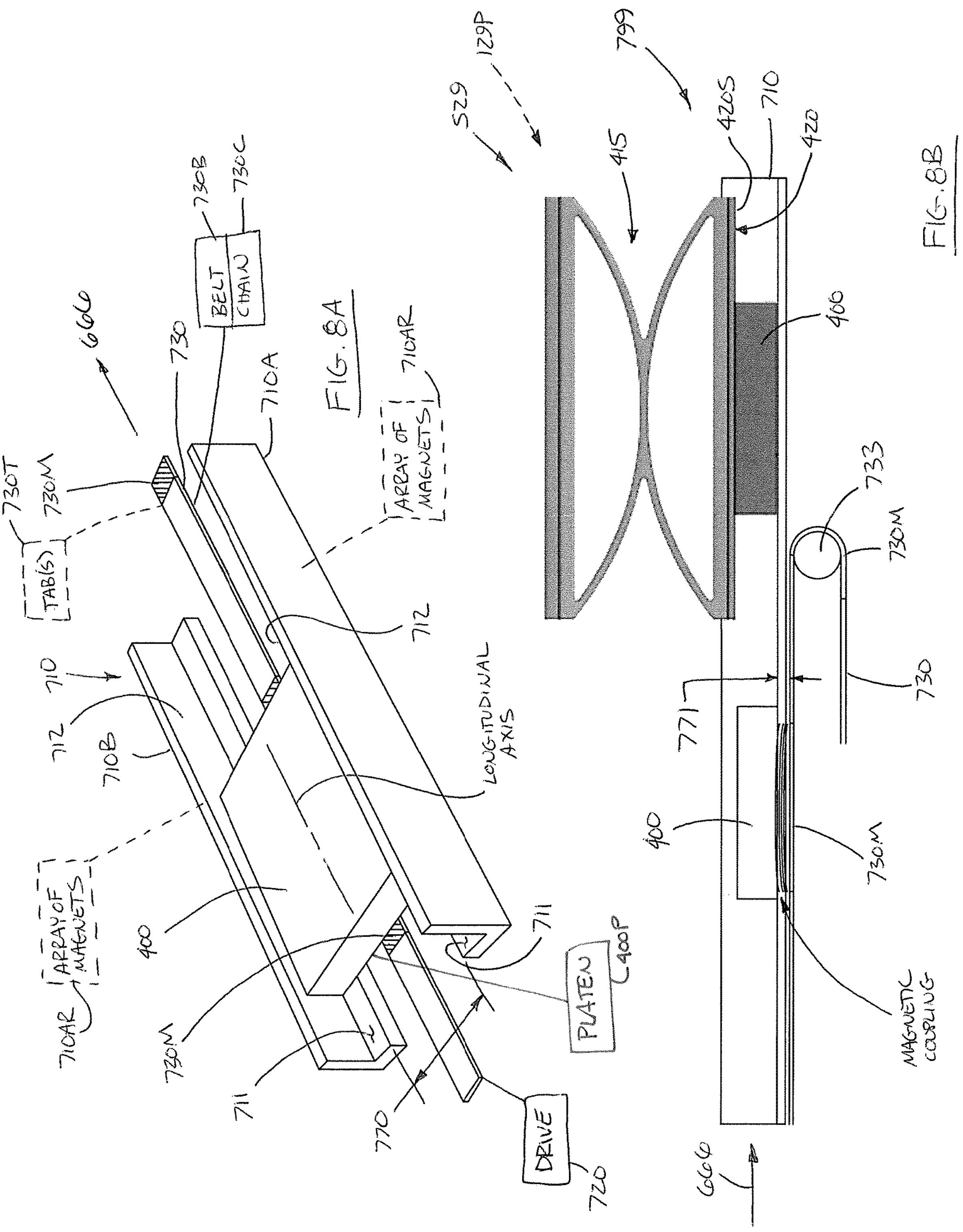
Figures 9A, 9B:
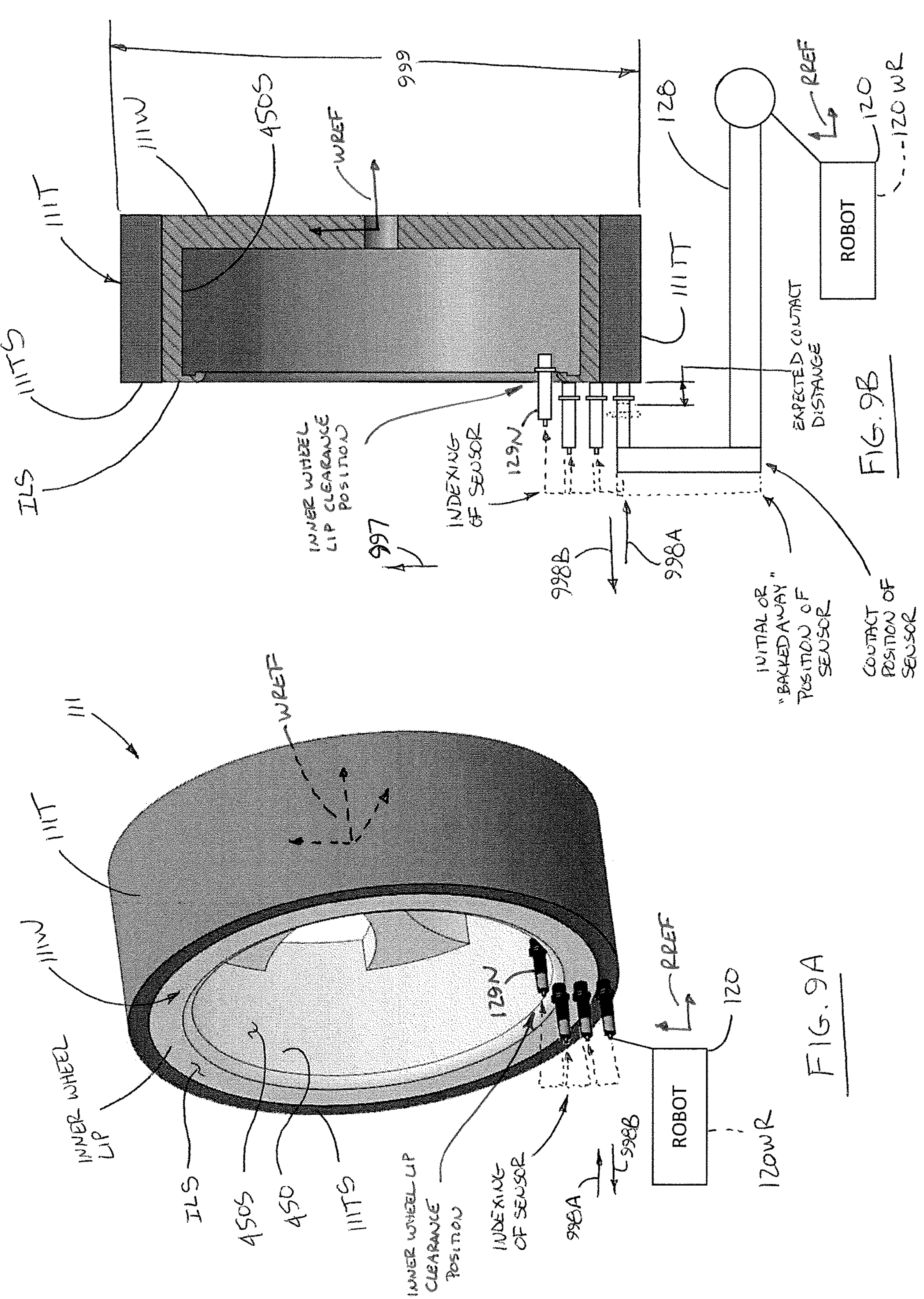
FIGS. 9A-9C are schematic illustrations of a wheel assembly proximity sensor of the automated tire changing system of FIGS. 1A and 1B in accordance with the present disclosure.
Figure 9C:
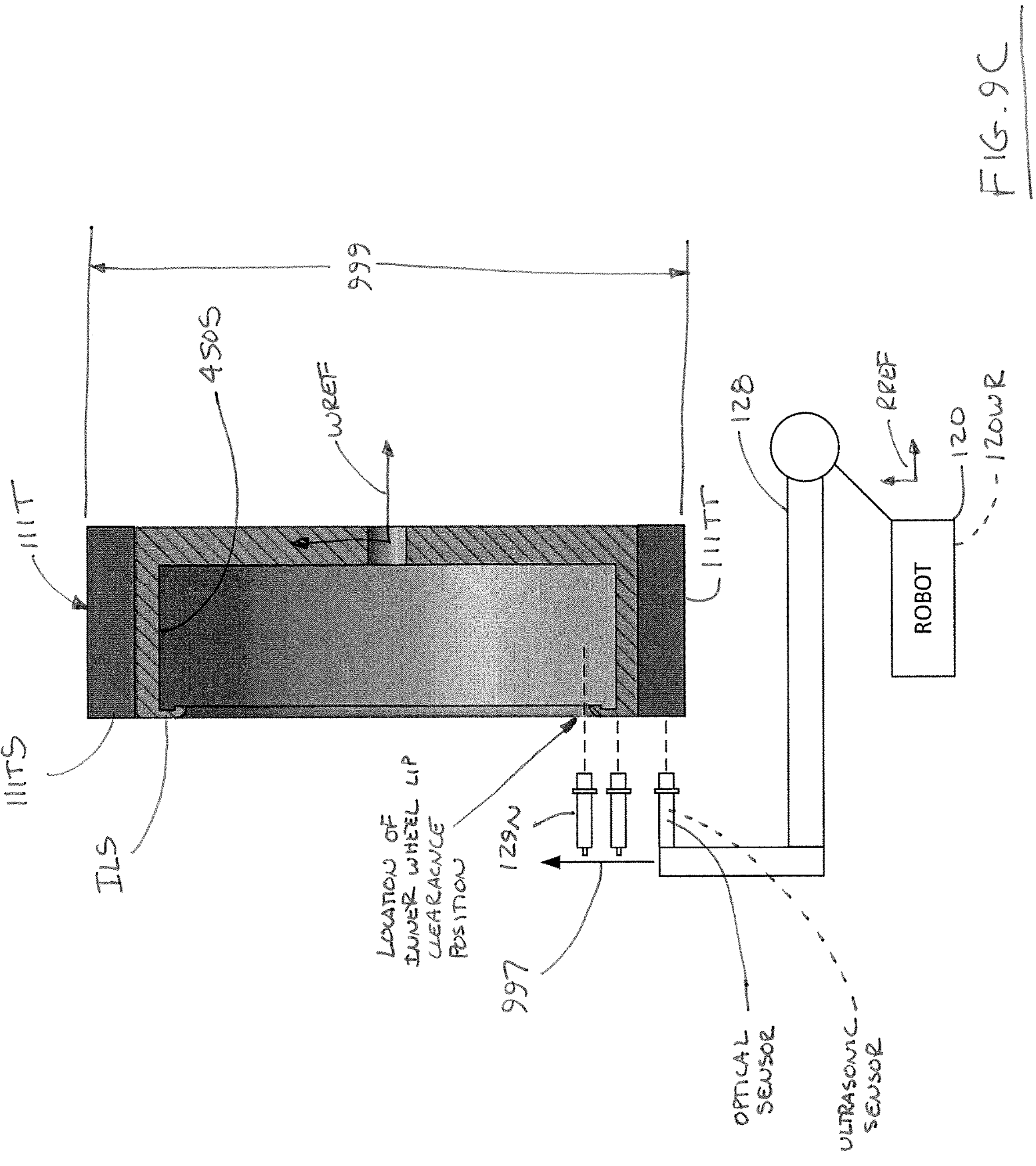

The pick station 799 is formed by a portion of the rail(s) 710A, 710B, 710C downstream from a terminus of the conveyance 730 (see FIGS. 7B and 8B). The conveyance 730 an "endless" conveyance (see FIGS. 7B, 7F, 8B, and 8C) that recirculates itself to convey one or more wheel weights 400 to the pick station 799. In the example illustrated, the conveyance 730 is redirected for recirculation by one or more rollers 733 (or a sprocket, pulley, etc.) where, as the tab 730T and/or magnetic portion 730M travels around the roller 733 the tab 730T and/or magnetic portion 730M disengages from the wheel weight so that the wheel weight 400 is positioned at the pick station 799.

Figure 10:
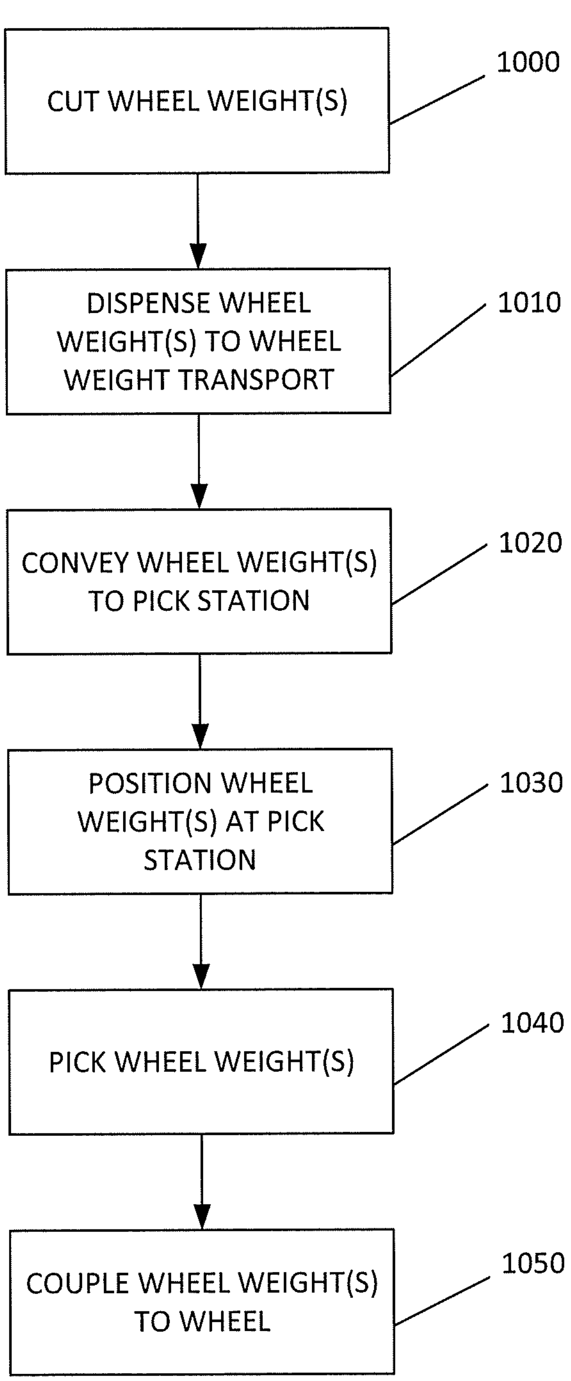
FIG. 10 is a flow diagram of a wheel weight installation method of the automated tire changing system of FIGS. 1A and 1B in accordance with the present disclosure.

In operation, referring also to FIG. 10, the wheel weight dispenser 181, 129Q cuts a length of wheel weights 699ML in accordance with a desired amount of wheel weights to effect balancing a wheel assembly (FIG. 10, Block 1000). The wheel weight dispenser 1181, 129Q pushes the cut length of wheel weights 699ML (e.g., the wheel weight 400 is dispensed) onto the rails 710 (FIG. 10, Block 1010). With the conveyance 730 being driven by the drive 720, a tab 730T and/or magnetic portion 730M couples with the wheel weight 400 and conveys the wheel weight along the rails 710 to the pick station 799 (FIG. 10, Block 1020). At the pick station 799, the tab 730T and/or magnetic portion 730M disengages/decouples from the wheel weight 400 effecting positioning of the wheel weight 400 at the pick station 799 (FIG. 10, Block 1030). The wheel weight 400 is picked from the pick station 799 (FIG. 10, Block 1040) by the wheel weight gripper 129P or the wheel weight installation tool 1290 in the manner described herein and the wheel weight 400 is affixed/coupled to the surface 450S of the barrel 450 of the wheel 111W (FIG. 10, Block 1050) as described herein.

Referring to FIGS. 1A, 1B, 9A, 9B, and 9C, the proximity sensor 129N is coupled to the end effector 128 of the robot 120, 120WR in any suitable manner so that the proximity sensor 129N is positioned to interface with the surfaces of the wheel assembly 111W closest to the centerline of the vehicle such as the surface ILS of the inner wheel lip and the sidewall 111TS of the tire 111T, although in other aspects the proximity sensor may interface with any suitable surface(s) of the wheel assembly 111. The proximity sensor 129N is any suitable sensor including, but not limited to, one or more of a contact sensor (such as a limit switch or other suitable contact sensor), optical sensor, and ultrasonic sensor, where the proximity sensor (via movement of the bot 120) resolves the predetermined location of the tire-wheel assembly relative to the reference frame RREF of the bot 120.

As described above and in U.S. Pat. No. 11,446,826 issued on Sep. 20, 2022 and titled "Autonomous Traverse Tire Changing Bot, Autonomous Tire Changing System, and Method Therefor," previously incorporated herein by reference in its entirety, the position and diameter of the tire 111T may be known to the controller 160 from one or more of the vision systems 130, 162. Here, the one or more vision systems 130, 162 may be employed in combination with the proximity sensor to resolve the predetermined location of the tire-wheel assembly relative to the reference frame RREF of the bot 120, the one or more vision systems 130, 162 alone may be employed to resolve the predetermined location of the tire-wheel assembly relative to the reference frame RREF of the bot 120, or the proximity sensor 129N alone may be employed to resolve the predetermined location of the tire-wheel assembly relative to the reference frame RREF of the bot 120.

Where the proximity sensor 129N is employed to, at least in part, resolve the predetermined location of the tire-wheel assembly relative to the reference frame RREF of the bot 120 the proximity sensor 129N is moved by the bot 120 in one or more degrees of freedom so as to sense or otherwise detect the vehicle 110.

With reference to the proximity sensor 129N being an optical sensor, the optical sensor may be a line scan sensor, a camera, a beam sensor or any other suitable optical sensor. The optical sensor may be moved to detect one or more predetermined features of the vehicle 110 (such as bumpers, wheel wells, etc.) that effect localization of a wheel assembly 111.

In some aspects, datum features 266 may be attached (such as by an operator) to the vehicle 110 or to the frame 189F adjacent the vehicle at predetermined locations relative to the vehicle 110, where the datum features resolve a location of the wheel assembly 111 relative to the reference frame RREF of the bot 120. As an example, where the proximity sensor is a line scan or beam sensor, one or more datum features 266 may be placed (with a vertical or horizontal orientation depending on the structural configuration of the proximity sensor 129N mount to the bot 120) in any suitable manner along a line that has a known position relative to the reference frame RREF of the bot 120 (see FIG. 2B). The datum features 266 may be placed adjacent (e.g., substantially aligned with a center of) a wheel assembly 111, and the bot 120 moves the proximity sensor 129N along the line so as to detect the datum feature 266. The datum feature includes any suitable pattern (e.g., optical pattern, raised features, etc.) that is detected by the optical sensor, where when the pattern is detected the bot 120 (via the controller 160, 160") correlates the location of the datum feature 266 (and the wheel assembly 111 to which the datum feature is aligned) to the reference frame RREF of the bot 120. Knowing the location of the wheel assembly 111 along the traverse path 299 (via detection of the datum feature 266), the bot 120 may move the beam sensor to a position so as to sense the wheel assembly 111 and move the beam sensor in direction 997 from adjacent a (floor) surface of the frame 189F towards the wheel assembly 111 to resolve the location of the wheel assembly 111 relative to the reference frame RREF (see FIG. 9C). As may be realized, the bot 120 may scan (vertically as in FIG. 9C) in one or more locations along the line to determine a low point of the wheel assembly 111) using any suitable geometric algorithms.

Where the sensor is a camera, the bot 120 may move the camera along a side of the vehicle 110 where any suitable vision algorithms (e.g., of controller 160, 160") are employed to detect the wheel assembly 111 and resolve the location of the wheel assembly relative to the reference frame RREF of the bot 120.

With reference to the proximity sensor 129N being a sonic sensor, the sonic sensor may be employed in a manner similar to that of the line scan or beam sensor noted above. As may be realized, vertical and/or horizontal scanning of the wheel assembly 111 with the ultrasonic or optical sensors determines a location (e.g., the bounds) of the inner wheel lip and the location of the barrel 450 of the wheel 111W (see FIG. 9C)

With reference to the proximity sensor 129N being a contact sensor, the bot 120 may probe the workspace of the tire changing station 101 with the bot 120 moving the proximity sensor 129N so as to detect the vehicle 110 via contact between the proximity sensor 129N and the vehicle 110. The bot 120 may be configured (e.g., via controller 160, 160") to detect, via probing, one or more corners of the vehicle 110, where the location of the wheel assembly 111 is resolved by employing known dimensions of the vehicle 110 (e.g., stored any suitable memory accessible by controller 160, 160") and the location of the corner of the vehicle as detected in the reference frame RREF of the bot 120.

Figure 11:
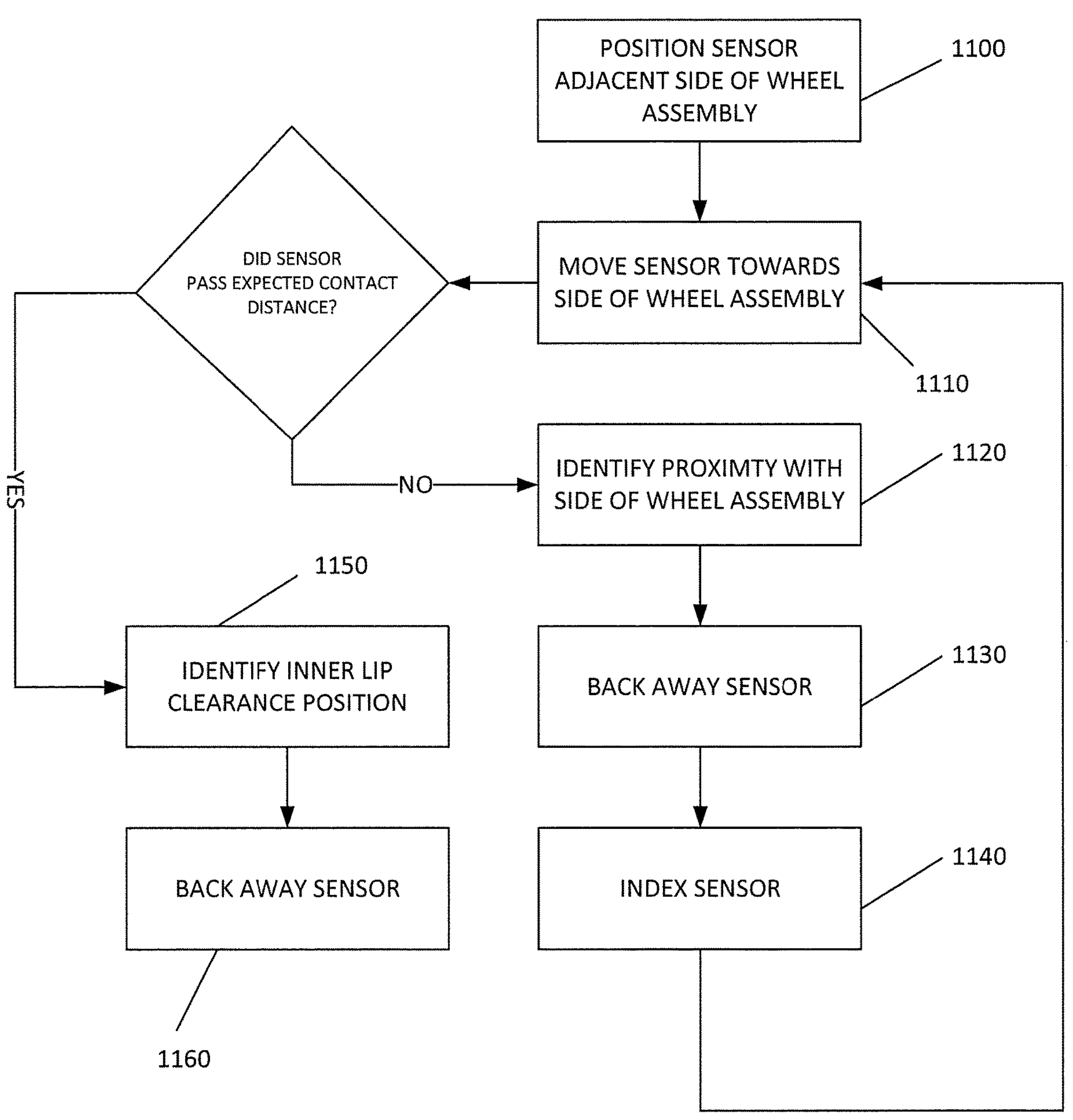
FIG. 11 is a flow diagram of a wheel assembly sensing method of the automated tire changing system of FIGS. 1A and 1B in accordance with the present disclosure.

Referring to FIGS. 1A, 1B, 9A, 9B, and 11, based on the position and diameter information of the tire 111T (as determined in any suitable manner such as those described herein by one or more of the vision system 130, 162 and the (optical, ultrasonic, and/or contact) proximity sensor), an exemplary inner wheel lip localization will be described with respect to the proximity sensor 129N including a contact sensor. The inner wheel lip localization effects determination of an open location of the wheel 111W into which the end effector 128 extends to affix a wheel weight 400 to the wheel 111W. The robot 120, 120WR (under control of controller 160, 160") positions the proximity sensor 129N adjacent the side wall 111TS of the tire 111T (FIG. 11, Block 1100) and is iteratively moved into an out of contact with the wheel assembly 111W in what may be referred to as limit-switch homing method. For example, with the proximity sensor 129N positioned adjacent the side wall 111TS (e.g., inside a diameter 999 of the tire 111T and adjacent the tire tread 111TT—see FIG. 9B), the robot 120, 120WR moves the proximity sensor 129N towards the side wall 111TS (e.g., towards the side of the wheel assembly 111) in direction 998A (FIG. 11, Block 1110). When the proximity sensor 129N contacts the side wall 111TS of the tire 111, the proximity sensor 129N sends a signal to the controller 160 (or any other suitable controller including, but not limited to, controller 160"), where the signal embodies or otherwise indicates a proximity of the proximity sensor 129N (e.g., in this example substantial contact) with the side wall 111TS (FIG. 11, Block 1120). With contact being made between the proximity sensor 129N and the side wall 111TS, the robot 120, 120WR moves (e.g., "backs away") the proximity sensor 129N (FIG. 11, Block 1130) a predetermined distance (e.g., about 5 mm (about 0.2 inches) or more or less than about 5 mm (about 0.2 inches)) in direction 998B away from the side wall 111TS.

With the proximity sensor 129N backed away from the side wall 111TS, the robot 120, 120WR indexes the proximity sensor 129N in direction 997 (towards a center of the tire 111T) by a predetermined distance (e.g., about 5 mm (about 0.2 inches) or more or less than about 5 mm (about 0.2 inches)) (FIG. 11, Block 1140). Blocks 1110-1140 of FIG. 11 are repeated until the proximity sensor 129N is moved past (as determined by the controller 160, 160" from data obtained from any suitable encoders of the robot 120, 120WR or as determined in any other suitable manner) an expected contact distance (e.g., the proximity sensor 129N iteratively contacts the wheel assembly 111 (including the side wall 111TS and surface ILS of the inner wheel lip) along a substantially radial line in direction 997 until the proximity sensor moves in direction 997 past the surface ILS and into the barrel 450 of the wheel 111W. The expected contact distance may be determined, by the controller 160, 160" from data obtained from any suitable encoders of the robot 120, 120WR (or in any other suitable manner), as the distance the proximity sensor 129N is moved in the initial approach (FIG. 11, Block 1110) to contact the side wall 111TS. The expected contact distance may have a predetermined tolerance (e.g., a tolerance of about +/−5 mm (about +/−0.2 inches) or a tolerance greater or less than about +/−5 mm (about +/−0.2 inches)) to account for variations in the side wall 111TS and transitions between the side wall 111TS and the surface ILS.

An inner lip clearance position is identified (FIG. 11, Block 1150) by the controller 160, 160" in the robot 120, 120WR coordinate system as the location in direction 997 which the proximity sensor 129N moved past the expected contact distance. The inner lip clearance position is the location in direction 997 at which the robot 120, 120WR may insert the wheel weight gripper 129P or wheel weight installation tool 1290 into the barrel 450 substantially without obstruction from the wheel 111W and/or tire 111T for applying a wheel weight 400 to the wheel 111W or wheel assembly 111. The proximity sensor 129N is backed away from the wheel assembly 111 (FIG. 11, Block 1160) so that the wheel weight 400 may be installed.

Figure 12:
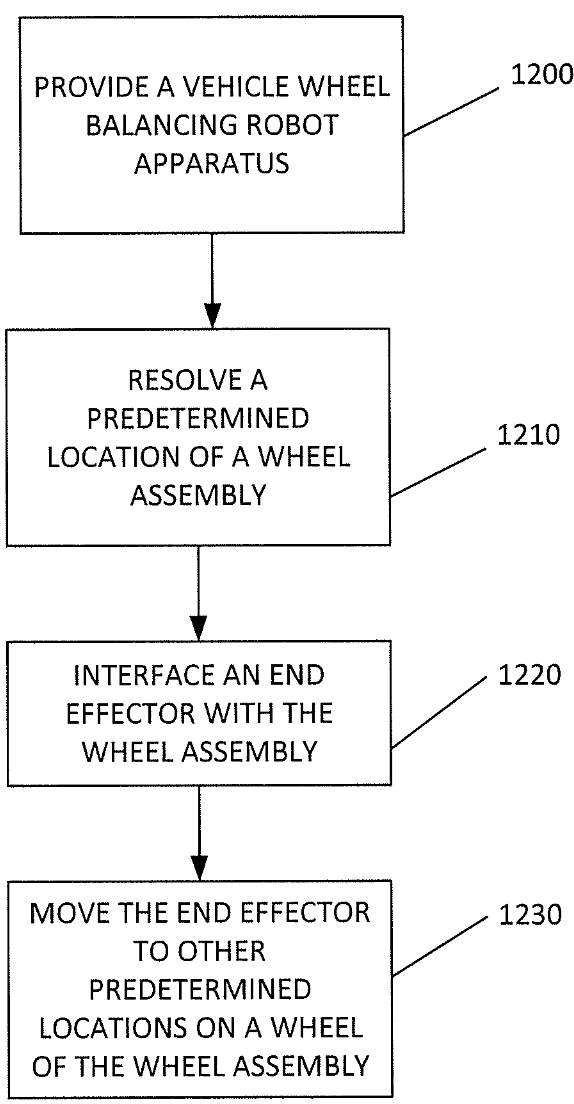
FIGS. 12-15 are flow diagrams of wheel balancing methods of the automated tire changing system of FIGS. 1A and 1B in accordance with the present disclosure.
Figure 13:
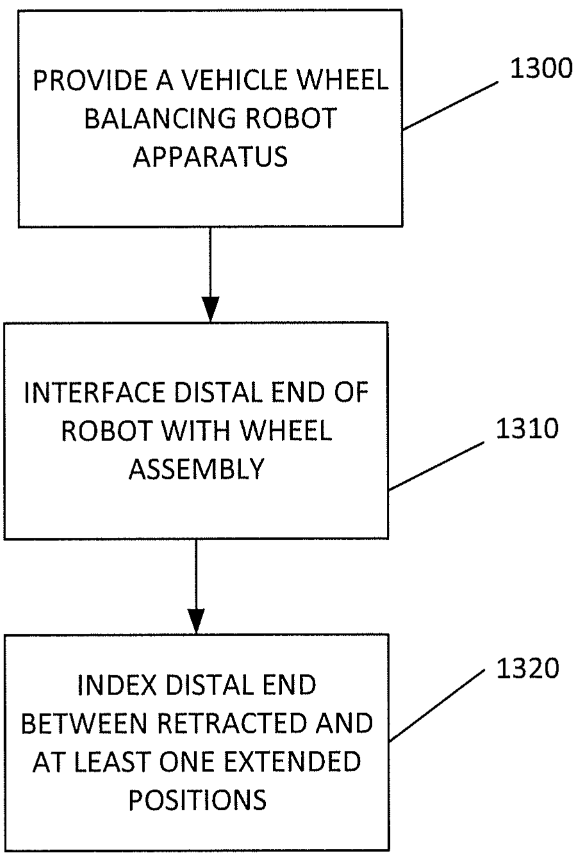

Referring to FIGS. 1A-9C and 12 an exemplary vehicle component balancing method for on vehicle balancing of one or more of the tire 111T, the wheel 111W, the bearings 111B, the brake components 111RD (e.g., including, but not limited to, the brake drums 111D and the brake rotors 111R), and the vehicle components 111C that impart, e.g., with the vehicle 110 in motion, vibrations to the vehicle 110 (e.g., such as by, but not limited to, imparting eccentric forces to a wheel hub 110H (see FIG. 1B) of the road vehicle 110) will be described. In accordance with the method, a vehicle component balancing robot apparatus 189 for on vehicle balancing of the one or more of the tire 111T, the wheel 111W, the bearings 111B, the brake components 111RD, and the vehicle components 111C is provided (FIG. 12, Block 1200). The vehicle component balancing robot apparatus 189 has a frame 189F, as described herein, arranged so as to connect with the vehicle 110. A predetermined location of the tire-wheel assembly relative to a reference frame of the bot 120 is resolved (FIG. 12, Block 1210) by moving the bot 120 relative to the frame 189F in at least one degree of freedom (as described herein), where the robot is connected to the frame 189F (such as by the rails or wheels described herein) and has the at least one degree of freedom (such as along traverse path 299 and/or along any one or more axes of motion of the bot 120). The end effector 128 of the bot 120 is interfaced with the wheel assembly 111 (FIG. 12, Block 1220) and the bot 120 moves the end effector to other predetermined locations (such as, for example, the wheel weight installation locations described herein) on the wheel 111W of the wheel assembly 111 (FIG. 12, Block 1230), where the other predetermined locations are determined based on resolution of the predetermined location of the wheel assembly 111 relative to a reference frame RREF of the bot 120.

Referring to FIGS. 1A-9C and 13 an exemplary vehicle component balancing method for on vehicle balancing of one or more of the tire 111T, the wheel 111W, the bearings 111B, the brake components 111RD (e.g., including, but not limited to, the brake drums 111D and the brake rotors 111R), and the vehicle components 111C that impart, e.g., with the vehicle 110 in motion, vibrations to the vehicle 110 (e.g., such as by, but not limited to, imparting eccentric forces to a wheel hub 110H (see FIG. 1B) of the road vehicle 110) will be described. The method includes providing a vehicle component balancing robot apparatus 189 for on vehicle balancing of the one or more of the tire 111T, the wheel 111W, the bearings 111B, the brake components 111RD, and the vehicle components 111C (FIG. 13, Block 1300), where the vehicle component balancing robot apparatus 189 has a frame 189F arranged so as to connect with the vehicle 110. A distal end 120D of a robot 120, of the vehicle component balancing robot apparatus 189, is interfaced with the wheel assembly 111 (FIG. 13, Block 1310), where the robot 120 is connected to the frame 189F at a proximal end 120P of the robot 120, the proximal end 120P being opposite the distal end 120D. The distal end 120D is indexed, with an indexer (also referred to as a wheel weigh installation tool) 1290 of the robot 120, between a retracted position (see FIG. 5A) and at least one extended position (see FIGS. 5B and 5C) (FIG. 13, Block 1320), wherein in the at least one extended position the distal end 120D interfaces the wheel assembly 111 determining a rim or wheel location of the wheel 111W of the wheel assembly 111 mounted on the vehicle 110.

Figure 14:
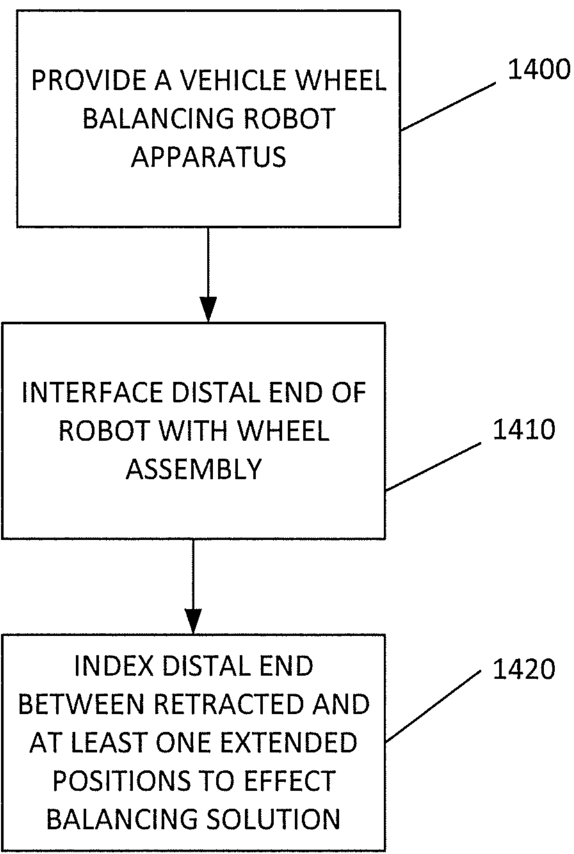

Referring to FIGS. 1A-9C and 14 an exemplary vehicle component balancing method for on vehicle balancing of one or more of the tire 111T, the wheel 111W, the bearings 111B, the brake components 111RD (e.g., including, but not limited to, the brake drums 111D and the brake rotors 111R), and the vehicle components 111C that impart, e.g., with the vehicle 110 in motion, vibrations to the vehicle 110 (e.g., such as by, but not limited to, imparting eccentric forces to a wheel hub 110H (see FIG. 1B) of the road vehicle 110) will be described. The method includes providing a vehicle component balancing robot apparatus 189 for on vehicle balancing of the one or more of the tire 111T, the wheel 111W, the bearings 111B, the brake components 111RD, and the vehicle components 111C that impart, e.g., with the vehicle 110 in motion, vibrations to the vehicle 110 (e.g., such as by, but not limited to, imparting eccentric forces to a wheel hub 110H (see FIG. 1B)) (FIG. 14, Block 1400), where the vehicle component balancing robot apparatus 189 has a frame 189F arranged so as to connect with the vehicle 110. A distal end 120D of a robot 120 (of the vehicle component balancing robot apparatus 189) is indexed with the wheel assembly 111 (FIG. 14, Block 1410), where the robot 120 is connected to the frame 189F at a proximal end 120P of the robot, the proximal end 120P being opposite the distal end 120D. The distal end 120D is indexed, with an indexer of the robot, between a retracted position (see FIG. 5A) and at least one extended position (see FIGS. 5B and 5C), wherein in the at least one extended position the distal end 120D interfaces the wheel assembly 111 determining a wheel or rim location of the wheel or rim 111W of the wheel assembly 111 and predetermined locations (such as wheel weigh locations) so as to effect a balancing solution of the one or more of the tire 111T, the wheel 111W, the bearings 111B, the brake components 111RD, and the vehicle components 111C via robotic application of wheel balancing weights 400 with the distal end 120D (FIG. 14, Block 1420).

Figure 15:
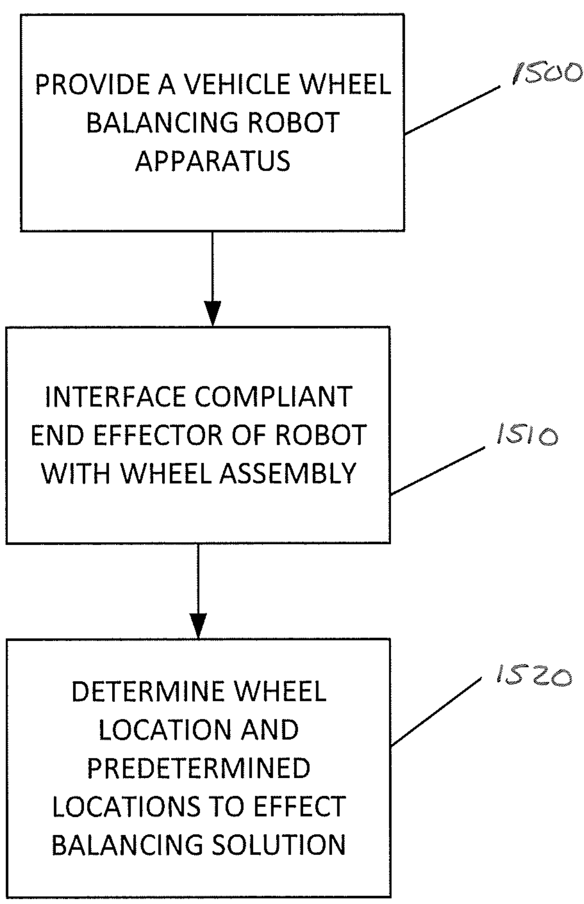

Referring to FIGS. 1A-9C and 15 an exemplary vehicle component balancing method for on vehicle balancing of one or more of the tire 111T, the wheel 111W, the bearings 111B, the brake components 111RD (e.g., including, but not limited to, the brake drums 111D and the brake rotors 111R), and the vehicle components 111C that impart, e.g., with the vehicle 110 in motion, vibrations to the vehicle 110 (e.g., such as by, but not limited to, imparting eccentric forces to a wheel hub 110H (see FIG. 1B) of the road vehicle 110) will be described. The method includes providing a vehicle component balancing robot apparatus 189 for on vehicle balancing of the one or more of the tire 111T, the wheel 111W, the bearings 111B, the brake components 111RD, and the vehicle components 111C (FIG. 15, Block 1500), the vehicle component balancing robot apparatus 189 having a frame 189F arranged so as to connect with the vehicle 110. A compliant end effector (such as wheel weight gripper 129P or wheel weight installation tool 1290), of a robot 120 (of the vehicle component balancing robot apparatus 189), is interfaced with the wheel assembly 111 (FIG. 15, Block 1510), where the robot 120 is connected to the frame 189F at a proximal end 120P of the robot 120, and the compliant end effector is disposed opposite the proximal end 120P. The method includes determining, with the compliant end effector interfacing the wheel assembly 111, a rim or wheel location of the wheel or rim 111W of the wheel assembly 111 and predetermined locations (such as wheel weight locations) so as to effect a balancing solution of the one or more of the tire 111T, the wheel 111W, the bearings 111B, the brake components 111RD, and the vehicle components 111C via robotic application of wheel balancing weights 400 with the compliant end effector (FIG. 15, Block 1520).

In accordance with one or more aspects of the present disclosure, a vehicle component balancing robot apparatus, for on vehicle balancing of one or more of a tire, a wheel, bearings, brake components, and vehicle components that impart vibrations to the vehicle, is provided. The apparatus includes: a frame arranged so as to connect with the vehicle; and a robot connected to the frame, the robot having at least one degree of freedom so as to move, in the at least one degree of freedom, relative to the frame, and is configured so that the move, relative to the frame in the at least one degree of freedom, resolves a predetermined location of a tire-wheel assembly of the vehicle relative to a reference frame of the robot; wherein the robot has at least one end effector arranged to interface the tire-wheel assembly and the robot moves the at least one end effector to other predetermined locations on a wheel rim of the tire-wheel assembly, determined based on resolution of the predetermined location of the tire-wheel assembly relative to the reference frame of the robot.

In accordance with one or more aspects of the present disclosure, the predetermined location determines a frame of reference of the tire-wheel assembly relative to the reference frame of the robot.

In accordance with one or more aspects of the present disclosure, the other predetermined locations on the wheel rim are wheel balancing weight locations resolving imbalance of the one or more of the tire, the wheel, the bearings, the brake components, and the vehicle components that impart vibrations to the vehicle.

In accordance with one or more aspects of the present disclosure, the at least one end effector interfaces the tire-wheel assembly at the other predetermined locations so as to effect a balancing solution of one or more of the tire, the wheel, the bearings, the brake components, and the vehicle components that impart vibrations to the vehicle via robotic application of wheel balancing weights with the at least one end effector.

In accordance with one or more aspects of the present disclosure, the robot has a driven actuator, driven so as to extend in the at least one degree of freedom between a retracted position and an extended position, the extended position locating the at least one end effector proximate the tire-wheel assembly.

In accordance with one or more aspects of the present disclosure, the actuator has an indexer arranged to index the at least one end effector, in the at least one degree of freedom, and position the at least one end effector at different index positions corresponding to wheel balancing weight locations on the wheel rim.

In accordance with one or more aspects of the present disclosure, the indexer has an index position that places the at least one end effector in contact with the wheel rim determining a rim location on the wheel rim, of the tire-wheel assembly mounted on the vehicle.

In accordance with one or more aspects of the present disclosure, the at least one end effector has a wheel balancing weight grip, and a resiliently compliant wheel balancing weight applicator.

In accordance with one or more aspects of the present disclosure, the at least one end effector includes an indexer that effects placement of a wheel balancing weight at one or more locations on the wheel rim.

In accordance with one or more aspects of the present disclosure, the one or more locations on the wheel rim include a location adjacent a back of a wheel flange and another location adjacent an inner wheel lip.

In accordance with one or more aspects of the present disclosure, the indexer includes at least one actuator having at least a first extension position and a second extension position.

In accordance with one or more aspects of the present disclosure, the wheel balancing weight installation tool includes a conforming wheel balancing weight gripper that conforms, from a relaxed configuration, to a contour of a surface of the wheel rim onto which the wheel balancing weight is applied.

In accordance with one or more aspects of the present disclosure, the at least one end effector includes a conforming wheel balancing weight gripper that conforms, from a relaxed configuration, to a contour of a surface of the wheel rim onto which the wheel balancing weight is applied.

In accordance with one or more aspects of the present disclosure, the conforming wheel balancing weight gripper includes a flexible grip configured to grip and hold a wheel balancing weight.

In accordance with one or more aspects of the present disclosure, the flexible grip includes one or more of magnets, vacuum grips, and clips.

In accordance with one or more aspects of the present disclosure, the vehicle component balancing robot apparatus further includes one or more sensors configured to resolve the predetermined location of the tire-wheel assembly relative to the reference frame of the robot.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the at least one end effector, where the robot moves the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one end effector, where the robot moves the proximity sensor to iteratively contact a side of the tire-wheel assembly and effect determination of an open location of the wheel into which the at least one end effector extends to affix a wheel weight to the wheel.

In accordance with one or more aspects of the present disclosure, the vehicle component balancing robot apparatus further includes a wheel balancing weight dispenser connected to the frame.

In accordance with one or more aspects of the present disclosure, the wheel balancing weight dispenser includes a wheel weight transport configured to convey and position wheel balancing weights at an interface location where the robot picks the wheel balancing weights from the wheel weight transport.

In accordance with one or more aspects of the present disclosure, the wheel weight transport is configured to convey adhesive wheel balancing weights sans an adhesive backing of the wheel balancing weights.

In accordance with one or more aspects of the present disclosure, the wheel balancing weight dispenser is configured to remove the adhesive backing from the wheel balancing weights for transport on the wheel weight transport.

In accordance with one or more aspects of the present disclosure, the wheel balancing weight dispenser includes an automated weight-measuring roller and a cutting blade, the automated weight-measuring roller being configured to unroll and index a predetermined amount of weight past the cutting blade and the cutting blade is configured to cut the predetermined amount of weight to form a wheel balancing weight of a predetermined weight that resolves imbalance of the one or more of the tire, the wheel, the bearings, the brake components, and the vehicle components that impart vibrations to the vehicle.

In accordance with one or more aspects of the present disclosure, a vehicle component balancing method, for on vehicle balancing of one or more of a tire, a wheel, bearings, brake components, and vehicle components that impart vibrations to the vehicle, is provided. The method includes: providing a vehicle component balancing robot apparatus for on vehicle balancing of the one or more of the tire, the wheel, the bearings, the brake components, and the vehicle components that impart vibrations to the vehicle, the vehicle component balancing robot apparatus having a frame arranged so as to connect with the vehicle; resolving a predetermined location of a tire-wheel assembly of the vehicle relative to a reference frame of a robot by moving the robot relative to the frame in at least one degree of freedom, where the robot is connected to the frame and has the at least one degree of freedom; interfacing at least one end effector of the robot with the tire-wheel assembly; and moving, with the robot, the at least one end effector to other predetermined locations on a wheel rim of the tire-wheel assembly, determined based on resolution of the predetermined location of the tire-wheel assembly relative to a reference frame of the robot.

In accordance with one or more aspects of the present disclosure, the predetermined location determines a frame of reference of the tire-wheel assembly relative to the reference frame of the robot.

In accordance with one or more aspects of the present disclosure, the other predetermined locations on the wheel rim are wheel balancing weight locations resolving imbalance of the one or more of the tire, the wheel, the bearings, the brake components, and the vehicle components that impart vibrations to the vehicle.

In accordance with one or more aspects of the present disclosure, the at least one end effector interfaces the tire-wheel assembly at the other predetermined locations so as to effect a balancing solution of the one or more of the tire, the wheel, the bearings, the brake components, and the vehicle components that impart vibrations to the vehicle via robotic application of wheel balancing weights with the at least one end effector.

In accordance with one or more aspects of the present disclosure, the robot has a driven actuator that is driven so as to extend in the at least one degree of freedom between a retracted position and an extended position, the extended position locating the at least one end effector proximate the tire-wheel assembly.

In accordance with one or more aspects of the present disclosure, the actuator has an indexer that indexed the at least one end effector, in the at least one degree of freedom, and position the at least one end effector at different index positions corresponding to wheel balancing weight locations on the wheel rim.

In accordance with one or more aspects of the present disclosure, the indexer has an index position that places the at least one end effector in contact with the wheel rim determining a rim location on the wheel rim, of the tire-wheel assembly mounted on the vehicle.

In accordance with one or more aspects of the present disclosure, the at least one end effector has a wheel balancing weight grip, and a resiliently compliant wheel balancing weight applicator.

In accordance with one or more aspects of the present disclosure, the method further includes, with an indexer of the at least one end effector, placement of a wheel balancing weight at one or more locations on the wheel rim.

In accordance with one or more aspects of the present disclosure, the one or more locations on the wheel rim include a location adjacent a back of a wheel flange and another location adjacent an inner wheel lip.

In accordance with one or more aspects of the present disclosure, the indexer includes at least one actuator having a first extension position and a second extension position.

In accordance with one or more aspects of the present disclosure, the wheel balancing weight is applied with a conforming wheel balancing weight gripper of the wheel balancing weight installation tool, where the conforming wheel balancing weight gripper conforms, from a relaxed configuration, to a contour of a surface of the wheel rim onto which the wheel balancing weight is applied.

In accordance with one or more aspects of the present disclosure, the wheel balancing weight is applied with a conforming wheel balancing weight gripper of the at least one end effector that conforms, from a relaxed configuration, to a contour of a surface of the wheel rim onto which the wheel balancing weight is applied.

In accordance with one or more aspects of the present disclosure, the conforming wheel balancing weight gripper includes a flexible grip that grips and holds a wheel balancing weight.

In accordance with one or more aspects of the present disclosure, the flexible grip holds the wheel balancing weight with one or more of magnets, vacuum grips, and clips of the flexible grip.

In accordance with one or more aspects of the present disclosure, the method further includes resolving the predetermined location of the tire-wheel assembly relative to the reference frame of the robot with one or more sensors of the vehicle component balancing robot apparatus.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the at least one end effector, the method further comprising moving, with the robot, the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one end effector, the method further comprising moving, with the robot, the proximity sensor to iteratively contact a side of the tire-wheel assembly and effect determination of an open location of the wheel into which the at least one end effector extends to affix a wheel weight to the wheel.

In accordance with one or more aspects of the present disclosure, a wheel balancing weight dispenser is connected to the frame for dispensing wheel weights to the robot.

In accordance with one or more aspects of the present disclosure, the wheel balancing weight dispenser has a wheel weight transport that conveys and positions wheel balancing weights at an interface location where the robot picks the wheel balancing weights from the wheel weight transport.

In accordance with one or more aspects of the present disclosure, the wheel weight transport conveys adhesive wheel balancing weights sans an adhesive backing of the wheel balancing weights.

In accordance with one or more aspects of the present disclosure, the wheel balancing weight dispenser removes the adhesive backing from the wheel balancing weights prior to or after transport of the wheel weights on the wheel weight transport.

In accordance with one or more aspects of the present disclosure, the wheel balancing weight dispenser includes an automated weight-measuring roller and a cutting blade, method further comprises unrolling and indexing, with the automated weight-measuring roller, a predetermined amount of weight past the cutting blade and cutting, with the cutting blade, the predetermined amount of weight to form a wheel balancing weight of a predetermined weight that resolves imbalance of the one or more of the tire, the wheel, the bearings, the brake components, and the vehicle components that impart vibrations to the vehicle.

In accordance with one or more aspects of the present disclosure, the wheel balancing weight dispenser removes the adhesive backing from the wheel balancing weights prior to or after cutting of the predetermined amount of weight.

In accordance with one or more aspects of the present disclosure, a vehicle component balancing robot apparatus, for on vehicle balancing of one or more of a tire, a wheel, bearings, brake components, and vehicle components that impart vibrations to the vehicle, is provided. The apparatus comprising: a frame arranged so as to connect with the vehicle; and a robot connected to the frame at a proximal end of the robot, and the robot has a distal end, opposite the proximal end, the distal end being arranged so as to interface with a tire-wheel assembly of the vehicle; wherein the robot has an indexer that indexes the distal end between a retracted position and at least one extended position, wherein in the at least one extended position the distal end interfaces the tire-wheel assembly determining a rim location of the wheel rim of the tire wheel assembly and predetermined locations so as to effect a balancing solution of the one or more of the tire, the wheel, the bearings, the brake components, and the vehicle components that impart vibrations to the vehicle via robotic application of wheel balancing weights with the distal end.

In accordance with one or more aspects of the present disclosure, the indexer is a multi-index stage indexer, each index stage having at least one index position.

In accordance with one or more aspects of the present disclosure, at least one index stage has different index positions that position the interface corresponding to wheel balancing weight locations on the wheel rim so as to effect the balancing solution.

In accordance with one or more aspects of the present disclosure, the robot has at least one degree of freedom and is configured to move the distal end in the one degree of freedom relative to the frame so that the move resolves another predetermined location of the tire-wheel assembly relative to a reference frame of the robot; and the distal end is arranged to interface the tire-wheel assembly and the robot moves the distal end to the predetermined locations on a wheel rim of the tire-wheel assembly, determined based on resolution of the other predetermined location of the tire-wheel assembly relative to the reference frame of the robot.

In accordance with one or more aspects of the present disclosure, the other predetermined location determines a frame of reference of the tire-wheel assembly relative to the reference frame of the robot.

In accordance with one or more aspects of the present disclosure, the predetermined locations on the wheel rim are wheel balancing weight locations resolving imbalance of the one or more of the tire, the wheel, the bearings, the brake components, and the vehicle components that impart vibrations to the vehicle.

In accordance with one or more aspects of the present disclosure, the distal end interfaces the tire-wheel assembly at the predetermined locations so as to effect a balancing solution of the one or more of the tire, the wheel, the bearings, the brake components, and the vehicle components that impart vibrations to the vehicle via robotic application of wheel balancing weights with the at least one end effector.

In accordance with one or more aspects of the present disclosure, the robot has a driven actuator, the driven actuator has the distal end and the actuator is driven so as to extend in at least one degree of freedom of the robot between a retracted position and an extended position, the extended position locating the distal end proximate the tire-wheel assembly.

In accordance with one or more aspects of the present disclosure, the actuator has the indexer arranged to index the distal end, in the at least one degree of freedom, and position the distal end at different index positions corresponding to wheel balancing weight locations on the wheel rim.

In accordance with one or more aspects of the present disclosure, the indexer has an index position that places the distal end in contact with the wheel rim determining a rim location on the wheel rim, of the tire-wheel assembly mounted on the vehicle.

In accordance with one or more aspects of the present disclosure, the distal end has a wheel balancing weight grip, and a resiliently compliant wheel balancing weight applicator.

In accordance with one or more aspects of the present disclosure, the vehicle component balancing robot apparatus further includes one or more sensors configured to resolve the other predetermined location of the tire-wheel assembly relative to the reference frame of the robot.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the distal end, where the robot moves the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one end effector, where the robot moves the proximity sensor to iteratively contact a side of the tire-wheel assembly and effect determination of an open location of the wheel into which the at least one end effector extends to affix a wheel weight to the wheel.

In accordance with one or more aspects of the present disclosure, the indexer effects placement of a wheel balancing weight at the predetermined locations on the wheel rim.

In accordance with one or more aspects of the present disclosure, the predetermined locations on the wheel rim include a location adjacent a back of a wheel flange and another location adjacent an inner wheel lip.

In accordance with one or more aspects of the present disclosure, the indexer includes at least one actuator having a first extension position and a second extension position.

In accordance with one or more aspects of the present disclosure, the indexer includes a conforming wheel balancing weight gripper that conforms, from a relaxed configuration, to a contour of a surface of the wheel rim onto which the wheel balancing weight is applied.

In accordance with one or more aspects of the present disclosure, the distal end includes a conforming wheel balancing weight gripper that conforms, from a relaxed configuration, to a contour of a surface of the wheel rim onto which the wheel balancing weight is applied.

In accordance with one or more aspects of the present disclosure, the conforming wheel balancing weight gripper includes a flexible grip configured to grip and hold a wheel balancing weight.

In accordance with one or more aspects of the present disclosure, the flexible grip includes one or more of magnets, vacuum grips, and clips.

In accordance with one or more aspects of the present disclosure, the vehicle component balancing robot apparatus further includes a wheel balancing weight dispenser connected to the frame, the wheel balancing weight dispenser includes a wheel weight transport configured to convey and position wheel balancing weights at an interface location where the robot picks the wheel balancing weights from the wheel weight transport.

In accordance with one or more aspects of the present disclosure, the wheel weight transport is configured to convey adhesive wheel balancing weights sans an adhesive backing of the wheel balancing weights.

In accordance with one or more aspects of the present disclosure, the wheel balancing weight dispenser is configured to remove the adhesive backing from the wheel balancing weights for transport on the wheel weight transport.

In accordance with one or more aspects of the present disclosure, the wheel balancing weight dispenser includes an automated weight-measuring roller and a cutting blade, the automated weight-measuring roller being configured to unroll and index a predetermined amount of weight past the cutting blade and the cutting blade is configured to cut the predetermined amount of weight to form a wheel balancing weight of a predetermined weight that resolves imbalance of the one or more of the tire, the wheel, the bearings, the brake components, and the vehicle components that impart vibrations to the vehicle.

In accordance with one or more aspects of the present disclosure, a vehicle component balancing method, for on vehicle balancing of one or more of a tire, a wheel, bearings, brake components, and vehicle components that impart vibrations to the vehicle, is provided. The method comprising: providing a vehicle component balancing robot apparatus for on vehicle balancing of the one or more of the tire, the wheel, the bearings, the brake components, and the vehicle components that impart vibrations to the vehicle, the vehicle component balancing robot apparatus having a frame arranged so as to connect with the vehicle; and interfacing a distal end of a robot with a tire-wheel assembly of the vehicle, where the robot is connected to the frame at a proximal end of the robot, opposite the distal end; indexing, with an indexer of the robot, the distal end between a retracted position and at least one extended position, wherein in the at least one extended position the distal end interfaces the tire-wheel assembly determining a rim location of the wheel rim of the tire wheel assembly and predetermined locations so as to effect a balancing solution of the one or more of the tire, the wheel, the bearings, the brake components, and the vehicle components that impart vibrations to the vehicle via robotic application of wheel balancing weights with the distal end.

In accordance with one or more aspects of the present disclosure, the indexer is a multi-index stage indexer, each index stage having at least one index position.

In accordance with one or more aspects of the present disclosure, at least one index stage has different index positions that position the interface corresponding to wheel balancing weight locations on the wheel rim so as to effect the balancing solution.

In accordance with one or more aspects of the present disclosure, the robot has at least one degree of freedom and moves the distal end in the one degree of freedom relative to the frame so that the move resolves another predetermined location of the tire-wheel assembly relative to a reference frame of the robot; and the distal end is arranged to interface the tire-wheel assembly and the robot moves the distal end to the predetermined locations on a wheel rim of the tire-wheel assembly, determined based on resolution of the other predetermined location of the tire-wheel assembly relative to the reference frame of the robot.

In accordance with one or more aspects of the present disclosure, the other predetermined location determines a frame of reference of the tire-wheel assembly relative to the reference frame of the robot.

In accordance with one or more aspects of the present disclosure, the predetermined locations on the wheel rim are wheel balancing weight locations resolving imbalance of the one or more of the tire, the wheel, the bearings, the brake components, and the vehicle components that impart vibrations to the vehicle.

In accordance with one or more aspects of the present disclosure, the distal end interfaces the tire-wheel assembly at the predetermined locations so as to effect a balancing solution of the one or more of the tire, the wheel, the bearings, the brake components, and the vehicle components that impart vibrations to the vehicle via robotic application of wheel balancing weights with the distal end.

In accordance with one or more aspects of the present disclosure, the robot has a driven actuator, the driven actuator has the distal end and the actuator is driven so as to extend in at least one degree of freedom of the robot between a retracted position and an extended position, the extended position locating the distal end proximate the tire-wheel assembly.

In accordance with one or more aspects of the present disclosure, the actuator has the indexer and indexes the distal end, in the at least one degree of freedom, and positions the distal end at different index positions corresponding to wheel balancing weight locations on the wheel rim.

In accordance with one or more aspects of the present disclosure, the indexer has an index position that places the distal end in contact with the wheel rim determining a rim location on the wheel rim, of the tire-wheel assembly mounted on the vehicle.

In accordance with one or more aspects of the present disclosure, the distal end has a wheel balancing weight grip, and a resiliently compliant wheel balancing weight applicator.

In accordance with one or more aspects of the present disclosure, the method further includes resolving, with one or more sensors, the other predetermined location of the tire-wheel assembly relative to the reference frame of the robot.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the distal end, where the robot moves the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one end effector, where the robot moves the proximity sensor to iteratively contact a side of the tire-wheel assembly and effect determination of an open location of the wheel into which the at least one end effector extends to affix a wheel weight to the wheel.

In accordance with one or more aspects of the present disclosure, the indexer effects placement of a wheel balancing weight at the predetermined locations on the wheel rim.

In accordance with one or more aspects of the present disclosure, the predetermined locations on the wheel rim include a location adjacent a back of a wheel flange and another location adjacent an inner wheel lip.

In accordance with one or more aspects of the present disclosure, the indexer includes at least one actuator having a first extension position and a second extension position.

In accordance with one or more aspects of the present disclosure, the indexer includes a conforming wheel balancing weight gripper that conforms, from a relaxed configuration, to a contour of a surface of the wheel rim onto which the wheel balancing weight is applied.

In accordance with one or more aspects of the present disclosure, the distal end includes a conforming wheel balancing weight gripper that conforms, from a relaxed configuration, to a contour of a surface of the wheel rim onto which the wheel balancing weight is applied.

In accordance with one or more aspects of the present disclosure, the conforming wheel balancing weight gripper includes a flexible grip configured to grip and hold a wheel balancing weight.

In accordance with one or more aspects of the present disclosure, the flexible grip includes one or more of magnets, vacuum grips, and clips.

In accordance with one or more aspects of the present disclosure, the method further includes, with a wheel balancing weight dispenser connected to the frame where the wheel balancing weight dispenser includes a wheel weight transport, conveying and positioning wheel balancing weights at an interface location where the robot picks the wheel balancing weights from the wheel weight transport.

In accordance with one or more aspects of the present disclosure, the wheel weight transport conveys adhesive wheel balancing weights sans an adhesive backing of the wheel balancing weights.

In accordance with one or more aspects of the present disclosure, the wheel balancing weight dispenser removes the adhesive backing from the wheel balancing weights for transport on the wheel weight transport.

In accordance with one or more aspects of the present disclosure, the wheel balancing weight dispenser includes an automated weight-measuring roller and a cutting blade, where the automated weight-measuring roller unrolls and indexes a predetermined amount of weight past the cutting blade and the cutting blade cuts the predetermined amount of weight to form a wheel balancing weight of a predetermined weight that resolves imbalance of the one or more of the tire, the wheel, the bearings, the brake components, and the vehicle components that impart vibrations to the vehicle.

In accordance with one or more aspects of the present disclosure, a vehicle component balancing robot apparatus, for on vehicle balancing of one or more of a tire, a wheel, bearings, brake components, and vehicle components that impart vibrations to the vehicle, is provided. The apparatus comprising: a frame arranged so as to connect with the vehicle; and a robot connected to the frame at a proximal end of the robot, and the robot has a distal end, opposite the proximal end, the distal end being arranged so as to interface with a tire-wheel assembly of the vehicle; wherein the robot has an indexer that indexes the distal end between a retracted position and at least one extended position, wherein in the at least one extended position the distal end interfaces the tire-wheel assembly determining a rim location of the wheel rim of the tire wheel assembly mounted on the vehicle.

In accordance with one or more aspects of the present disclosure, the indexer is a multi-index stage indexer, each index stage having at least one index position.

In accordance with one or more aspects of the present disclosure, at least one index stage has different index positions that position the interface corresponding to wheel balancing weight locations on the wheel rim so as to effect a balancing solution of the one or more of the tire, the wheel, the bearings, the brake components, and the vehicle components that impart vibrations to the vehicle.

In accordance with one or more aspects of the present disclosure, the distal end interfaces the tire-wheel assembly so as to effect a balancing solution of the one or more of the tire, the wheel, the bearings, the brake components, and the vehicle components that impart vibrations to the vehicle via robotic application of wheel balancing weights with the distal end.

In accordance with one or more aspects of the present disclosure, the robot has a driven actuator, the driven actuator has the distal end and the actuator is driven so as to extend in at least one degree of freedom of the robot between a retracted position and an extended position, the extended position locating the distal end proximate the tire-wheel assembly.

In accordance with one or more aspects of the present disclosure, the actuator has the indexer arranged to index the distal end, in the at least one degree of freedom, and position the distal end at different index positions corresponding to wheel balancing weight locations on the wheel rim.

In accordance with one or more aspects of the present disclosure, the indexer has an index position that places the distal end in contact with the wheel rim determining a rim location on the wheel rim, of the tire-wheel assembly mounted on the vehicle.

In accordance with one or more aspects of the present disclosure, the distal end has a wheel balancing weight grip, and a resiliently compliant wheel balancing weight applicator.

In accordance with one or more aspects of the present disclosure, the vehicle component balancing robot apparatus further includes one or more sensors configured to resolve the other predetermined location of the tire-wheel assembly relative to the reference frame of the robot.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the distal end, where the robot moves the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one end effector, where the robot moves the proximity sensor to iteratively contact a side of the tire-wheel assembly and effect determination of an open location of the wheel into which the at least one end effector extends to affix a wheel weight to the wheel.

In accordance with one or more aspects of the present disclosure, the indexer effects placement of a wheel balancing weight at one or more locations on the wheel rim.

In accordance with one or more aspects of the present disclosure, the one or more locations on the wheel rim include a location adjacent a back of a wheel flange and another location adjacent an inner wheel lip.

In accordance with one or more aspects of the present disclosure, the indexer includes at least one actuator having a first extension position and a second extension position.

In accordance with one or more aspects of the present disclosure, the indexer includes a conforming wheel balancing weight gripper that conforms, from a relaxed configuration, to a contour of a surface of the wheel rim onto which the wheel balancing weight is applied.

In accordance with one or more aspects of the present disclosure, the distal end includes a conforming wheel balancing weight gripper that conforms, from a relaxed configuration, to a contour of a surface of the wheel rim onto which the wheel balancing weight is applied.

In accordance with one or more aspects of the present disclosure, the conforming wheel balancing weight gripper includes a flexible grip configured to grip and hold a wheel balancing weight.

In accordance with one or more aspects of the present disclosure, the flexible grip includes one or more of magnets, vacuum grips, and clips.

In accordance with one or more aspects of the present disclosure, the vehicle component balancing robot apparatus further includes a wheel balancing weight dispenser connected to the frame, the wheel balancing weight dispenser includes a wheel weight transport configured to convey and position wheel balancing weights at an interface location where the robot picks the wheel balancing weights from the wheel weight transport.

In accordance with one or more aspects of the present disclosure, the wheel weight transport is configured to convey adhesive wheel balancing weights sans an adhesive backing of the wheel balancing weights.

In accordance with one or more aspects of the present disclosure, the wheel balancing weight dispenser is configured to remove the adhesive backing from the wheel balancing weights for transport on the wheel weight transport.

In accordance with one or more aspects of the present disclosure, the wheel balancing weight dispenser includes an automated weight-measuring roller and a cutting blade, the automated weight-measuring roller being configured to unroll and index a predetermined amount of weight past the cutting blade and the cutting blade is configured to cut the predetermined amount of weight to form a wheel balancing weight of a predetermined weight that resolves imbalance of the one or more of the tire, the wheel, the bearings, the brake components, and the vehicle components that impart vibrations to the vehicle.

In accordance with one or more aspects of the present disclosure, a vehicle component balancing method, for on vehicle balancing of one or more of a tire, a wheel, bearings, brake components, and vehicle components that impart vibrations to the vehicle, is provided. The method includes: providing a vehicle component balancing robot apparatus for on vehicle balancing of the one or more of the tire, the wheel, the bearings, the brake components, and the vehicle components that impart vibrations to the vehicle, the vehicle component balancing robot apparatus having a frame arranged so as to connect with the vehicle; interfacing a distal end of a robot with a tire-wheel assembly of the vehicle, where the robot is connected to the frame at a proximal end of the robot, opposite the distal end; and indexing, with an indexer of the robot, the distal end between a retracted position and at least one extended position, wherein in the at least one extended position the distal end interfaces the tire-wheel assembly determining a rim location of the wheel rim of the tire wheel assembly mounted on the vehicle.

In accordance with one or more aspects of the present disclosure, the indexer is a multi-index stage indexer, each index stage having at least one index position.

In accordance with one or more aspects of the present disclosure, at least one index stage has different index positions that position the interface corresponding to wheel balancing weight locations on the wheel rim so as to effect a balancing solution of the one or more of the tire, the wheel, the bearings, the brake components, and the vehicle components that impart vibrations to the vehicle.

In accordance with one or more aspects of the present disclosure, the distal end interfaces the tire-wheel assembly at the predetermined locations so as to effect a balancing solution of the one or more of the tire, the wheel, the bearings, the brake components, and the vehicle components that impart vibrations to the vehicle via robotic application of wheel balancing weights with the distal end.

In accordance with one or more aspects of the present disclosure, the robot has a driven actuator, the driven actuator has the distal end and the actuator is driven so as to extend in at least one degree of freedom of the robot between a retracted position and an extended position, the extended position locating the distal end proximate the tire-wheel assembly.

In accordance with one or more aspects of the present disclosure, the actuator has the indexer and indexes the distal end, in the at least one degree of freedom, and positions the distal end at different index positions corresponding to wheel balancing weight locations on the wheel rim.

In accordance with one or more aspects of the present disclosure, the indexer has an index position that places the distal end in contact with the wheel rim determining a rim location on the wheel rim, of the tire-wheel assembly mounted on the vehicle.

In accordance with one or more aspects of the present disclosure, the distal end has a wheel balancing weight grip, and a resiliently compliant wheel balancing weight applicator.

In accordance with one or more aspects of the present disclosure, the method further includes resolving, with one or more sensors, the other predetermined location of the tire-wheel assembly relative to the reference frame of the robot.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the distal end, where the robot moves the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one end effector, where the robot moves the proximity sensor to iteratively contact a side of the tire-wheel assembly and effect determination of an open location of the wheel into which the at least one end effector extends to affix a wheel weight to the wheel.

In accordance with one or more aspects of the present disclosure, the indexer effects placement of a wheel balancing weight at the predetermined locations on the wheel rim.

In accordance with one or more aspects of the present disclosure, the predetermined locations on the wheel rim include a location adjacent a back of a wheel flange and another location adjacent an inner wheel lip.

In accordance with one or more aspects of the present disclosure, the indexer includes at least one actuator having a first extension position and a second extension position.

In accordance with one or more aspects of the present disclosure, the indexer includes a conforming wheel balancing weight gripper that conforms, from a relaxed configuration, to a contour of a surface of the wheel rim onto which the wheel balancing weight is applied.

In accordance with one or more aspects of the present disclosure, the distal end includes a conforming wheel balancing weight gripper that conforms, from a relaxed configuration, to a contour of a surface of the wheel rim onto which the wheel balancing weight is applied.

In accordance with one or more aspects of the present disclosure, the conforming wheel balancing weight gripper includes a flexible grip configured to grip and hold a wheel balancing weight.

In accordance with one or more aspects of the present disclosure, the flexible grip includes one or more of magnets, vacuum grips, and clips.

In accordance with one or more aspects of the present disclosure, the method further includes, with a wheel balancing weight dispenser connected to the frame where the wheel balancing weight dispenser includes a wheel weight transport, conveying and positioning wheel balancing weights at an interface location where the robot picks the wheel balancing weights from the wheel weight transport.

In accordance with one or more aspects of the present disclosure, the wheel weight transport conveys adhesive wheel balancing weights sans an adhesive backing of the wheel balancing weights.

In accordance with one or more aspects of the present disclosure, the wheel balancing weight dispenser removes the adhesive backing from the wheel balancing weights for transport on the wheel weight transport.

In accordance with one or more aspects of the present disclosure, the wheel balancing weight dispenser includes an automated weight-measuring roller and a cutting blade, where the automated weight-measuring roller unrolls and indexes a predetermined amount of weight past the cutting blade and the cutting blade cuts the predetermined amount of weight to form a wheel balancing weight of a predetermined weight that resolves imbalance of the one or more of the tire, the wheel, the bearings, the brake components, and the vehicle components that impart vibrations to the vehicle.

In accordance with one or more aspects of the present disclosure, a vehicle component balancing robot apparatus, for on vehicle balancing of one or more of a tire, a wheel, bearings, brake components, and vehicle components that impart vibrations to the vehicle, is provided. The apparatus comprising: a frame arranged so as to connect with the vehicle; and a robot connected to the frame at a proximal end of the robot, and the robot has at least one compliant end effector, opposite the proximal end, the at least one compliant end effector being arranged so as to interface with a tire-wheel assembly of the vehicle; wherein the at least one compliant end effector interfaces the tire-wheel assembly determining a rim location of the wheel rim of the tire wheel assembly and predetermined locations so as to effect a balancing solution of the one or more of the tire, the wheel, the bearings, the brake components, and the vehicle components that impart vibrations to the vehicle via robotic application of wheel balancing weights with the at least one compliant end effector.

In accordance with one or more aspects of the present disclosure, the at least one compliant end effector comprises an indexer that indexes the at least one compliant end effector between a retracted position and at least one extended position.

In accordance with one or more aspects of the present disclosure, the indexer is a multi-stage indexer and at least one index stage has different index positions that position the interface corresponding to wheel balancing weight locations on the wheel rim so as to effect the balancing solution.

In accordance with one or more aspects of the present disclosure, the robot has an actuator that has the indexer arranged to index the at least one compliant end effector, in at least one degree of freedom, and position the at least one compliant end effector at different index positions corresponding to wheel balancing weight locations on the wheel rim.

In accordance with one or more aspects of the present disclosure, the indexer has an index position that places the at least one compliant end effector in contact with the wheel rim determining a rim location on the wheel rim, of the tire-wheel assembly mounted on the vehicle.

In accordance with one or more aspects of the present disclosure, the indexer effects placement of a wheel balancing weight at the predetermined locations on the wheel rim.

In accordance with one or more aspects of the present disclosure, the predetermined locations on the wheel rim include a location adjacent a back of a wheel flange and another location adjacent an inner wheel lip.

In accordance with one or more aspects of the present disclosure, the indexer includes at least one actuator having a first extension position and a second extension position.

In accordance with one or more aspects of the present disclosure, the robot has at least one degree of freedom and is configured to move the at least one compliant end effector in the one degree of freedom relative to the frame so that the move resolves another predetermined location of the tire-wheel assembly relative to a reference frame of the robot; and the at least one compliant end effector is arranged to interface the tire-wheel assembly and the robot moves the at least one compliant end effector to the predetermined locations on a wheel rim of the tire-wheel assembly, determined based on resolution of the other predetermined location of the tire-wheel assembly relative to the reference frame of the robot.

In accordance with one or more aspects of the present disclosure, the other predetermined location determines a frame of reference of the tire-wheel assembly relative to the reference frame of the robot.

In accordance with one or more aspects of the present disclosure, the predetermined locations on the wheel rim are wheel balancing weight locations resolving imbalance of the one or more of the tire, the wheel, the bearings, the brake components, and the vehicle components that impart vibrations to the vehicle.

In accordance with one or more aspects of the present disclosure, the at least one compliant end effector interfaces the tire-wheel assembly at the predetermined locations so as to effect the balancing solution of the one or more of the tire, the wheel, the bearings, the brake components, and the vehicle components that impart vibrations to the vehicle via robotic application of wheel balancing weights with the at least one compliant end effector.

In accordance with one or more aspects of the present disclosure, the vehicle component balancing robot apparatus further includes one or more sensors configured to resolve the other predetermined location of the tire-wheel assembly relative to the reference frame of the robot.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the at least one compliant end effector, where the robot moves the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one compliant end effector, where the robot moves the proximity sensor to iteratively contact a side of the tire-wheel assembly and effect determination of an open location of the wheel into which the at least one compliant end effector extends to affix a wheel weight to the wheel.

In accordance with one or more aspects of the present disclosure, the robot has a driven actuator, the driven actuator has the at least one compliant end effector and the actuator is driven so as to extend in at least one degree of freedom of the robot between a retracted position and an extended position, the extended position locating the at least one compliant end effector proximate the tire-wheel assembly.

In accordance with one or more aspects of the present disclosure, the at least one compliant end effector has a wheel balancing weight grip, and a resiliently compliant wheel balancing weight applicator.

In accordance with one or more aspects of the present disclosure, the at least one compliant end effector includes a conforming wheel balancing weight gripper that conforms, from a relaxed configuration, to a contour of a surface of the wheel rim onto which the wheel balancing weight is applied.

In accordance with one or more aspects of the present disclosure, the conforming wheel balancing weight gripper includes a flexible grip configured to grip and hold a wheel balancing weight.

In accordance with one or more aspects of the present disclosure, the flexible grip includes one or more of magnets, vacuum grips, and clips.

In accordance with one or more aspects of the present disclosure, the vehicle component balancing robot apparatus further includes a wheel balancing weight dispenser connected to the frame, the wheel balancing weight dispenser includes a wheel weight transport configured to convey and position wheel balancing weights at an interface location where the robot picks the wheel balancing weights from the wheel weight transport.

In accordance with one or more aspects of the present disclosure, the wheel weight transport is configured to convey adhesive wheel balancing weights sans an adhesive backing of the wheel balancing weights.

In accordance with one or more aspects of the present disclosure, the wheel balancing weight dispenser is configured to remove the adhesive backing from the wheel balancing weights for transport on the wheel weight transport.

In accordance with one or more aspects of the present disclosure, the wheel balancing weight dispenser includes an automated weight-measuring roller and a cutting blade, the automated weight-measuring roller being configured to unroll and index a predetermined amount of weight past the cutting blade and the cutting blade is configured to cut the predetermined amount of weight to form a wheel balancing weight of a predetermined weight that resolves imbalance of the one or more of the tire, the wheel, the bearings, the brake components, and the vehicle components that impart vibrations to the vehicle.

In accordance with one or more aspects of the present disclosure, a vehicle component balancing method, for on vehicle balancing of one or more of a tire, a wheel, bearings, brake components, and vehicle components that impart vibrations to the vehicle, is provided. The method comprising: providing a vehicle component balancing robot apparatus for on vehicle balancing of the one or more of the tire, the wheel, the bearings, the brake components, and the vehicle components that impart vibrations to the vehicle, the vehicle component balancing robot apparatus having a frame arranged so as to connect with the vehicle; interfacing at least one compliant end effector of a robot with a tire-wheel assembly of the vehicle, the robot being connected to the frame at a proximal end of the robot, and the at least one compliant end effector is disposed opposite the proximal end; and determining, with the at least one compliant end effector interfacing the tire-wheel assembly, a rim location of the wheel rim of the tire wheel assembly and predetermined locations so as to effect a balancing solution of the one or more of the tire, the wheel, the bearings, the brake components, and the vehicle components that impart vibrations to the vehicle via robotic application of wheel balancing weights with the at least one compliant end effector.

In accordance with one or more aspects of the present disclosure, the method further includes, with an indexer of the at least one compliant end effector, indexing the at least one compliant end effector between a retracted position and at least one extended position.

In accordance with one or more aspects of the present disclosure, the indexer is a multi-stage indexer and at least one index stage has different index positions that position the interface corresponding to wheel balancing weight locations on the wheel rim so as to effect the balancing solution.

In accordance with one or more aspects of the present disclosure, the robot has an actuator that has the indexer arranged to index the at least one compliant end effector, in at least one degree of freedom, and position the at least one compliant end effector at different index positions corresponding to wheel balancing weight locations on the wheel rim.

In accordance with one or more aspects of the present disclosure, the method further includes, with an index position of the indexer, placing the at least one compliant end effector in contact with the wheel rim determining a rim location on the wheel rim, of the tire-wheel assembly mounted on the vehicle.

In accordance with one or more aspects of the present disclosure, the indexer effects placement of a wheel balancing weight at the predetermined locations on the wheel rim.

In accordance with one or more aspects of the present disclosure, the predetermined locations on the wheel rim include a location adjacent a back of a wheel flange and another location adjacent an inner wheel lip.

In accordance with one or more aspects of the present disclosure, the indexer includes at least one actuator having a first extension position and a second extension position.

In accordance with one or more aspects of the present disclosure, the robot has at least one degree of freedom and moves the at least one compliant end effector in the one degree of freedom relative to the frame so that the move resolves another predetermined location of the tire-wheel assembly relative to a reference frame of the robot; and the at least one compliant end effector interfaces the tire-wheel assembly and the robot moves the at least one compliant end effector to the predetermined locations on a wheel rim of the tire-wheel assembly, determined based on resolution of the other predetermined location of the tire-wheel assembly relative to the reference frame of the robot.

In accordance with one or more aspects of the present disclosure, the other predetermined location determines a frame of reference of the tire-wheel assembly relative to the reference frame of the robot.

In accordance with one or more aspects of the present disclosure, the predetermined locations on the wheel rim are wheel balancing weight locations resolving imbalance of the one or more of the tire, the wheel, the bearings, the brake components, and the vehicle components that impart vibrations to the vehicle.

In accordance with one or more aspects of the present disclosure, the at least one compliant end effector interfaces the tire-wheel assembly at the predetermined locations so as to effect a balancing solution of the one or more of the tire, the wheel, the bearings, the brake components, and the vehicle components that impart vibrations to the vehicle via robotic application of wheel balancing weights with the at least one compliant end effector.

In accordance with one or more aspects of the present disclosure, the method further includes, with one or more sensors, resolving the other predetermined location of the tire-wheel assembly relative to the reference frame of the robot.

In accordance with one or more aspects of the present disclosure, the one or more sensors includes one or more of an optical sensor, an ultrasonic sensor, and a proximity sensor.

In accordance with one or more aspects of the present disclosure, the one or more sensors includes a proximity sensor coupled to the at least one compliant end effector, where the robot moves the proximity sensor to iteratively contact a side of the tire-wheel assembly and effect determination of an inner lip location of the tire-wheel assembly.

In accordance with one or more aspects of the present disclosure, the one or more sensors includes a proximity sensor coupled to the at least one compliant end effector, where the robot moves the proximity sensor to iteratively contact a side of the tire-wheel assembly and effect determination of an open location of the wheel into which the at least one compliant end effector extends to affix a wheel weight to the wheel.

In accordance with one or more aspects of the present disclosure, the robot has a driven actuator, the driven actuator has the at least one compliant end effector and the actuator is driven so as to extend in at least one degree of freedom of the robot between a retracted position and an extended position, the extended position locating the at least one compliant end effector proximate the tire-wheel assembly.

In accordance with one or more aspects of the present disclosure, the at least one compliant end effector has a wheel balancing weight grip, and a resiliently compliant wheel balancing weight applicator.

In accordance with one or more aspects of the present disclosure, the at least one compliant end effector includes a conforming wheel balancing weight gripper that conforms, from a relaxed configuration, to a contour of a surface of the wheel rim onto which the wheel balancing weight is applied.

In accordance with one or more aspects of the present disclosure, the conforming wheel balancing weight gripper includes a flexible grip that grips and holds a wheel balancing weight.

In accordance with one or more aspects of the present disclosure, the flexible grip includes one or more of magnets, vacuum grips, and clips.

In accordance with one or more aspects of the present disclosure, the method further includes, with a wheel weight transport of a wheel balancing weight dispenser connected to the frame, conveying and positioning wheel balancing weights at an interface location where the robot picks the wheel balancing weights from the wheel weight transport.

In accordance with one or more aspects of the present disclosure, the wheel weight transport conveys adhesive wheel balancing weights sans an adhesive backing of the wheel balancing weights.

In accordance with one or more aspects of the present disclosure, the wheel balancing weight dispenser removes the adhesive backing from the wheel balancing weights for transport on the wheel weight transport.

In accordance with one or more aspects of the present disclosure, the method further includes, with an automated weight-measuring roller and a cutting blade of the wheel balancing weight dispenser, unrolling and indexing a predetermined amount of weight past the cutting blade and cutting the predetermined amount of weight to form a wheel balancing weight of a predetermined weight that resolves imbalance of the one or more of the tire, the wheel, the bearings, the brake components, and the vehicle components that impart vibrations to the vehicle.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. A vehicle component balancing robot apparatus for on vehicle balancing of one or more of a tire, a wheel, bearings, brake components, and vehicle components that impart vibrations to the vehicle, the apparatus comprising:

a frame arranged so as to connect with the vehicle; and a robot connected to the frame, the robot having at least one degree of freedom so as to move, in the at least one degree of freedom, relative to the frame, and is configured so that the move, relative to the frame in the at least one degree of freedom, resolves a predetermined location of a tire-wheel assembly of the vehicle relative to a reference frame of the robot;

wherein the robot has at least one end effector arranged to interface the tire-wheel assembly and the robot is configured to move the at least one end effector to other predetermined locations on a wheel rim of the tire-wheel assembly, determined based on resolution of the predetermined location of the tire-wheel assembly relative to the reference frame of the robot.

2. The apparatus of claim 1, wherein the predetermined location defines a frame of reference of the tire-wheel assembly relative to the reference frame of the robot.

3. The apparatus of claim 1, wherein the other predetermined locations on the wheel rim are wheel balancing weight locations resolving imbalance of the one or more of the tire, the wheel, the bearings, the brake components, and the vehicle components that impart vibrations to the vehicle.

4. The apparatus of claim 1, wherein the at least one end effector is capable of interfacing the tire-wheel assembly at the other predetermined locations so as to effect a balancing solution of the one or more of the tire, the wheel, the bearings, the brake components, and the vehicle components that impart vibrations to the vehicle via robotic application of wheel balancing weights with the at least one end effector.

5. The apparatus of claim 1, wherein the robot has a driven actuator, driven so as to extend in the at least one degree of freedom between a retracted position and an extended position, the extended position locating the at least one end effector proximate the tire-wheel assembly.

6. The apparatus of claim 5, wherein the actuator has an indexer arranged to index the at least one end effector, in the at least one degree of freedom, and position the at least one end effector at different index positions corresponding to wheel balancing weight locations on the wheel rim.

7. The apparatus of claim 6, wherein the indexer has an index position that places the at least one end effector in contact with the wheel rim determining a rim location on the wheel rim, of the tire-wheel assembly mounted on the vehicle.

8. The apparatus of claim 1, wherein the at least one end effector has a wheel balancing weight grip, and a resiliently compliant wheel balancing weight applicator.

9. The apparatus of claim 1, further comprising one or more sensors configured to resolve the predetermined location of the tire-wheel assembly relative to the reference frame of the robot.

10. The apparatus of claim 9, wherein the one or more sensors includes a proximity sensor coupled to the at least one end effector, where the robot is configured to move the proximity sensor to iteratively contact a side of the tire-wheel assembly and effect determination of an inner lip location of the tire-wheel assembly.

11. The apparatus of claim 1, further comprising a wheel balancing weight dispenser connected to the frame, the wheel balancing weight dispenser includes a wheel weight transport configured to convey and position wheel balancing weights at an interface location where the robot picks the wheel balancing weights from the wheel weight transport.

12. A vehicle component balancing method for on vehicle balancing of one or more of a tire, a wheel, bearings, brake components, and vehicle components that impart vibrations to the vehicle, the method comprising:

providing a vehicle component balancing robot apparatus for on vehicle balancing of the one or more of the tire, the wheel, the bearings, the brake components, and the vehicle components that impart vibrations to the vehicle, the vehicle component balancing robot apparatus having a frame arranged so as to connect with the vehicle;

resolving a predetermined location of a tire-wheel assembly of the vehicle relative to a reference frame of a robot by moving the robot relative to the frame in at least one degree of freedom, where the robot is connected to the frame and has the at least one degree of freedom;

interfacing at least one end effector of the robot with the tire-wheel assembly; and moving, with the robot, the at least one end effector to other predetermined locations on a wheel rim of the tire-wheel assembly, determined based on resolution of the predetermined location of the tire-wheel assembly relative to a reference frame of the robot.

13. The method of claim 12, wherein the predetermined location defines a frame of reference of the tire-wheel assembly relative to the reference frame of the robot.

14. The method of claim 12, wherein the other predetermined locations on the wheel rim are wheel balancing weight locations resolving imbalance of the one or more of the tire, the wheel, the bearings, the brake components, and the vehicle components that impart vibrations to the vehicle.

15. The method of claim 12, wherein the at least one end effector interfaces the tire-wheel assembly at the other predetermined locations so as to effect a balancing solution of the one or more of the tire, the wheel, the bearings, the brake components, and the vehicle components that impart vibrations to the vehicle via robotic application of wheel balancing weights with the at least one end effector.

16. A vehicle component balancing robot apparatus for on vehicle balancing of one or more of a tire, a wheel, bearings, brake components, and vehicle components that impart vibrations to the vehicle, the apparatus comprising:

a frame arranged so as to connect with the vehicle; and a robot connected to the frame at a proximal end of the robot, and the robot has a distal end, opposite the proximal end, the distal end being arranged so as to interface with a tire-wheel assembly of the vehicle;

wherein the robot has an indexer that indexes the distal end between a retracted position and at least one extended position, wherein in the at least one extended position the distal end interfaces the tire-wheel assembly determining a rim location of the wheel rim of the tire wheel assembly and predetermined locations so as to effect a balancing solution of the one or more of the tire, the wheel, the bearings, the brake components, and the vehicle components that impart vibrations to the vehicle via robotic application of wheel balancing weights with the distal end.

17. The apparatus of claim 16, wherein the indexer is a multi-index stage indexer, each index stage having at least one index position.

18. The apparatus of claim 17, wherein at least one index stage has different index positions that position the interface corresponding to wheel balancing weight locations on the wheel rim so as to effect the balancing solution.

19. The apparatus of claim 16, wherein:

the robot has at least one degree of freedom and is configured to move the distal end in the one degree of freedom relative to the frame so that the move resolves another predetermined location of the tire-wheel assembly relative to a reference frame of the robot; and the distal end is arranged to interface the tire-wheel assembly and the robot is configured to move the distal end to the predetermined locations on a wheel rim of the tire-wheel assembly, determined based on resolution of the other predetermined location of the tire-wheel assembly relative to the reference frame of the robot.

20. The apparatus of claim 19, wherein the other predetermined location defines a frame of reference of the tire-wheel assembly relative to the reference frame of the robot.

21. The apparatus of claim 19, wherein the predetermined locations on the wheel rim are wheel balancing weight locations resolving imbalance of the one or more of the tire, the wheel, the bearings, the brake components, and the vehicle components that impart vibrations to the vehicle.

22. The apparatus of claim 19, wherein the distal end is capable of interfacing the tire-wheel assembly at the predetermined locations so as to effect a balancing solution of the one or more of the tire, the wheel, the bearings, the brake components, and the vehicle components that impart vibrations to the vehicle via robotic application of wheel balancing weights with the distal end.

23. The apparatus of claim 16, wherein the robot has a driven actuator, the driven actuator has the distal end and the actuator is driven so as to extend in at least one degree of freedom of the robot between a retracted position and an extended position, the extended position locating the distal end proximate the tire-wheel assembly.

24. The of claim 23, wherein the actuator has the indexer arranged to index the distal end, in the at least one degree of freedom, and position the distal end at different index positions corresponding to wheel balancing weight locations on the wheel rim.

25. The of claim 16, wherein the indexer has an index position that places the distal end in contact with the wheel rim determining a rim location on the wheel rim, of the tire-wheel assembly mounted on the vehicle.

26. The of claim 16, wherein the distal end has a wheel balancing weight grip, and a resiliently compliant wheel balancing weight applicator.

27. A vehicle component balancing method for on vehicle balancing of one or more of a tire, a wheel, bearings, brake components, and vehicle components that impart vibrations to the vehicle, the method comprising:

providing a vehicle component balancing robot apparatus for on vehicle balancing of the one or more of the tire, the wheel, the bearings, the brake components, and the vehicle components that impart vibrations to the vehicle, the vehicle component balancing robot apparatus having a frame arranged so as to connect with the vehicle; and interfacing a distal end of a robot with a tire-wheel assembly of the vehicle, where the robot is connected to the frame at a proximal end of the robot, opposite the distal end;

indexing, with an indexer of the robot, the distal end between a retracted position and at least one extended position, wherein in the at least one extended position the distal end interfaces the tire-wheel assembly determining a rim location of the wheel rim of the tire wheel assembly and predetermined locations so as to effect a balancing solution of the one or more of the tire, the wheel, the bearings, the brake components, and the vehicle components that impart vibrations to the vehicle via robotic application of wheel balancing weights with the distal end.

28. The method of claim 27, wherein the indexer is a multi-index stage indexer, each index stage having at least one index position.

29. The method of claim 28, wherein at least one index stage has different index positions that position the interface corresponding to wheel balancing weight locations on the wheel rim so as to effect the balancing solution.

30. The method of claim 27, wherein:

the robot has at least one degree of freedom and moves the distal end in the one degree of freedom relative to the frame so that the move resolves another predetermined location of the tire-wheel assembly relative to a reference frame of the robot; and the distal end is arranged to interface the tire-wheel assembly and the robot moves the distal end to the predetermined locations on a wheel rim of the tire-wheel assembly, determined based on resolution of the other predetermined location of the tire-wheel assembly relative to the reference frame of the robot.

* * * * *